United States Patent [19]

Terashita

[11] Patent Number: 5,719,661
[45] Date of Patent: Feb. 17, 1998

[54] IMAGE REPRODUCING APPARATUS AND METHOD OF DETERMINING REPRODUCTION CONDITIONS

[75] Inventor: Takaaki Terashita, Kanagawa, Japan

[73] Assignee: Fuji Photo Film Co., Ltd., Kanagawa, Japan

[21] Appl. No.: 483,324

[22] Filed: Jun. 7, 1995

[30] Foreign Application Priority Data

| Jul. 27, 1994 | [JP] | Japan | 6-175742 |
| Jul. 27, 1994 | [JP] | Japan | 6-175743 |
| Jul. 29, 1994 | [JP] | Japan | 6-178284 |
| Dec. 19, 1994 | [JP] | Japan | 6-315088 |

[51] Int. Cl.$^6$ .............................. G03B 27/80; G03B 27/32
[52] U.S. Cl. .................. 355/38; 355/41; 355/32; 355/35; 355/68
[58] Field of Search ........................ 355/38, 41, 35, 355/32, 77, 68; 358/518, 523

[56] References Cited

U.S. PATENT DOCUMENTS

| 4,942,424 | 7/1990 | Terashita et al. | 355/38 |
| 4,974,017 | 11/1990 | Terashita | 355/38 |
| 5,017,014 | 5/1991 | Terashita | 355/35 X |

FOREIGN PATENT DOCUMENTS

| 63-311242 | 12/1988 | Japan | G03B 27/73 |
| 290141 | 3/1990 | Japan | G03B 27/73 |
| 5333451 | 12/1993 | Japan | G03B 27/73 |

Primary Examiner—R. L. Moses
Assistant Examiner—Shival Virmani
Attorney, Agent, or Firm—Sughrue, Mion, Zinn, Macpeak & Seas, PLLC

[57] ABSTRACT

In an image reproducing apparatus, an image recorded on a negative film is subjected to optical measurement by an optical measuring device. The data obtained by the optical measurement is stored in a photometric data memory for each type of film which is judged by a DX code reader and a film type detecting device. In the apparatus, a difference in characteristics between a reference film and the negative film is calculated by a film characteristic difference calculating device, and the image characteristic amount of the image is calculated by an image characteristic amount calculating device. In a film type correction amount calculating device, a correction value is calculated based on the calculated difference in the film characteristics and the image characteristic amount to compensate for a decrease in the quality of the printed image due to the difference in the film characteristics. In an exposure condition determining device, exposure conditions are determined based on reference exposure conditions input from a reference exposure condition setting device, photometric data selected by a photometric value selecting device, and the above-described correction value. Accordingly, images having proper image quality can be reproduced from various films having different film characteristics.

23 Claims, 32 Drawing Sheets

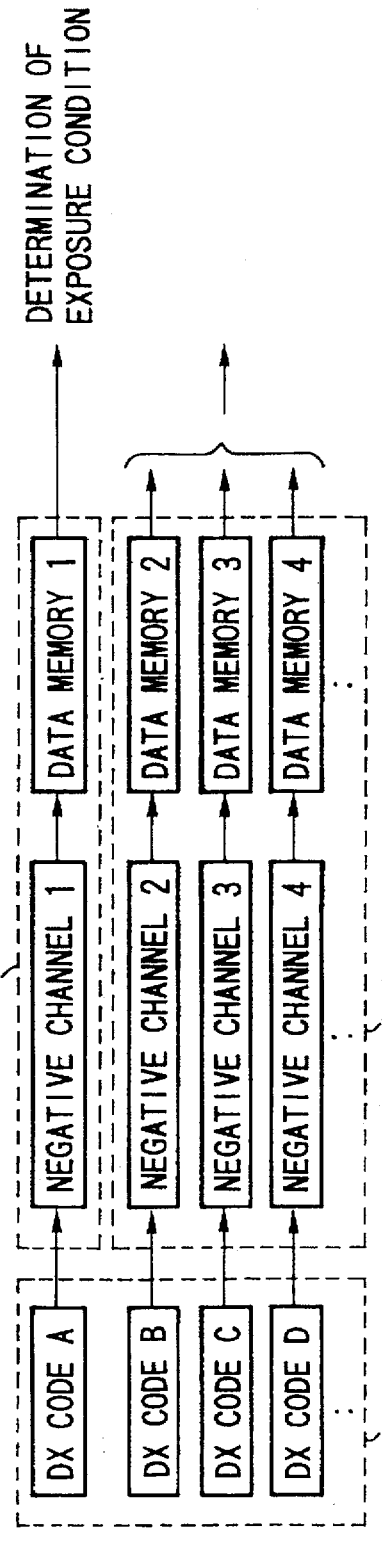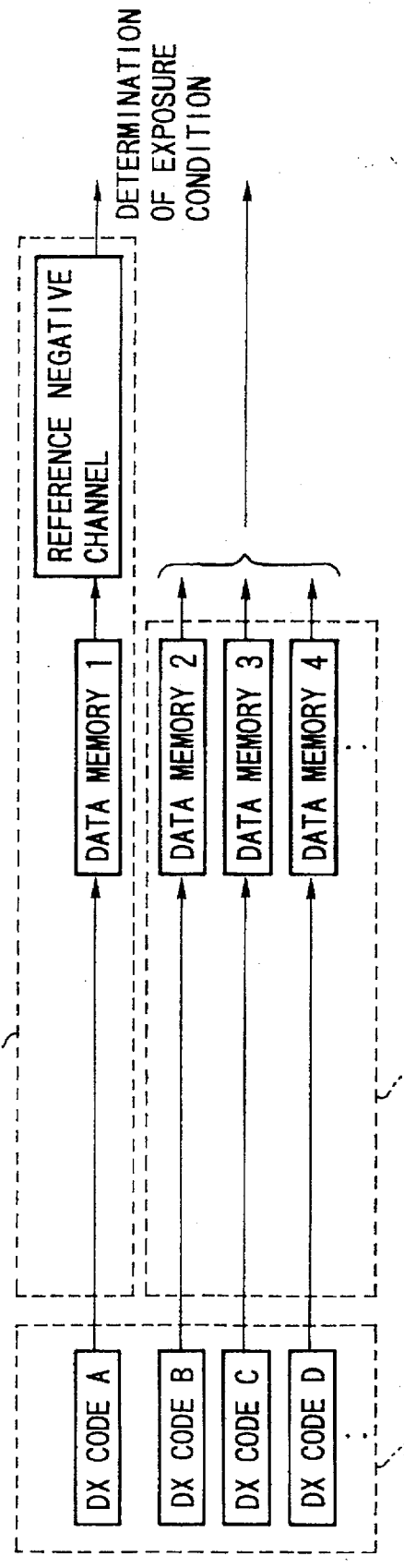

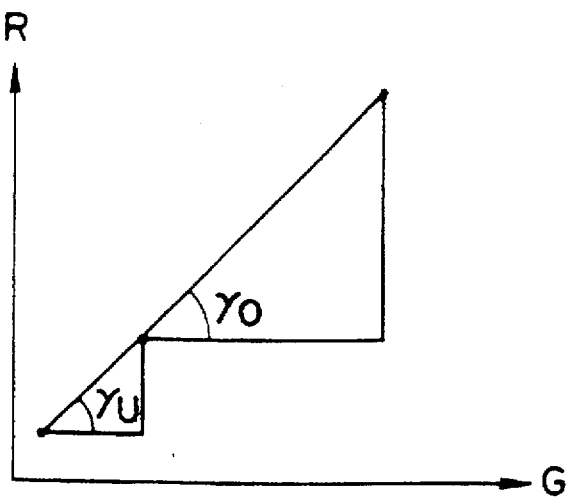
F I G. 9 A
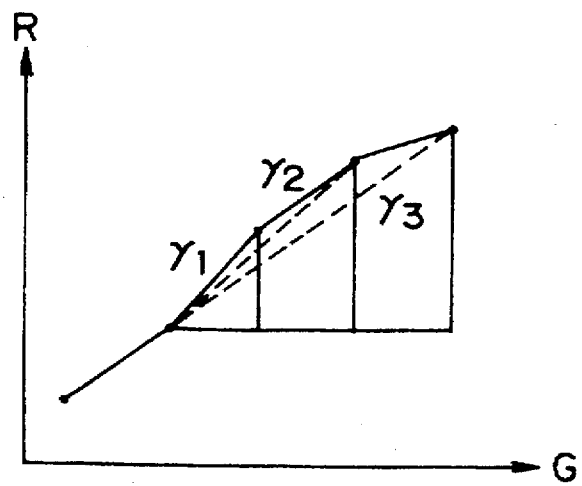
F I G. 9 B
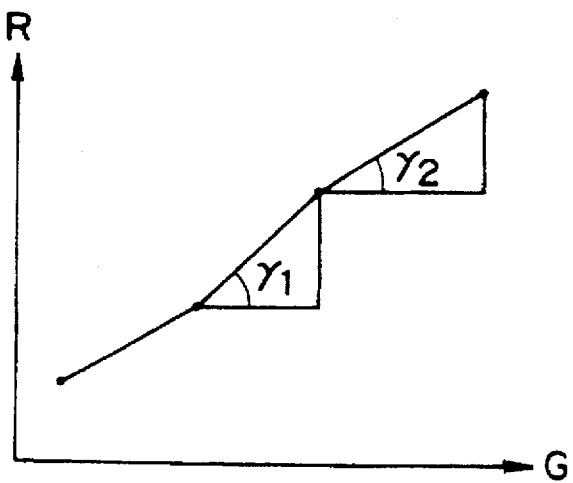
F I G. 9 C

IMAGE REPRODUCING APPARATUS AND METHOD OF DETERMINING REPRODUCTION CONDITIONS

BACKGROUND OF THE INVENTION

1. Field of the Invention

The present invention relates to an image reproducing apparatus and a method of determining reproduction conditions. More particularly, the present invention relates to a method of determining reproduction conditions for reproducing a film-recorded image on a reproducing material and also relates to an image reproducing apparatus to which this method can be applied.

2. Description of the Related Art

When an image recorded on color negative film is reproduced on a reproducing material, it is known from experience that successful results can be usually obtained by setting the ratio of three light colors composed of blue (B), green (G) and red (R) transmitted through the image to an approximately constant ratio. Therefore, in a photographic printer for printing a film image onto a sheet of photographic printing paper, exposure conditions are determined on the basis of the following basic formula:

$$\log Ej = Kj + Dj \quad (1)$$

In this formula, log E is a logarithm of an exposure amount and K is a constant. D is a density of the film image optically measured by a photometric system. For example, D is shown by LATD. Further, j indicates any one of red, green or blue colors. When the film image is printed using the photographic printer on the basis of the exposure condition calculated by the above formula (1), there arises a phenomenon that no printing density obtained from the film image photographed with an insufficient exposure (underexposure) is equal to a printing density obtained from the film image photographed with a proper exposure. Further, no printing density obtained from the film image photographed with an excessive exposure (overexposure) is equal to the printing density obtained from the film image photographed with the proper exposure. Therefore, exposure conditions are determined by correcting Dj in the formula (1) in accordance with the film image density.

A variety of photographic films with different characteristics are developed and manufactured in accordance with different designing ideas and uses of the photographic films, etc. Presently, the number is amounted to dozens of kinds. However, proper exposure conditions of these films are not necessarily identical to each other. Further, only limited kinds of condition setting-films for setting the exposure conditions of the photographic printer are prepared among the above many kinds of photographic films. A great deal of skill is required, and it takes much time to determine proper exposure conditions for a type of films for which films for setting conditions are not prepared.

Therefore, films serving as a reference are recently provided in advance. In the following description, these films are called reference films. Exposure conditions with respect to a film image of reference films are determined and controlled by films for setting conditions. The exposure conditions for the reference films are shared by other film species. However, some films do not produce successful printing quality. Therefore, there is a proposal in which the exposure condition for a reference film is corrected for every film species. See JP-A-2-90141, etc. as one example of this proposal. According to this publication, a film image to be printed is divided into many divisional images and is optically measured. An exposure condition for each film species is obtained by changing the color correction value among the exposure conditions of a reference film on the basis of a difference in density balance of each of the film species with respect to the density balance of the three colors of the reference film.

However, in that publication, reciprocity law failure characteristics of a reproducing material with respect to a film having a different balance of film characteristics for each color are corrected by changing the color correction value with respect to the reference film. In the following description, this balance is called a gradation balance. Accordingly, no color unbalance can be sufficiently removed from a highlight portion of a printed image.

In JP-A-5-333451, a density histogram is made by optically measuring a film image to stably obtain a proper exposure condition with high accuracy irrespective of film characteristics, a film developing condition, a film storing condition, etc. of each film. A film image is divided into a plurality of image regions having different densities on the basis of this density histogram. A weighted average value is calculated with respect to the average density value every image region such that weighting is increased as the image density is increased. An exposure amount is determined from this weighted average value. In this publication, the color balance of a highlight portion of the film image can be particularly set to be constant irrespective of film characteristics, kinds of a photographic light source, etc.

However, in this publication, the quality of a printed image is reduced in a certain combination of a film with an image recorded thereon and a sheet of photographic printing paper for printing this image. For example, a printed image having a good image quality is generally obtained by combining a sheet of photographic printing paper A with soft gradation in G with film A with hard gradation in G. In the above-mentioned method of JP-A-5-333451 (similar to the above method of JP-A-2-90141), it is impossible to prevent the quality of a printed image from dropping when film B with soft gradation in G is printed on the photographic printing paper sheet A. Thus, no matching of the characteristics of a film carrying an image to be printed and characteristics of the photographic printing paper sheet for printing this image is considered in the above known art.

In JP-A-63-311242 as another example, exposure conditions are determined by removing data corresponding to a high saturation portion of an image from data obtained by optically measuring the image such that a proper printed image is obtained with respect to an image which tends to cause color failure. The image which tends to cause color failure has a high image average density with respect to a specific color and is biased from a photographed image of a subject with a normal color balance.

However, it is known that color saturation in a non-highlight portion including a shadow portion of the image is generally lower than that in a highlight portion. In contrast to this, in the above publication JP-A-63-311242, for example, if a color balance is biased toward a specified color such as dark green of tree leaves or red of scarlet theater curtains in the non-highlight portion including the shadow portion of the image, and therefore there exists a considerable portion that causes color failure, it is difficult to remove data corresponding to that image portion to cause color failure in printed images.

In the above publication JP-A-5-333451, weighting of the non-highlight portion is relatively reduced. Accordingly, effects of the image portion causing color failure can be reduced even when this image portion exists in the non-highlight portion. Therefore, it is possible to increase the probability in which proper exposure conditions can be set.

In the above publication JP-A-5-333451, weighting of the highlight portion of an image is increased taking account of visual characteristics of a human in which a color unbalance of the image, etc. are easily perceived particularly in the highlight portion of the image. For example, when densities of a main portion of the image and the highlight portion are greatly different from each other as in a photographed image of a backlight scene, it is difficult, due to the effect of the color balance of the highlight portion, to determine exposure conditions such that a color balance of the main portion of the image, etc. become proper.

Further, in this publication, no area of the highlight portion is considered. For example, when the image has a highlight portion which has a small area and a greatly different density from another image portion, a large weight is given to this highlight portion even when the area of this highlight portion is small. Accordingly, it is difficult to determine proper exposure conditions which provide a proper color balance in the main image portion due to the effect of the color balance of the highlight portion having a small area. This problem is markedly caused particularly when the above highlight portion having a small area exists in a partial image among plural photographed images of the same scene. With this regard, there is a case in which a color balance, etc. of a printed image are changed in accordance with presence or absence of the highlight portion having a small area.

SUMMARY OF THE INVENTION

In view of the above problems, a first object of the present invention is to provide an image reproducing apparatus in which a reproduced image having a proper image quality can be obtained from each of various kinds of films having different film characteristics.

A second object of the present invention is to provide a reproduction condition determining method capable of determining reproduction conditions such that a reproduced image having a suitable image quality is obtained from each of various kinds of films having different film characteristics.

A third object of the present invention is to provide an image reproducing apparatus in which a reproduced image having a suitable image quality can be obtained with high probability irrespective of images to be reproduced and kinds of films with images to be reproduced are recorded thereon.

A fourth object of the present invention is to provide a reproduction condition determining method capable of determining reproduction conditions such that a reproduced image having a proper image quality can be obtained with high probability irrespective of images to be reproduced and kinds of films with images to be reproduced are recorded thereon.

The above first and third objects of the invention can be achieved by an image reproducing apparatus having a first structure of the present invention. This image reproducing apparatus comprises photometric means for dividing an image recorded on a predetermined film to be reproduced into many divisional images and decomposing the divisional images into a plurality of colors and optically measuring these colors. The image reproducing apparatus also comprises memory means for storing data obtained by the optical measurement of the photometric means. The image reproducing apparatus also comprises reference reproduction condition setting means for setting a reference reproduction condition for suitably reproducing an image recorded on a predetermined reference film onto a reproducing material. The image reproducing apparatus also comprises image characteristic amount calculating means for calculating image characteristic amount information including information regarding a contrast of the image to be reproduced on the basis of the data obtained by the optical measurement of the photometric means. The image reproducing apparatus also comprises correction amount calculating means for calculating the correction amount for correcting reproduction conditions in accordance with a difference in kinds of film on the basis of film characteristic difference information showing a difference between characteristics of the predetermined film and film characteristics of the reference film, and the image characteristic amount information calculated by the image characteristic amount calculating means. The image reproducing apparatus also comprises reproduction condition determining means for determining the reproduction conditions of the image to be reproduced by using the reference reproduction condition set by the reference reproduction condition setting means and the correction amount calculated by the correction amount calculating means. The image reproducing apparatus further comprises reproducing means for reproducing the image to be reproduced onto the reproducing material in accordance with the reproduction conditions determined by the reproduction condition determining means.

In a second structure of the present invention, the image reproducing apparatus further comprises judging means for judging a kind of the predetermined film in the above first structure. Further, in the second structure, the memory means stores the data obtained by the optical measurement of the photometric means while separating these data for kinds of film. The image reproducing apparatus of the second structure further comprises film characteristic difference calculating means for calculating the film characteristic difference information on the basis of data for film which is the same kind as the predetermined film stored in the memory means. The correction amount calculating means calculates the correction amount on the basis of the film characteristic difference information calculated by the film characteristic difference calculating means.

In a third structure of the present invention, the image reproducing apparatus having the first structure further comprises judging means for judging the kind of the predetermined film. This image reproducing apparatus further comprises film characteristic difference memory means for storing the film characteristic difference information showing the difference between the characteristics of the predetermined film and the film characteristics of the reference film while separating the film characteristic difference information for kinds of film. The correction amount calculating means calculates the correction amount on the basis of the film characteristic difference information of the same film as the predetermined film stored in the film characteristic difference memory means.

In a fourth structure of the present invention, the image reproducing apparatus having the first structure further comprises film characteristic difference calculating means for calculating the film characteristic difference information based on data of a plurality of images recorded onto the predetermined film stored in the memory means.

In a fifth structure of the present invention, the correction amount calculating means in one of the first to fourth structures calculates the correction amount such that this correction amount is increased as the contrast of an image shown by the information regarding the contrast is increased.

In a sixth structure of the present invention, the image characteristic amount information includes information regarding the density of a main portion of the image to be reproduced in one of the first to fourth structures. Further, the correction amount calculating means calculates the correction amount such that this correction amount is increased as the density of the main portion shown by the information regarding the density of the main portion of the image is biased to a highlight side of the image.

The above second and fourth objects can be achieved by a method of determining reproduction conditions having a seventh structure of the present invention. In this method, an image recorded on a predetermined film to be reproduced is divided into a plurality of divisional images and the divisional images are decomposed into a plurality of colors and are optically measured. Data obtained by the optical measurement are stored. Image characteristic amount information including information regarding a contrast of the image to be reproduced is calculated on the basis of the stored data. A correction amount for correcting reproduction conditions in accordance with a difference in kinds of film is calculated on the basis of film characteristic difference information showing a difference between characteristics of the predetermined film and film characteristics of a predetermined reference film, and the calculated image characteristic amount information. The reproduction conditions of the image to be reproduced are determined by using a reference reproduction condition for suitably reproducing an image recorded on the reference film onto a reproducing material and the calculated correction amount.

The principle of the present invention will first be explained. FIG. 1 uses an exposure condition for suitably printing (in gray) a plurality of gray images (so-called gray full images) having a uniform density with no gradation onto a predetermined sheet of photographic printing paper. These gray full images are respectively exposed and recorded onto the film of a predetermined film species at different exposure values (−2, 0, +2, +5 EV with respect to the proper exposure value). In the following description, this film is taken as a reference film for convenience' sake. FIG. 1 shows printing results of the gray full images in which these images are respectively exposed and recorded onto the reference film and films of six kinds different from a kind of the reference film in this exposure condition and are printed onto the predetermined photographic printing paper sheet. In FIG. 1, densities of the images printed onto the photographic printing paper sheet are measured and are respectively plotted in hexagonal color coordinates composed of red (R), green (G), blue (B), cyan (C), magenta (M) and yellow (Y). FIG. 1 shows hues of the respective printed images. The center of the diagram shown in FIG. 1 represents gray, and coordinates closer to the periphery get color.

FIG. 2 uses an exposure condition for suitably printing each of a plurality of standard subject images to a predetermined sheet of photographic printing paper. These subject images are respectively exposed and recorded onto the reference film at different exposure values similar to those in the above case of FIG. 1. For example, a density difference between a maximum density portion and a minimum density portion is set to be equal to 1.2 as a contrast. Gray subjects in these images are reproduced in gray by suitably printing these images. The standard subject images are respectively exposed and recorded onto the reference film as well as six species of films which are different from the reference film in exposure conditions. Similar to FIG. 1, FIG. 2 shows printing results of these subject images printed onto the predetermined photographic printing paper sheet and also shows measured results of portions of the gray subjects in these images. When FIGS. 1 and 2 are compared with each other, there are many points in FIG. 2 which are greatly shifted from the center of the chart, indicating that hues are shifted from gray. Namely, there are many images causing a color unbalance.

The differences between FIGS. 1 and 2 are caused since characteristics of the respective films for each color (especially, balance of the film characteristics: gradation balance) are different from each other, and the results shown in FIG. 2 have been affected by these film characteristics although the results shown in FIG. 1 have not been affected by the film characteristics.

In FIGS. 3A and 3B, a standard subject is recorded by exposure a plurality of times on each of two different kinds of films while an exposure amount is changed. Respective recorded images are divided into many divisional images and are decomposed into colors composed of R, G and B and are optically measured. The photometric results are cumulated. Average densities of R, G and B are shown on the axis of abscissa and density differences of R and B with respect to G are shown on the axis of ordinate as one example of a gradation balance of the films. With respect to a film shown in FIG. 3A, each of characteristic curves of R-G and B-G generally rises rightward. Namely, each of the density differences of the respective colors is increased as the exposure amount is increased. A difference between these curves is also increased as the exposure amount is increased. In contrast to this, with respect to a film shown in FIG. 3B, each of characteristic curves of R-G and B-G is almost parallel to the axis of abscissa as a whole and a difference between these curves is approximately constant along the axis of abscissa.

For example, when an image recorded on the film shown in FIG. 3B is printed on a sheet of photographic printing paper which matches the gradation balance of the film shown in FIG. 3A, a color balance of the printed image is lost by the above difference between the film characteristics since these film characteristics are not in conformity with each other. Accordingly, no preferable image quality can be obtained. In accordance with an experiment made by the inventors of this patent application, a degree of the above color unbalance of the printed image caused by the difference between the film characteristics depends on the exposure amount with respect to each of the films. In particular, color unbalance is markedly caused in a highlight portion of the printed image. These results can be also analogized from the fact in which the points showing printing results of the image printed on the photographic printing paper sheet tend to be greatly deviated from the center of the chart in FIG. 2 as the exposure amount with respect to each film is particularly increased. For example, see the printing results of an image having an exposure value of "+5".

In FIG. 4, a standard subject image is recorded by exposure a plurality of times onto the film of a specific film while the exposure amount is changed. Average values of densities of the respective colors (R, G and B) of the recorded images are shown on the axis of abscissa and contrasts of the respective images every color are shown on the axis of ordinate. Numeric values shown in FIG. 4 show exposure values. In FIG. 4, each of contrast values of the respective colors is increased as the exposure amount is increased. Each of these contrast values is high in an overexposure region in which each exposure value is equal to or greater than a value close to +2. Accordingly, it can be understood that there is a correlation between the exposure amount in recording of the image on the film and a contrast of the image recorded on the film.

In the first structure of the present invention, an image recorded on a predetermined film to be reproduced is divided into a plurality of divisional images by the photometric means as described above. The divisional images are decomposed into a plurality of colors and are optically measured. Further, data obtained by the optical measurement of the photometric means are stored in the memory means. The image characteristic amount calculating means calculates image characteristic amount information including information regarding a contrast of the image to be reproduced. The correction amount calculating means calculates a correction amount for correcting reproduction conditions in accordance with a difference in kinds of film according to the film characteristic difference information showing a difference between characteristics of the predetermined film and film characteristics of a reference film, and the image characteristic amount information calculated by the image characteristic amount calculating means. The reference reproduction condition setting means sets a reference reproduction condition for suitably reproducing an image recorded on a predetermined reference film on a reproducing material. The reproduction condition determining means determines the reproduction conditions of the image to be reproduced by using the reference reproduction condition set by the reference reproduction condition setting means and the correction amount calculated by the correction amount calculating means.

In the above first structure, the image characteristic amount is calculated on the basis of the data obtained by the optical measurement of the photometric means. These data may represent a photometric value or a density value. The image characteristic amount information may be information regarding a degree of a reduction in quality of the reproduced image caused by the film characteristic difference. For example, the image characteristic amount information may further include information showing presence or absence of gradation of the image, information regarding the density of a main portion of the image as described later, etc. in addition to information regarding a contrast of the image.

The correction amount calculating means calculates the correction amount taking account of the image characteristic amount information including the information regarding contrast of an image in addition to the film characteristic difference information showing the difference between the characteristics of the predetermined film and the film characteristics of a reference film. Since the image characteristic amount information is considered, the reduction in quality of the reproduced image caused by the film characteristic difference (especially, a color unbalance) is corrected as a correction amount for correcting the reproduction conditions in accordance with the difference in film irrespective of a change in image characteristic amount including contrast. Thus, it is possible to obtain a correction amount capable of correcting the reproduction conditions so as to obtain a suitable reproduced image equivalent to that obtained when the reference film is used.

The present invention also uses a predetermined reproducing material having characteristics which fit the film characteristics of the reference film. The reference reproduction condition setting means can set reproduction conditions for suitably reproducing an image recorded on the reference film onto the predetermined reproducing material as the reference reproduction condition. Thus, when an image recorded on the predetermined film of a film different from the reference film is reproduced, the reproduction condition determining means can determine the reproduction conditions by using the reference reproduction condition and the above correction amount such that the image recorded on the predetermined film to be reproduced can be suitably reproduced onto the predetermined reproducing material similar to the image recorded on the reference film.

As mentioned above, in the present invention, the reproduction conditions can be obtained with respect to the image recorded on the film of a film different from the reference film by correcting the reference reproduction condition so as to obtain the reproduced image having image quality equivalent to that obtained in a case in which the image recorded on the reference film is recorded onto the reproducing material. Accordingly, a reproduced image having a proper image quality from each of various kinds of films having different film characteristics can be obtained by reproducing an image according to the reproduction conditions by the reproducing means.

The above information regarding contrast can be constructed by using, for example, information showing contrast itself (such as a density difference between high and low density portions of an image). As mentioned above, there is a correlation between an exposure amount in recording of an image on a film and a contrast of the image recorded on the film. When an image having gradation is recorded on the film, the image recorded on the film has hard gradation if the exposure amount is high, resulting in high contrast. In contrast to this, if the exposure amount is small, the image recorded onto the film has soft gradation so that the image contrast is low. Information (such as an exposure value) showing the exposure amount in recording of the image to the film can be used as the information regarding contrast on the basis of these contents.

As described in the second structure, the judging means judges the kind of the predetermined film. Data obtained by the optical measurement of the photometric means are stored in the memory means while separating these data for kinds of film. The film characteristic difference calculating means can obtain the film characteristic difference information by calculating this film characteristic difference information on the basis of data for film which is the same kind as the predetermined film stored in the memory means. As described in the third structure, the film characteristic difference information showing the difference in film characteristics of the reference film may be stored in the film characteristic difference memory means while separating the film characteristic difference information for kinds of film.

In the second structure, it is not necessary to store the film characteristic difference information in advance. Accordingly, when the film of a new film is developed and manufactured, it is not necessary to calculate a new film characteristic difference corresponding to this new film and additionally store information showing the calculated film characteristic difference. In the third structure, no processing for calculating the film characteristic difference is required so that processing for determining the production conditions is simplified and a processing time can be shortened.

The kind of the predetermined film is not necessarily judged as mentioned above to obtain the film characteristic difference information. It is considered that data obtained by optically measuring each of a plurality of images recorded onto the same film reflect characteristics of this film. As described in the fourth structure, the film characteristic difference information may be calculated by the film characteristic difference calculating means on the basis of data of the images recorded onto the predetermined film and stored in the memory means. In the above case, for example, the above data do not necessarily reflect the film characteristics when a large part of the images is constructed by an image which tends to cause color failure. Therefore, there are problems of reducing an accuracy of the film characteristic difference shown by the calculated film characteristic difference information, etc. However, it is not necessary to judge the kind of the predetermined film. Further, suitable reproduction conditions can be obtained with respect to a film which has no DX code and which is difficult to judge the film species as in the case of films having sizes of 110, 126, 120, etc.

The correction amount calculating means can calculate the correction amount concretely as in the fourth structure such that the correction amount is increased as the contrast of an image shown by the information regarding contrast included in the image characteristic amount information is increased. Thus, when the image contrast is high, i.e., when a reducing degree of the quality of a reproduced image is supposed to be large, the reproduction conditions are corrected with a larger correction amount. Accordingly, when the contrast of an image recorded on a film is high, the image can be reproduced in the same image quality as a gray full image (contrast=0) having no gradation and an image having a relatively low contrast and able to be reproduced in a successful image quality in comparison with the conventional case. Therefore, the image can be reproduced to the reproducing material in a good image quality irrespective of a high or low contrast of the image recorded on the film.

A color unbalance of the image, etc. are easily perceived particularly in a highlight portion of the image. A main portion of the image such as an image portion corresponding to a main subject is particularly noticed within this image. Accordingly, when a density of the main portion of this image is close to an image density corresponding to the highlight portion of the image, the color unbalance of the reproduced image, etc. are particularly prominent. Therefore, as described in the sixth structure of the present invention, the image characteristic amount information includes the information regarding the density of the main portion of the image. The correction amount calculating means preferably calculates the correction amount such that the correction amount is increased as the density of the main portion of the image shown by the information regarding this density is biased to a highlight side of the image. Thus, a reproduced image having a suitable image quality can be obtained irrespective of the density of the main portion of the image recorded onto the film.

In the seventh structure, an image recorded on a predetermined film to be reproduced is divided into many divisional images and the divisional images are decomposed into a plurality of colors and are optically measured. Data obtained by the optical measurement are stored in the memory means. Further, image characteristic amount information including information regarding a contrast of the image recorded on the predetermined film to be reproduced is calculated. A correction amount for correcting the reproduction conditions in accordance with a difference in kinds of film is calculated on the basis of film characteristic difference information indicating a difference between characteristics of the predetermined film and film characteristics of a predetermined reference film, and the calculated image characteristic amount information. The reproduction conditions of the image to be reproduced are determined using a reference reproduction condition for suitably reproducing an image recorded on the reference film on a reproducing material and the calculated correction amount. Accordingly, similar to the first structure of the present invention, the reproduction conditions can be determined such that a reproduced image having a suitable image quality can be obtained from each of various kinds of films having different film characteristics.

An image reproducing apparatus having an eighth structure of the present invention has setting means for setting a reference film and also has reference reproduction condition setting means for setting a reference reproduction condition for suitably reproducing an image recorded on a reference film set by the setting means onto a reproducing material using a reference filter. This image reproducing apparatus also comprises photometric means for dividing an image recorded on a predetermined film to be reproduced into many divisional images and decomposing the divisional images into a plurality of colors and optically measuring these colors. The image reproducing apparatus also comprises memory means for storing data obtained by the optical measurement of the photometric means. The image reproducing apparatus also comprises image characteristic amount calculating means for calculating image characteristic amount information including information regarding a contrast of the image to be reproduced on the basis of the data obtained by the optical measurement of the photometric means. The image reproducing apparatus also comprises correction amount calculating means for calculating a correction amount for correcting reproduction conditions in accordance with a difference in kinds of film on the basis of film characteristic difference information showing a difference between characteristics of the predetermined film and film characteristics of the reference film set by the setting means, and the image characteristic amount information calculated by the image characteristic amount calculating means. The image reproducing apparatus also comprises reproduction condition determining means for determining the reproduction conditions of the image to be reproduced by using the reference reproduction condition set by the reference reproduction condition setting means and the correction amount calculated by the correction amount calculating means. The image reproducing apparatus further comprises reproducing means for reproducing the image to be reproduced onto the reproducing material in accordance with the reproduction conditions determined by the reproduction condition determining means.

In a ninth structure of the present invention, the image reproducing apparatus further comprises judging means for judging a kind of the predetermined film in the above eighth structure. Further, in the ninth structure, the memory means stores the data obtained by the optical measurement of the photometric means while separating these data for kinds of film. The image reproducing apparatus of the ninth structure further comprises film characteristic difference calculating means for calculating the film characteristic difference information on the basis of data for film which is the same kind as the predetermined film stored in the memory means. The correction amount calculating means calculates the correction amount on the basis of the film characteristic difference information calculated by the film characteristic difference calculating means.

In a tenth structure of the present invention, the image reproducing apparatus having the eighth structure further comprises judging means for judging the kind of the predetermined film. This image reproducing apparatus further comprises film characteristic difference memory means for storing the film characteristic difference information showing the difference between the characteristics of the predetermined film and the film characteristics of the reference film while separating the film characteristic difference information for kinds of film. The correction amount calculating means calculates the correction amount on the basis of the film characteristic difference information of the same film as the predetermined film stored in the film characteristic difference memory means.

In an eleventh structure of the present invention, the image reproducing apparatus having the eighth structure further comprises film characteristic difference calculating means for calculating the film characteristic difference information based on data of a plurality of images recorded onto the predetermined film stored in the memory means.

In a twelfth structure of the present invention, the correction amount calculating means in one of the eighth to eleventh structures calculates the correction amount such that this correction amount is increased as the contrast of an image shown by the information regarding the contrast is increased.

In a thirteenth structure of the present invention, the image characteristic amount information includes information regarding the density of a main portion of the image to be reproduced in one of the eighth to eleventh structures. Further, the correction amount calculating means calculates the correction amount such that this correction amount is increased as the density of the main portion shown by the information regarding the density of the main portion of the image is biased to a highlight side of the image.

In a method of determining reproduction conditions having a fourteenth structure of the present invention, a reference reproduction condition for suitably reproducing an image recorded onto the reference film onto a reproducing material is set by using a reference filter. An image recorded on a predetermined film to be reproduced is divided into a plurality of divisional images and the divisional images are decomposed into a plurality of colors and are optically measured. A kind of the predetermined film is judged. Image characteristic amount information including information regarding a contrast of the image to be reproduced is calculated on the basis of the data obtained by the optical measurement. A correction amount for correcting reproduction conditions in accordance with a difference in kinds of film is calculated on the basis of film characteristic difference information showing a difference between characteristics of the predetermined film and film characteristics of the predetermined reference film, and the calculated image characteristic amount information. The reproduction conditions of the image to be reproduced are determined by using the reference reproduction condition and the calculated correction amount.

In the eighth structure, the reference reproduction condition for suitably reproducing an image recorded onto the reference film set by the setting means onto the reproducing material is set by the reference reproduction condition setting means using the reference filter. An image recorded on the predetermined film to be reproduced is divided into a plurality of divisional images by the photometric means. The divisional images are decomposed into a plurality of colors and are optically measured. Further, data obtained by the optical measurement of the photometric means are stored in the memory means. The image characteristic amount calculating means calculates image characteristic amount information including information regarding a contrast of the image to be reproduced. The correction amount calculating means calculates a correction amount for correcting reproduction conditions in accordance with a difference in kinds of film on the basis of film characteristic difference information showing a difference between characteristics of the predetermined film and film characteristics of the reference film, and the image characteristic amount information calculated by the image characteristic amount calculating means. The reproduction condition determining means determines the reproduction conditions of the image to be reproduced by using the reference reproduction condition set by the reference reproduction condition setting means and the correction amount calculated by the correction amount calculating means.

In the above eighth structure, the image characteristic amount is calculated on the basis of the data obtained by the optical measurement of the photometric means. These data may be constructed by data showing a photometric value or a density value. This image characteristic amount information may be constructed by information regarding a degree of a reduction in quality of the reproduced image caused by the film characteristic difference. For example, the image characteristic amount information may further include information showing presence or absence of gradation of the image, information regarding the density of a main portion of the image as described later, etc. in addition to information regarding a contrast of the image.

The correction amount calculating means calculates the correction amount taking account of the image characteristic amount information including the information regarding contrast of an image in addition to the film characteristic difference information showing the difference between the characteristics of the predetermined film and the film characteristics of a reference film. Since the image characteristic amount information is considered, the reduction in quality of the reproduced image caused by the film characteristic difference (especially, a color unbalance) is corrected as a correction amount for correcting the reproduction conditions in accordance with the difference in film irrespective of a change in image characteristic amount including contrast. Thus, it is possible to obtain a correction amount capable of correcting the reproduction conditions so as to obtain a suitable reproduced image equivalent to that obtained when the reference film is used.

The above eighth structure also uses a predetermined reproducing material having characteristics conforming to the film characteristics of the reference film set by the setting means. The reference reproduction condition setting means can set reproduction conditions for suitably reproducing an image recorded on the reference film onto the predetermined reproducing material as the reference reproduction condition. Thus, when an image recorded on the predetermined film of a film different from the reference film is reproduced, the reproduction condition determining means can determine the reproduction conditions by using the reference reproduction condition and the above correction amount such that the image recorded on the predetermined film to be reproduced can be suitably reproduced onto the predetermined reproducing material similar to the image recorded on the reference film.

Further, the reference reproduction condition setting means sets the reference reproduction condition by using the reference filter. The setting of the reference reproduction condition using the reference filter is already proposed in JP-A-3-287151 by the inventors of this patent application. For example, the reference reproduction condition can be determined such that a reproducing sensitive material as the reproducing material is exposed through the reference filter with an exposure amount calculated on the basis of a photometric value optically measured by the reference filter and a standard reproduction condition. Further, the reference reproduction condition can be determined such that a reproducing density obtained by developing the exposed reproducing sensitive material is equal to a target density. The target density can use the density of a reproduced image obtained by reproducing the image recorded onto the reference film in the standard reproduction condition. When the reference reproduction condition is set by using the reference filter, maintenance and control of the reference reproduction condition for correcting a change in operation of the image reproducing apparatus with the passage of time can be also performed by using the reference filter. Accordingly, no correction accuracy of the reproduction conditions at times of conditional setting and maintenance control is reduced by fading, dirt, etc. of a film for conditional setting as in a case in which the reference reproducing condition is set by using the conditional setting film. Accordingly, a suitable reproduction condition can be set as the reference reproduction condition.

In the eighth structure, the reproduction conditions can be obtained with respect to the image recorded on the film of a film different from the reference film by correcting the reference reproduction condition so as to obtain the reproduced image having image quality equivalent to that obtained in a case in which the image recorded on the reference film is recorded onto the reproducing material. Accordingly, a reproduced image having a suitable image quality from each of various kinds of films having different film characteristics can be obtained by reproducing an image according to the reproduction conditions by the reproducing means.

As mentioned above, the reference reproduction condition can be determined such that the reproducing sensitive material as the reproducing material is exposed through the reference filter and a reproducing density obtained by developing the exposed reproducing sensitive material is equal to the target density. In this case, a change in printing density with respect to a large or small exposure amount to a film is reflected by the reference production condition. In normal exposure control, this change is corrected by a so-called slope coefficient. An inclination of this change is called a slope. It is not necessary to set the slope coefficient with respect to the reference film since the change in printing density is reflected by the reference reproduction condition. A slope difference every film is reflected by film characteristic difference information if a film characteristic difference can be also obtained with high accuracy with respect to a film except for the reference film. Accordingly, the possibility of setting the slope coefficient in error is greatly reduced so that suitable reproduction conditions can be obtained.

The above information regarding contrast can be constructed by using information showing contrast itself as one example. For example, this information can be constructed by a density difference between high and low density portions of an image. As mentioned above, there is a correlation between an exposure amount in recording of an image onto a film and a contrast of the image recorded onto the film. When an image having gradation is recorded onto the film, this image recorded onto the film has hard gradation if the exposure amount is large. Accordingly, contrast of this image is high. In contrast to this, if the exposure amount is small, the image recorded onto the film has soft gradation so that the image contrast is low. Information (such as an exposure value) showing the exposure amount in recording of the image to the film can be used as the information regarding contrast on the basis of these contents.

As described in the ninth structure, the judging means judges the kind of the predetermined film. Data obtained by the optical measurement of the photometric means are stored in the memory means while separating these data for kinds of film. The film characteristic difference calculating means can obtain the film characteristic difference information by calculating this film characteristic difference information on the basis of data or film which is the same kind as the predetermined film stored in the memory means. As described in the third structure, the film characteristic difference information showing the difference in film characteristics of the reference film may be stored in the film characteristic difference memory means while separating the film characteristic difference information for kinds of film.

In the ninth structure, it is not necessary to store the film characteristic difference information in advance. Accordingly, when the film of a new film is developed and manufactured, it is not necessary to calculate a new film characteristic difference corresponding to this new film and additionally store information showing the calculated film characteristic difference. In the eleventh structure, no processing for calculating the film characteristic difference is required so that processing for determining the production conditions is simplified and a processing time can be shortened.

The kind of the predetermined film is not necessarily judged as mentioned above to obtain the film characteristic difference information. It is considered that data obtained by optically measuring each of a plurality of images recorded onto the same film reflect characteristics of this film. As described in the fourth structure, the film characteristic difference information may be calculated by the film characteristic difference calculating means on the basis of data of the plurality of images recorded onto the predetermined film and stored in the memory means. In the above case, for example, the above data do not necessarily reflect the film characteristics when a large part of the plurality of images is constructed by an image which tends to cause color failure. Therefore, there are problems of reducing an accuracy of the film characteristic difference shown by the calculated film characteristic difference information, etc. However, it is not necessary to judge the kind of the predetermined film. Further, suitable reproduction conditions can be obtained with respect to a film having no DX code and difficult to judge the film such as a film having each of sizes 110, 126, 120, etc.

The correction amount calculating means can calculate the correction amount concretely as in the twelfth structure such that the correction amount is increased as the contrast of an image shown by the information regarding contrast included in the image characteristic amount information is increased. Thus, when the image contrast is high, i.e., when a reducing degree of the quality of a reproduced image is supposed to be large, the reproduction conditions are corrected with a larger correction amount. Accordingly, when the contrast of an image recorded on a film is high, the image can be reproduced in the same image quality as a gray full image (contrast=0) having no gradation and an image having a relatively low contrast and able to be reproduced in a preferable image quality in comparison with the conventional case. Therefore, the image can be reproduced to the reproducing material in a suitable image quality irrespective of a high or low contrast of the image recorded on the film.

A color unbalance of the image, etc. are easily visualized particularly in a highlight portion of the image. A main portion of the image such as an image portion corresponding to a main subject is particularly noticed within this image. Accordingly, when a density of the main portion of this image is close to an image density corresponding to the highlight portion of the image, the color unbalance of the reproduced image, etc. are particularly marked. Therefore, as described in the thirteenth structure of the present invention, the image characteristic amount information is constructed by including information regarding the density of the main portion of the image. The correction amount calculating means preferably calculates the correction amount such that the correction amount is increased as the density of the main portion of the image shown by the information regarding this density is biased to a highlight side of the image. Thus, a reproduced image having a suitable image quality can be obtained irrespective of the density of the main portion of the image recorded onto the film.

In the fourteenth structure, the reference reproduction condition for suitably reproducing an image recorded on the reference film onto the reproducing material is set by using the reference filter. An image recorded on the predetermined film to be reproduced is divided into a plurality of divisional images and the divisional images are decomposed into a plurality of colors and are optically measured. Data obtained by the optical measurement are stored in the memory means. Image characteristic amount information including information regarding a contrast of the image recorded on the predetermined film to be reproduced is calculated. A correction amount for correcting reproduction conditions in accordance with a difference in kinds of film is calculated on the basis of film characteristic difference information showing a difference between characteristics of the predetermined film and film characteristics of the predetermined reference film, and the calculated image characteristic amount information. The reproduction conditions of the image to be reproduced are determined by using the calculated correction amount and the reference reproduction condition for suitably reproducing the image recorded on the reference film onto the reproducing material. Accordingly, similar to the eighth structure, the reproduction conditions can be determined such that a reproduced image having a suitable image quality is obtained from each of various kinds of films having different film characteristics.

An image reproducing apparatus having a fifteenth structure of the present invention comprises photometric means for dividing an image recorded on a predetermined film to be reproduced into many divisional images and decomposing the divisional images into a plurality of colors and optically measuring these colors. The image reproducing apparatus of the fifteenth structure also comprises memory means for storing data obtained by optically measuring a plurality of images recorded onto at least a film which is the same kind as the predetermined film. The image reproducing apparatus of the fifteenth structure also comprises color balance calculating means for calculating an average color balance of the plurality of images in a density region corresponding to an image density corresponding to a highlight or main portion of an image to be reproduced on the basis of the data obtained by optically measuring the plurality of images recorded onto the film of the same film as the predetermined film stored in the memory means. The image reproducing apparatus of the fifteenth structure also comprises reproduction condition determining means for correcting data corresponding to a non-highlight portion of the image to be reproduced among the data of this image obtained by the optical measurement of the photometric means in accordance with the color balance calculated by the color balance calculating means. The reproduction condition determining means determines reproduction conditions of the image to be reproduced by using these corrected data and data corresponding to the highlight portion of the image to be reproduced. The image reproducing apparatus of the fifteenth structure further comprises reproducing means for reproducing the image to be reproduced onto a reproducing material on the basis of the reproducing conditions determined by the reproducing condition determining means.

In a sixteenth structure of the present invention, the reproduction condition determining means in the fifteenth structure determines the reproduction conditions on the basis of values obtained by respectively providing predetermined weight coefficients to the corrected data and the data corresponding to the highlight portion of the image to be reproduced and adding these weighted data to each other. Further, the reproduction condition determining means changes the weight coefficients in accordance with a ratio of the data corresponding to the highlight portion of the image to be reproduced and the data corresponding to the non-highlight portion of this image among the data obtained by the optical measurement of the photometric means.

In a seventeenth structure of the present invention, the image reproducing apparatus having the fifteenth structure further comprises judging means for judging a kind of the predetermined film. Further, the memory means stores data obtained by optically measuring a plurality of images respectively recorded on a plurality of films of different kinds such that these data correspond to the kinds of film.

In an eighteenth structure of the present invention, the memory means in the fifteenth structure stores only data obtained by optically measuring the plurality of images recorded onto the predetermined film as data obtained by optically measuring a plurality of images recorded onto a film which is the same kind as the predetermined film.

In a method of determining reproduction conditions having a nineteenth structure of the present invention, an image recorded on a predetermined film to be reproduced is divided into many divisional images and the divisional images are decomposed into a plurality of colors and these colors are optically measured. An average color balance of a plurality of images recorded onto a film which is the same kind as the predetermined film is calculated in a density region corresponding to an image density corresponding to a highlight or main portion of an image to be reproduced on the basis of data obtained by optically measuring these plural images. Data corresponding to a non-highlight portion of the image to be reproduced among the data of this image obtained by the optical measurement are corrected in accordance with the calculated color balance. Reproduction conditions of the image to be reproduced are determined by using these corrected data and data corresponding to the highlight portion of the image to be reproduced.

In the fifteenth structure, the image recorded on the predetermined film to be reproduced is divided into many divisional images by the photometric means. The divisional images are decomposed into a plurality of colors and are optically measured. The memory means stores data obtained by optically measuring a plurality of images recorded onto at least a film which is the same kind as the predetermined film. For example, the data obtained by the optical measurement can use photometric data, selective data selecting data required to determine the reproduction conditions from the photometric data, sorting and calculating results obtained by sorting the photometric or selective data every density and respectively calculating averages of the sorted data, etc. For example, the selective data can be provided by removing data of a high saturation portion of an image causing color failure from the photometric data.

The color balance calculating means calculates an average color balance of the plurality of images in a density region corresponding to an image density corresponding to a highlight or main portion of an image to be reproduced on the basis of the data obtained by optically measuring the plurality of images recorded onto the film of the same film as the predetermined film stored in the memory means. This average color balance of the plurality of images is calculated by using data of the plurality of images. Accordingly, this average color balance reflects film characteristics of the predetermined film in the density region corresponding to the image density corresponding to the highlight or main portion of the image to be reproduced. Therefore, gray or constant hue close to gray is provided with respect to this average color balance.

Color saturation is generally low in the non-highlight portion of the image in comparison with the highlight portion. Accordingly, it is difficult to detect an image portion causing color failure even when this image portion exists. However, when the average color balance of the plurality of images is calculated in the density region corresponding to the density of the highlight portion of the image to be reproduced, it is not necessary to use data corresponding to the non-highlight portion of each of the plurality of images among the data stored in the memory means. Therefore, the color balance can be easily calculated by removing data of the image portion causing color failure from the image data.

There is a high possibility that the density of a main portion of the image is generally equal to the density of the highlight portion of the image or the density of an image portion near the highlight portion even when the average color balance of the plurality of images is calculated in the density region corresponding to the image density corresponding to the main portion of the image to be reproduced. Accordingly, there is a high possibility of calculating the average color balance of the plurality of images in the density region corresponding to the image density corresponding to the main portion without using any data of the image portion causing color failure as mentioned above.

For example, the image density corresponding to the main portion of the image to be reproduced can be calculated by extracting a region corresponding to the main portion of this image and calculating an image density (e.g., a three-color average density, etc.) in a region corresponding to the extracted main portion. The extraction of the region corresponding to the main portion of the image is already proposed by the inventors of this patent application in JP-A-5-165119, etc. As shown in this laid-open patent, a color region having a predetermined shape may be extracted and selected as the main portion of this image. Otherwise, a region corresponding to the main portion of this image may be estimated and extracted on the basis of facts in which the main portion of the image is statistically located in a central portion of the image with high probability and a peripheral portion of the image is a background portion with high probability, etc.

The reproduction condition determining means corrects data corresponding to the non-highlight portion of the image to be reproduced among the data of this image obtained by the optical measurement of the photometric means in accordance with the color balance calculated by the color balance calculating means. Thus, when an image portion causing color failure exists in the non-highlight portion of the image, data corresponding to the non-highlight portion of the image are corrected such that these data are not badly influenced by this image portion in determination of reproduction conditions. The data corresponding to the non-highlight portion of the image are preferably corrected such that a difference or ratio of densities of the non-highlight portion shown by these data every color is equal to a value reflecting the above color balance and no average value of these densities every color is changed. No information regarding the density of the non-highlight portion of the image is lost by correcting the data corresponding to the non-highlight portion such that no average density value shown by the data corresponding to the non-highlight portion of the image every color is changed. Accordingly, the density of the image to be reproduced can be suitably reflected in the reproduction conditions.

The reproduction condition determining means determines the reproduction conditions by using the above corrected data and data corresponding to the highlight portion of the image to be reproduced. Accordingly, similar to JP-A-5-33451, the reproduction conditions can be determined taking account of the visual characteristics of a man such that the density of the highlight portion of the image to be reproduced and a color balance of this highlight portion are seriously considered on the basis of the data corresponding to the highlight portion of the image to be reproduced. For example, when the image to be reproduced is photographed by a light source of a different kind or is photographed on a film changing in film characteristics by aging deterioration, etc., data corresponding to the highlight portion of the image to be reproduced are reflected as bias of a color balance. Accordingly, these data can be reflected in the reproduction conditions.

As mentioned above, the reproduction condition determining means also determines the reproduction conditions by using the corrected data reflecting the characteristics of a film on which the image to be reproduced is recorded. Accordingly, when the density of a main portion of the image to be reproduced such as an image of a backlight scene is greatly different from the density of the highlight portion of the image and a highlight portion having a small area exists in the image to be reproduced, a bad influence caused by using data of the highlight portion of this image is reduced in comparison with a case in which a weight of the data corresponding to the highlight portion of the image to be reproduced is simply increased. The reproduction conditions can be determined on the basis of the corrected data reflecting the above film characteristics such that the main portion of the image has a suitable color balance according to the film characteristics. Accordingly, the reproduction conditions can be determined in accordance with the film characteristics different every film such that the main portion of the reproduced image has a suitable color balance even when contents of the image to be reproduced show that it is not preferable to seriously consider the highlight portion as mentioned above.

The reproducing means reproduces the image to be reproduced onto the reproducing material on the basis of the reproduction conditions determined as mentioned above. Accordingly, a reproduced image having a suitable image quality and causing no color failure and no bias of the color balance of the main portion of the image, etc. can be obtained with high probability irrespective of the image to be reproduced and the kind of a film on which the image to be reproduced is recorded.

As described in the sixteenth structure, the reproduction condition determining means in the fifteenth structure determines the reproduction conditions on the basis of values obtained by respectively providing predetermined weight coefficients to the corrected data and the data corresponding to the highlight portion of the image to be reproduced and adding these weighted data to each other. Further, the reproduction condition determining means preferably changes the weight coefficients in accordance with a ratio of the data corresponding to the highlight portion of the image to be reproduced and the data corresponding to the non-highlight portion of this image among the data obtained by the optical measurement of the photometric means. For example, each of the weight coefficients can be changed such that a weight coefficient provided to the data corresponding to the highlight portion of the image to be reproduced is reduced as a ratio of these data is reduced.

In accordance with the above structure, for example, when a highlight portion having a small area exists within the image to be reproduced, the weight coefficient provided to the data corresponding to the highlight portion of the image to be reproduced can be reduced. Accordingly, an influence of the highlight portion of a small area on the reproduction conditions is reduced. Accordingly, the reproduction conditions can be set such that the color balance of a main portion of the image is suitable even when the highlight portion of a small area exists within the image to be reproduced. Therefore, a reproduced image having a suitable image quality can be obtained with higher probability.

No data stored in the memory means are limited to only data obtained by optically measuring an image recorded onto a film of the same kind as the predetermined film. As described in the seventeenth structure, the judging means may judge the kind of the predetermined film. Further, the memory means may store data obtained by optically measuring a plurality of images respectively recorded on a plurality of films of different films such that these data correspond to the films.

In the color balance calculating means, it is necessary to calculate a color balance by using only data obtained from an image recorded onto the film of the same kind as the predetermined film. The color balance calculated by the color balance calculating means accurately reflects film characteristics of the kind of the predetermined film as the number of data to be calculated is increased. In contrast to this, in the seventeenth structure, data obtained by optically measuring a plurality of images respectively recorded on a plurality of films of different films can be accumulated while separating these data for kinds of film and sequentially storing the separated data to the memory means for every film. Accordingly, a suitable value reflecting the film characteristics is calculated as the color balance as the number of data accumulated and stored in the memory means is increased. Therefore, more suitable reproduction conditions can be obtained.

As described in the eighteenth structure, the memory means may store only data obtained by optically measuring the plurality of images recorded on the predetermined film as data obtained by optically measuring a plurality of images recorded onto a film of the same kind as the predetermined film. In this eighteenth structure, the color balance calculating means can also calculate the color balance by using only data obtained from an image recorded onto the film (the predetermined film in this case) of the same kind as the predetermined film.

In this structure, no data obtained by the optical measurement are sequentially accumulated and stored while separating these data for kinds of film. Namely, only data of the predetermined film recording an image to be reproduced are stored in the memory means. Accordingly, there is a possibility of increasing an error included in the color balance calculated by the color balance calculating means in comparison with the seventeenth structure. However, it is not necessary to judge the kind of the predetermined film. Further, for example, suitable reproduction conditions can be obtained with respect to a film having no DX code and difficult to judge the film such as a film having each of sizes 110, 126, 120, etc.

In the nineteenth structure, an image recorded on a predetermined film to be reproduced is divided into many divisional images and the divisional images are decomposed into a plurality of colors and these colors are optically measured. An average color balance of a plurality of images recorded onto a film which is the same kind as the predetermined film is calculated in a density region corresponding to an image density corresponding to a highlight or main portion of an image to be reproduced on the basis of data obtained by optically measuring these plural images. Data corresponding to a non-highlight portion of the image to be reproduced among the data of this image obtained by the optical measurement are corrected in accordance with the calculated color balance. Reproduction conditions of the image to be reproduced are determined by using these corrected data and data corresponding to the highlight portion of the image to be reproduced. Accordingly, similar to the first structure of the present invention, the reproduction conditions can be determined such that a reproduced image having a suitable image quality can be obtained with high probability irrespective of the image to be reproduced and the kind of a film on which the image to be reproduced is recorded.

BRIEF DESCRIPTION OF THE DRAWINGS

FIG. 6A is a block diagram conceptually showing the constructions of film kind sorting means, reference exposure condition setting means and photometric data memory means;

FIG. 6B is a block diagram conceptually showing the constructions of film kind sorting means, reference exposure condition setting means and photometric data memory means;

FIG. 9A is a diagram for explaining film characteristics;

FIG. 9B is a diagram for explaining film characteristics;

FIG. 9C is a diagram for explaining film characteristics;

DESCRIPTION OF THE PREFERRED EMBODIMENTS

The preferred embodiments of an image reproducing apparatus and a method of determining reproduction conditions in the present invention will next be described in detail with reference to the accompanying drawings. In the following description, numeric values causing no problems in the present invention are used. However, the present invention is not limited to these numeric values.

Embodiment 1

Figure 5:
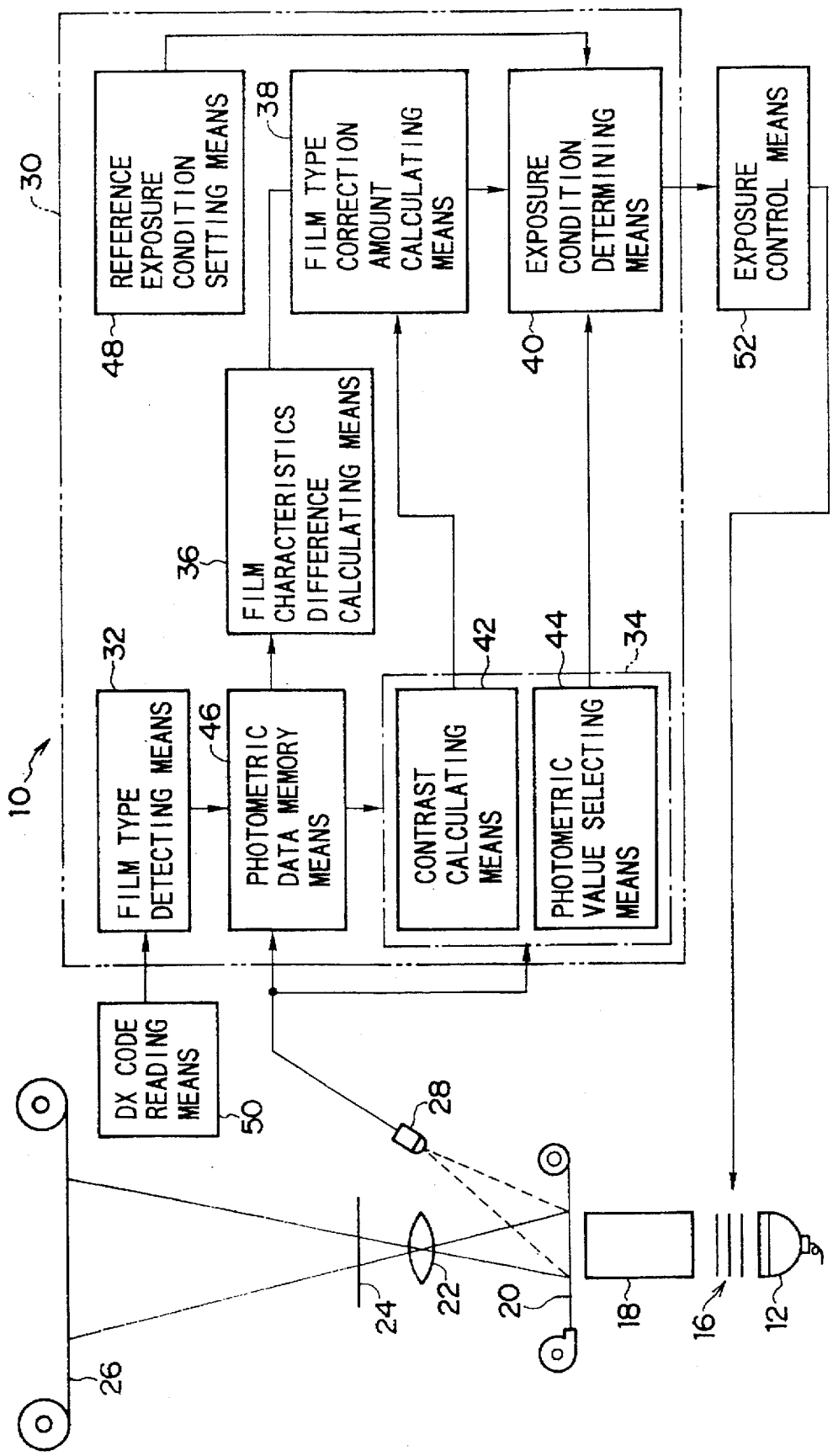
FIG. 5 is a block diagram showing the schematic construction of a photographic printer in accordance with a first embodiment of the present invention.

FIG. 5 shows the basic arrangement of the photographic printing apparatus 10 as an image reproducing apparatus of the present invention. A color negative film set on the negative carrier (not shown) is transported to the printing position by the negative carrier.

Disposed beneath the printing position are a mirror box 18 and a lamp house 12 which accommodates a halogen lamp. A light adjustment filter device 16, which includes three CC filters of cyan, magenta and yellow, is disposed between the mirror box 18 and lamp house 12.

Over the printing position, there are disposed a lens 22, a black shutter 24 and a color paper 26 in this order, and a light beam coming from the lamp house 12 and passing through the filters of the light adjustment filter device 16, mirror box 18 and negative film 20 is focused on the color paper 26 by the lens 22. Among a variety of film types of negative film 20 available, a reference film is predetermined in this embodiment, and color paper 26 that matches in characteristics with the reference film is used.

The photographic printing apparatus 10 includes a photometric device 28 as a light metering means of the present invention and a DX code reading means 50. The photometric device 28 has a view angle with the optical axis of the focusing optical system and is located so that light metering can be done for the image recorded on the negative film 20. The photometric device 28 is formed of a 2-dimensional image sensor or line sensor, and it measures the light intensity of each color component of red, green and blue passing through numerous pixels which are small divisions of the image recorded on the negative film 20.

The DX code reading means 50 reads the DX code of the film type indicative of the manufacturer's name, film sensitivity and film family recorded in various forms on the negative film 20 or on the film cartridge. For example, the DX code reading means 50 is designed to read a DX code by sensing a pattern of electrodes formed on the film cartridge, or it can be a bar code reader which reads an optical DX code printed on the negative film 20 or the film cartridge, or it can be a magnetic head which reads a magnetic DX code recorded on the negative film 20.

The photometric device 28 and DX code reading means 50 are connected to the controller 30 which is formed of a microcomputer and its peripheral devices. It should be noted that various processings implemented by the controller 30 are shown in FIG. 5 as a film type detecting means 32, image feature value calculating means 34, film characteristics difference calculating means 36, film type correction amount calculating means 38, and exposure condition determining means 40. The controller 30 incorporates a photometric data memory means 46 and a reference exposure condition setting means 48. These means will be explained in brief in the following.

The film type detecting means 32 includes a non-volatile rewritable memory medium such as EEPROM (Electrically Erasable Programmable ROM), RAM provided with a backup power source, or a floppy disk, hard disk, optomagnetic disk or memory card. This memory medium has a record of multiple DX codes as shown in FIG. 6A. The film type detecting means 32 collates the DX code detected by the DX code reading means 50 with the DX codes stored in the memory medium thereby to identify the film type of the negative film 20. The film type detecting means 32 and DX code reading means 50 in unison constitute the film identification means of the present invention.

The photometric data memory means 46, which corresponds to the memory means of the present invention, comprises a non-volatile rewritable memory medium similar to that mentioned above. The photometric memory means 46 has channel data storage areas and photometric data storage areas as shown in FIG. 6A. The channel data storage area has a record of channel data for each of DX codes including the channel number, film name, color balance value, and slope factor of under-exposure image or over-exposure image. The channel data may be a correction amount used to provide channel data of each film type by correcting the channel data of the reference film recorded in the reference exposure condition setting means 48 explained later. The arrow marks shown in FIGS. 6A and 6B denote the correspondence of data. The photometric data storage area stores cumulatively, in correspondence to the DX codes as mentioned previously in connection with form 2 of the present invention, photometric data provided by the photometric device 28 based on the light metering for images. In order to avoid the overflow of the photometric data memory means 46, data may be stored together with the date of storage or date of data access so that old data or old-accessed data are erased with or without user's designation, as already proposed by the inventors of the present invention in Japanese patent publication JP-A-HEI5-297473.

Although FIGS. 6A and 6B show examples of record in which channel data and photometric data are stored in one-to-one correspondence with DX codes, other record forms are also possible, e.g., channel data and photometric data may be stored in correspondence to multiple DX codes of multiple relevant film types in terms of the film manufacturer, film characteristics, production year, etc.

The reference exposure condition setting means 48 comprises a non-volatile rewritable memory medium similar to those mentioned above, and it has a channel data storage area and a photometric data storage area for a certain DX code (DX code "A" in FIGS. 6A and 6B). The DX code "A" is relevant to the reference film of this embodiment. Recorded in the channel data storage area of the reference exposure condition setting means 48 are various parameters indicative of the exposure condition (reference exposure condition) for printing the image of the negative film 20 onto the color paper 26 properly, in addition to the channel data mention above.

For the reference film, the reference exposure condition is modified periodically (management of condition) by using a prepared condition setting film so that the proper reference exposure condition is maintained. The reference exposure condition setting means corresponds to the reference image reproducing condition setting means of the present invention.

The photometric data produced by the photometric device 28 for the image of the negative film 20 is also fed to the image feature value calculating means 34, which consists of a contrast calculating means 42 and photometric value selecting means 44. The contrast calculating means 42 calculates the image contrast separately for each color of red, green and blue based on the density data converted from the photometric data provided by the photometric device 28, as will be explained later. The photometric value selecting means 44 normalizes the photometric data provided by the photometric device 28 by using the record of photometric data in the photometric data storage area of the photometric data memory means 46, selects only photometric data necessary for the determination of exposure condition from among the normalized photometric data, and delivers the selected data to the exposure condition determining means 40.

Data read out of the photometric data memory means 46 is fed to the film characteristics difference calculating means 36, which then calculates the difference of film characteristics between the negative film 20 set currently on the photographic printing apparatus 10 and the negative film 20 of the reference film type and delivers the calculation result to the film type correction amount calculating means 38 as the correction amount calculating means of the present invention. The film type correction amount calculating means 38, which further receives the image contrast calculated by the contrast calculating means 42, calculates the correction amount of exposure condition relevant to the film type and delivers the calculation result to the exposure condition determining means 40.

The exposure condition determining means 40 receives the photometric value selected by the photometric value selecting means 44, correction amount calculated by the film type correction amount calculating means 38, and reference exposure condition read out of the reference exposure condition setting means 48, and it determines the exposure condition of the image of the negative film 20 based on these data and delivers the determined exposure condition to the exposure control means 52. The exposure control means 52 operates the light adjustment filter device 16 based on the received exposure condition thereby to control the printing exposure condition of the color paper 26.

Figure 7:
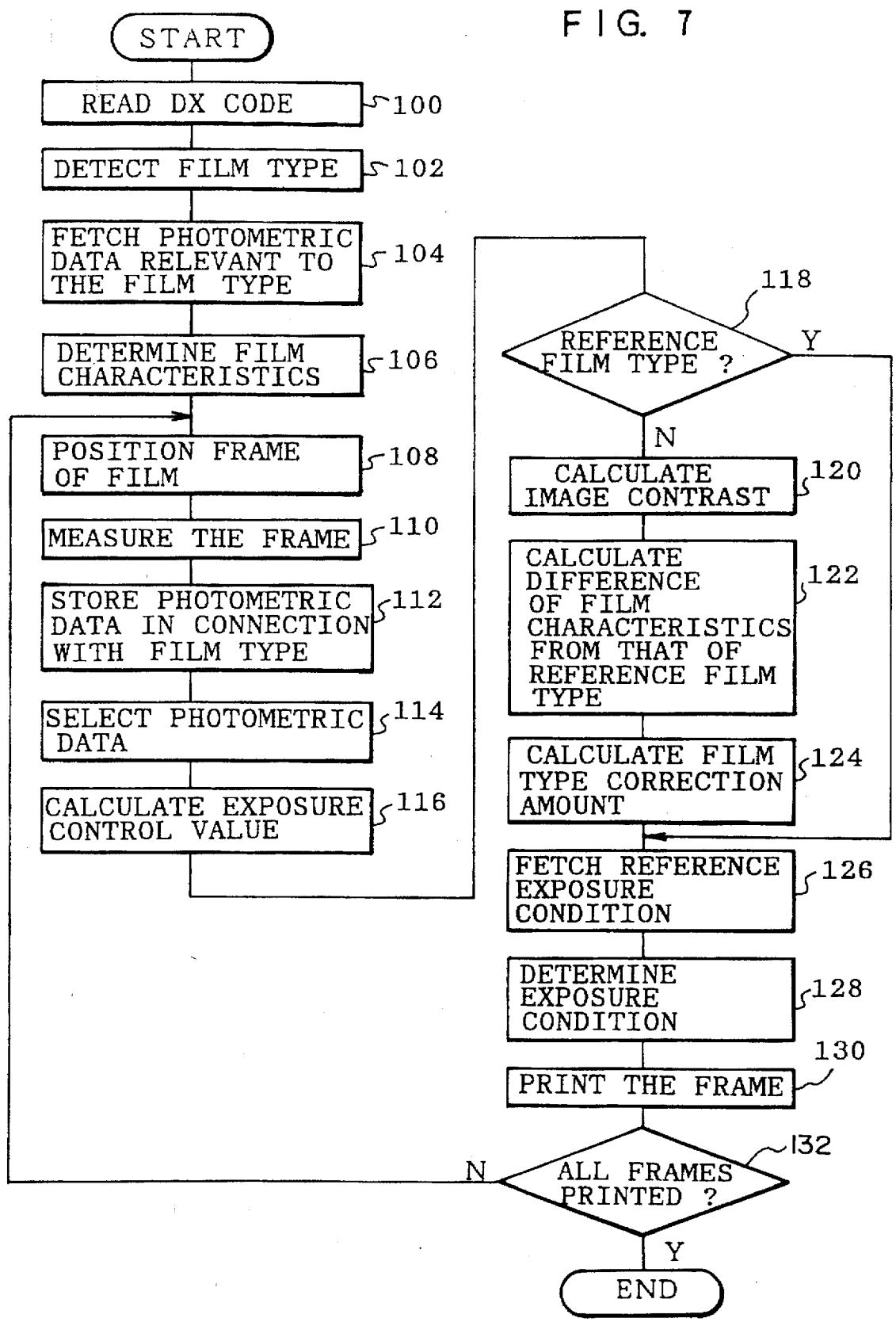
FIG. 7 is a flow chart for explaining contents of exposure condition determining processing in a controller as an operation of the photographic printer in the first embodiment.

Next, the image printing process conducted by the controller 30 for transferring the image of the negative film 20 onto the color paper 26 based on this embodiment will be explained in detail with reference to the flowchart of FIG. 7. This process is initiated after the negative film 20 is set on the photographic printing apparatus 10.

In step 100, the DX code reading means 50 reads the DX code recorded on the negative film 20. In step 102, the DX code record is searched for the DX code read by the DX code reading means 50 so that the film type of the negative film 20 is identified. This operation corresponds to the film type detecting means 32 in FIG. 5.

In determining the exposure condition, as will be explained later, if the DX code reading means 50 fails to read the DX code, or in case the image of a negative film 20 having no registered DX code (e.g., 110, 126 or 120-sized negative film) is to be printed, the exposure condition may be determined based on data stored in a negative channel specified by the user.

The photometric data memory means 36 stores cumulatively photometric data of individual pixels for red, green and blue separately detected by the photometric device 28 for each film type and sampled at the printing of images of negative films 20 in the past.

The processing in step 104 fetches photometric data for the film type identified in step 102 from among photometric data stored in the photometric data memory means 36, and the processing in step 106 determines the film characteristics of this film type based on the fetched photometric data. The film characteristics is given in the form of characteristic curves in this embodiment.

Figure 8A:
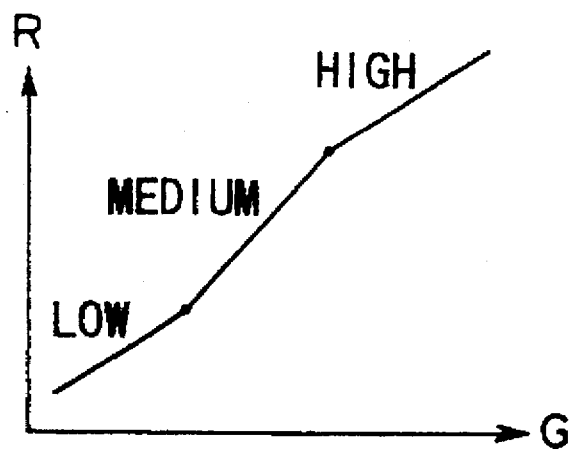
FIG. 8A is a graph showing one example of a film characteristic curve.
Figure 8B:
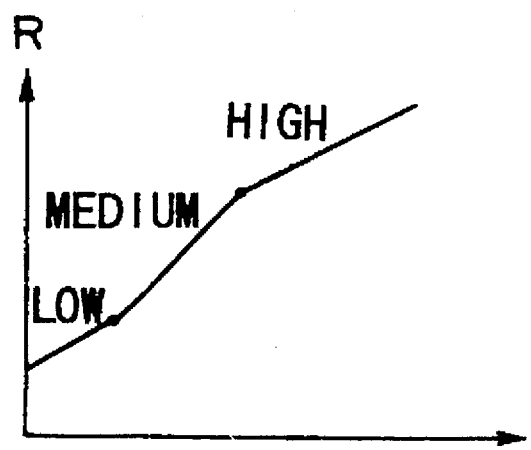
FIG. 8B is a graph showing one example of a film characteristic curve.

Based on the photometric data of red, green and blue fetched in step 104, the reference value of the negative film 20 to be printed (e.g., the green density or three-color average density) is calculated, and the ratios of densities of red, green and blue of the photometric data with respect to the reference value are evaluated thereby to obtain the characteristic curves of red, green and blue of the negative film 20. For example, FIG. 8A shows the characteristic curve of red density against the green density, and FIG. 8B shows the characteristic curve of red density against the three-color average density. Based on these characteristic curves, the gradient gu of the portion of under-exposure and the gradient go of the portion of over-exposure as shown in FIG. 9A can be used for the film characteristics. Alternatively, the average gradient (g1+g2+g3)/3 shown in FIG. 9B, or the gradients g1 and g2 shown in FIG. 9B can also be used.

Figure 10:
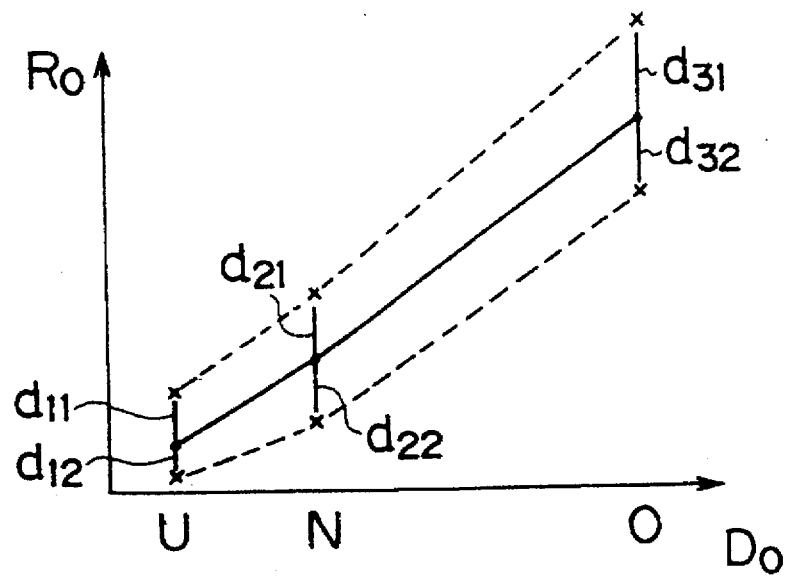
FIG. 10 is a diagram showing a region for selecting photometric data.
Figure 11:
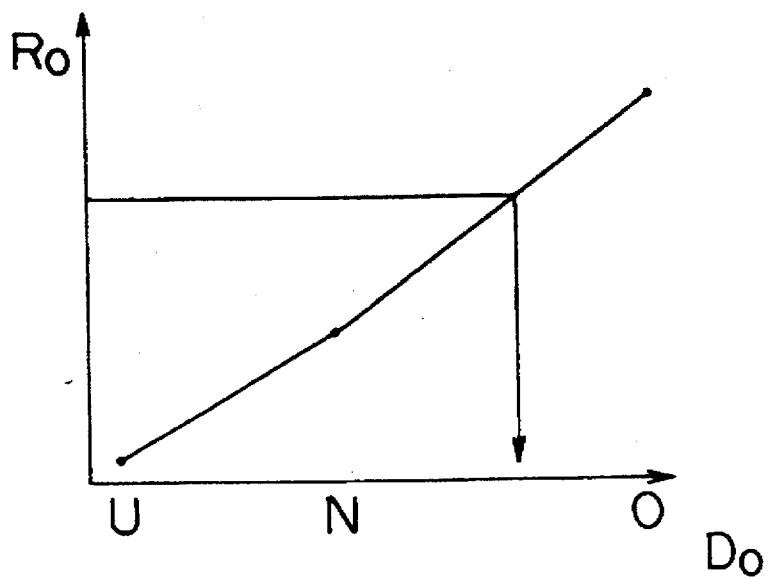
FIG. 11 s a diagram showing a region for converting photometric data.

In the step 106, the relation shown in FIG. 10 or FIG. 11 is determined as the film characteristics for selecting photometric data as will be explained later, and it is stored in the form of a table or formulation. The film characteristics may be recorded for each film type in advance.

The processing in step 108 positions a frame of the negative film 20 to the printing position, and in step 110, the photometric device 28 conducts the light metering of the positioned frame for red, green and blue separately. The processing in step 112 stores the resulting photometric data in connection with the film type in the photometric data memory means 46.

The processing in step 114 selects, based on the determined film characteristics, photometric data to be used for the calculation of exposure control value which will be explained later from among the photometric data obtained in step 110. This selection process is to select photometric data that belongs to a specific color region, e.g., a color region including a neutral color (gray) or skin color, defined on the color coordinate plane having axes of the difference of red and green and the difference of green and blue. The method of selection will be explained in the following. The step 114 together with the steps 104 and 106 corresponds to the photometric value selecting means 44 in the image feature value calculating means 34.

Initially, in the above-mentioned step 106, the curve shown in FIG. 10 is drawn for each density R0, B0 and B0 of three by using the average density D0=(R0+B0+B0)/3 for an average negative film 20. In the step 114, in order to select data of a region close to the specific color region, offset values d11, d12, d21, d22, d31 and d32 are set for under-exposure, normal-exposure and over-exposure, respectively, with respect to the curve, thereby defining a region shown by the dashed lines in FIG. 10. Subsequently, the average value D=(R+B+B)/3 of the photometric data (density) of three colors is evaluated, and it is tested whether the red density R for the average value D is included in the dashed-line region of FIG. 10. The same test is conducted for the green and blue densities G and B in connection with the dashed-line regions for these colors similar to that shown in FIG. 10.

Only when all photometric data R, G and B are found included in the respective dashed-line regions set for the densities R0, G0 and B0 of the average negative film, the photometric data is selected and used for the calculation of the exposure control value. Any of the photometric data R, G and B which is not included in the dashed-line region is not used for the calculation of the exposure control value, or alternatively the average value of R, G and B is converted to be an average value in the dashed-line region of FIG. 10 and it is used commonly for the exposure control values of three colors. The offset values d11–d32 are preferably variable depending on the film type or the gradients R0/D0, G0/D0 and B0/D0.

Alternatively, photometric data may be selected in the following manner. In the step 106, the characteristic curve explained on FIG. 10 is set for each of the densities R0, G0 and B0 for an average negative film as shown in FIG. 11. In the subsequent step 258, each of the photometric data R, G and B is converted into D0 to evaluate R', G' and B' by using the characteristic curve based on the manner disclosed in Japanese patent publication JP-A-SHO60-27352.

Based on this conversion process, photometric data having a color balance similar to that of the average negative film is converted into the densities R', G' and B'. It is tested on the chromaticity diagram as to whether the R', G' and B' are to be used for the calculation of the exposure control value. In selecting the photometric data to be used for the calculation of the exposure control value, selective weighting may be applied to photometric data as disclosed in Japanese patent publications JP-A-SHO61-198144 and JP-A-SHO61-223731.

The processing in step 116 analyzes the selected photometric data in the manner disclosed in Japanese patent publications JP-A-SHO61-198144, JP-A-SHO61-223731 or JP-A-SHO61-232442 for example, and calculates the exposure control value from the density values derived from the data. This process corresponds to part of the exposure condition determining means 40.

Figure 12:
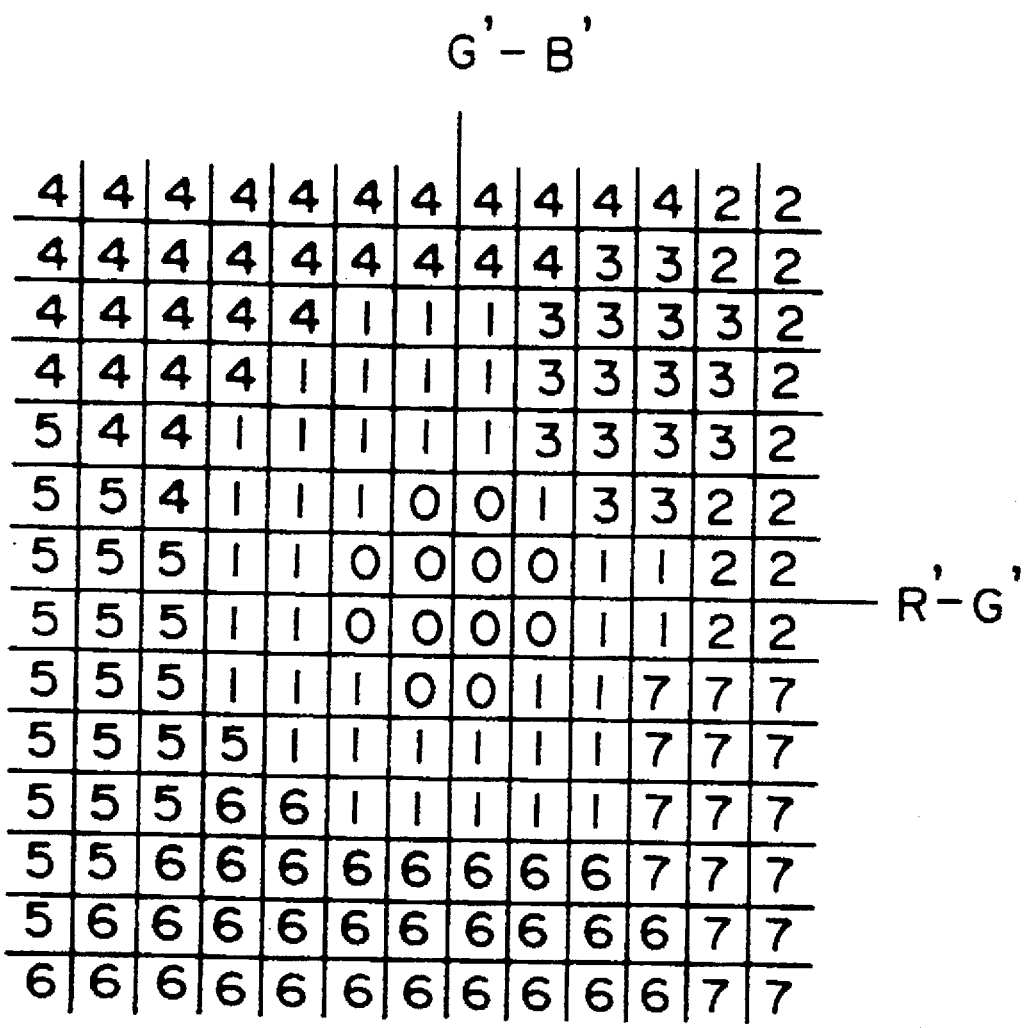
FIG. 12 is a diagram showing color regions.

Namely, photometric data is normalized by setting the origin in the specific color region. Next, the normalized photometric data R', G' and B' of three colors are used to calculate R' −G' and G' −B', and color regions as shown in FIG. 12 are determined for individual measuring points (pixels) based on the color coordinate table. Measuring points that belong to a closed region on the color coordinate plane including a neutral color or skin color, or a closed region on the color coordinate plane including a neutral color or skin color (e.g., points 0 of neutral color, or points 1 and 3 of skin color in FIG. 12) are selected. The photometric data of the selected points before normalization are summed to evaluate the average values for red, green and blue, and the resulting average values are exposure control values Dxj. The exposure control values Dxj are based on the calculation excluding data at the measuring points that can possibly cause the color failure, and accordingly the exposure condition can be determined by using the Dxj without spoiling the degree of color modification.

The processing in step 118 detects whether the film type of the negative film 20 set currently on the photographic printing apparatus 10 is the reference film type. If the condition of step 118 is affirmed, the processing jumps to step 126, or otherwise if it is negated, the processing proceeds to step 120 to calculate the contrasts CONTj for red, green and blue of the image to be printed based on the photometric data provided by the photometric device 28. This process corresponds to the contrast calculating means 42.

The contrast is evaluated by converting the input photometric data into density data and calculating the difference of the maximum and minimum values of density data. Alternatively, the contrast may be evaluated in terms of the difference of density between the highlight and shadow portions of the image, or the difference of density between the density values at the 90% point and 5% point on the histogram of density data. Alternatively, the exposure value at the time of image recording on the negative film 20 may be used as contrast-related information. This information is recorded magnetically or optically by the camera on the film or cartridge, and it is read out at the time of printing.

The processing in step 122 calculates the difference SPECj of film characteristics between the film type identified in step 102 and the reference film type for each color of red, green and blue. Among a variety of physical values which represent the difference of film characteristics, one example is based on the comparison of characteristic curves for red, green and blue of the negative film 20 determined in step 106 and those of the reference film type, and the difference of film characteristics is calculated in terms of the difference of gradients of the two characteristic curves.

In case the characteristic curve has different gradients for the high-density (over-exposure) side and low-density (under-density) side of the negative film, it is desirable to use only the difference of gradients of the over-exposure side or apply a large weight to it relative to that of the under-exposure side with the intention of caring much for the print quality of the highlight of the printed picture. The process of step 122 corresponds to the film characteristics difference calculating means 36.

The processing in step 124 calculates for each of red, green and blue the film type correction amount Yj used to correct the faulty color balance of the highlight portion of the printed picture attributable to the difference of film characteristics among film types. The film type correction amount Yj is a function of the difference SPECj of film characteristics and the contrast CONTj of image:

$$Yj = f(SPECj, CONTj) \tag{1}$$

The film type correction amount Yj is calculated by substituting the contrast calculated in step 118 and the difference of gradients of film characteristics calculated in step 122 into the function. By correcting the exposure condition based on the film type correction amount Yj, the faulty color balance attributable to the difference of film characteristics among film types can be corrected. The process of the step 124 corresponds to the film type correction amount calculating means 38.

The faulty color balance emerges particularly in the highlight portion of the printed picture as the difference from the film characteristic curve of the reference film type increases, while there emerges virtually no such faulty color balance for no-tone (zero-contrast) images, as explained previously, and therefore the function should be such that the degree of modification increases in proportion to the increase of the difference of film characteristics and in proportion to the rise of image contrast. Such function is defined, for example, as follows.

$$Yj = Kj \cdot SPEC \cdot CONTj \tag{2}$$

where Kj is a constant.

Figure 1:
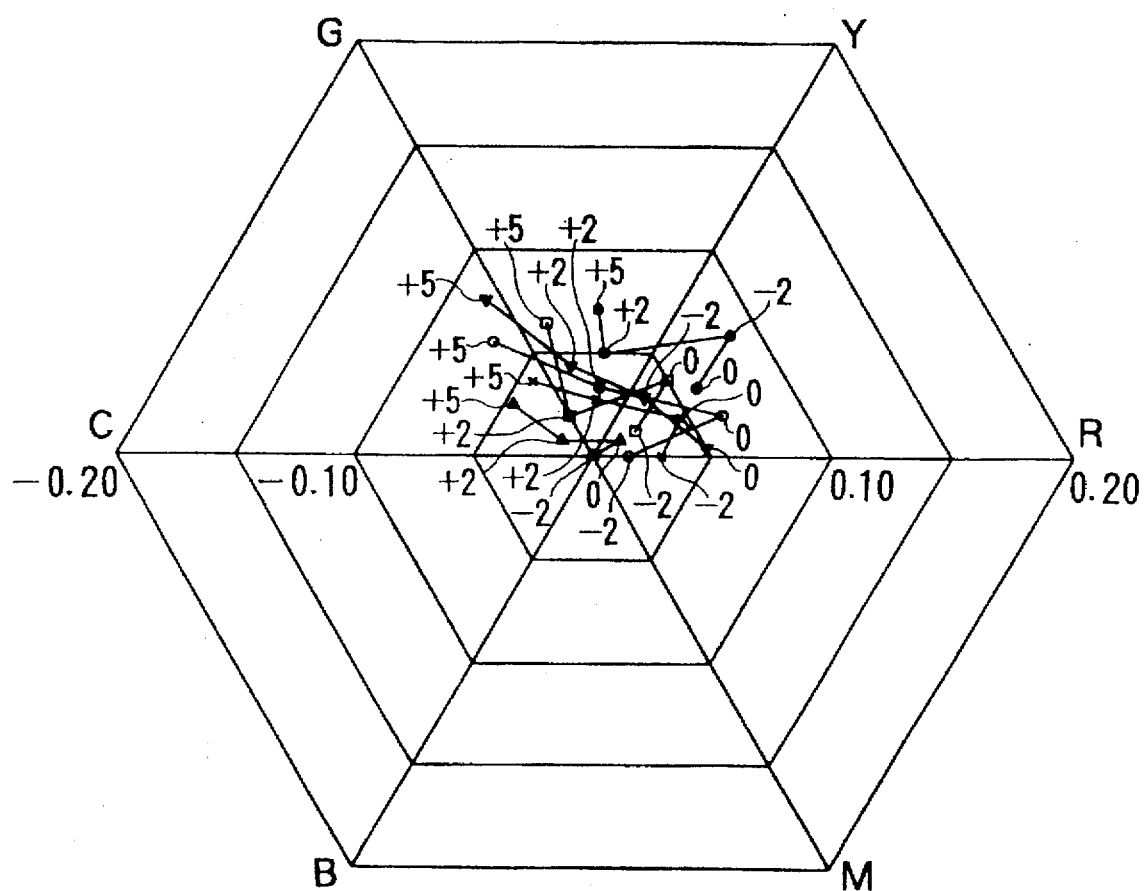
FIG. 1 is a diagram showing printing results in which plural gray full images respectively exposed and recorded on a reference film and films of plural kinds different from a kind of the reference film are printed to a predetermined sheet of photographic printing paper by using an exposure condition for suitably printing each of the plural gray full images respectively exposed and recorded on the reference film at different exposure values onto the predetermined photographic printing paper sheet.
Figure 2:
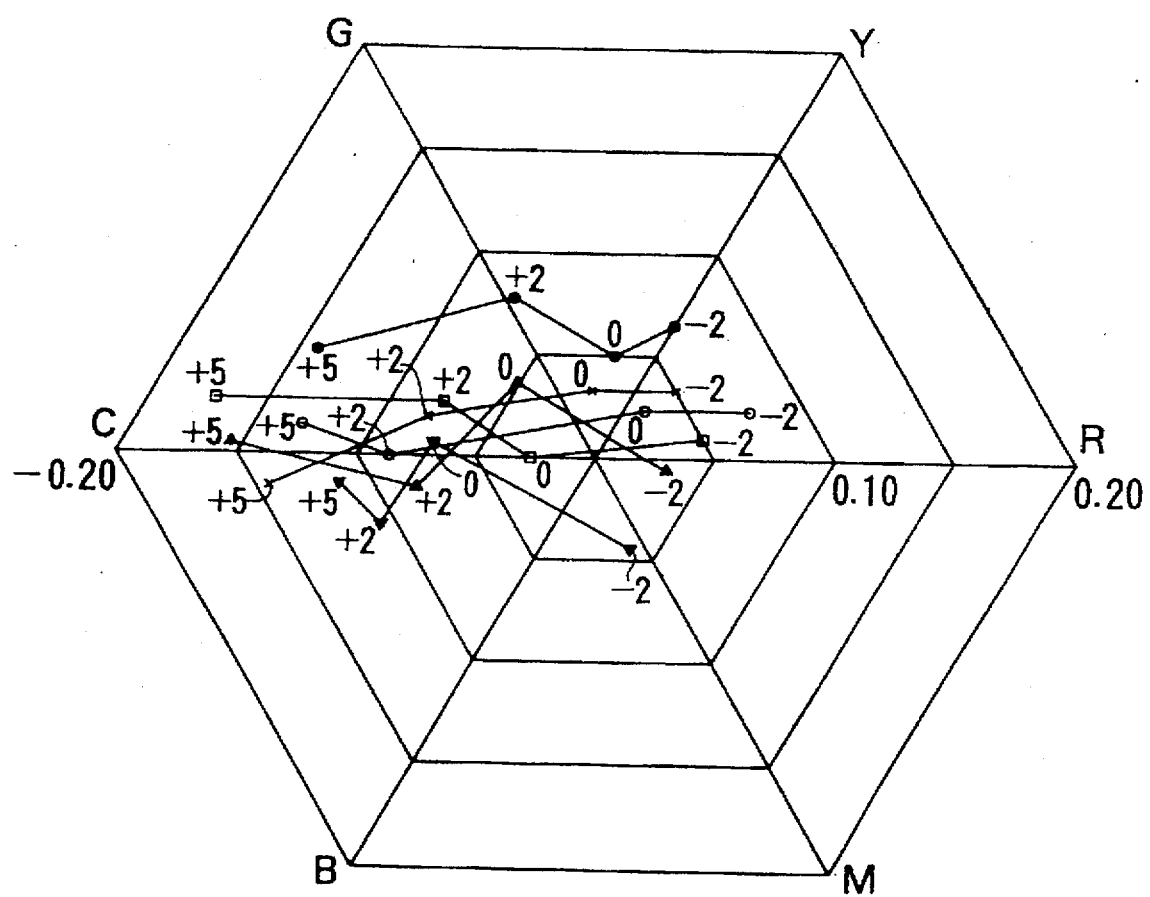
FIG. 2 is a diagram showing printing results in which plural standard subject images respectively exposed and recorded on a reference film and films of plural kinds different from a kind of the reference film are printed to a predetermined sheet of photographic printing paper by using an exposure condition for suitably printing each of the plural standard subject images respectively exposed and recorded on the reference film at different exposure values onto the predetermined photographic printing paper sheet.

The film type correction amount Yj takes a large value in case the image contrast CONTj is high, i.e., when much degradation of the quality of printed picture is predicted, and the exposure condition is modified by this large correction amount (will be explained later), and therefore it becomes possible to produce a print as high in quality as a no-tone solid gray image (zero-contrast) or an image with relatively low contrast. For a no-tone image such as a solid gray image, CONTj is zero and thus the film type correction amount Yj is also zero, resulting in the absence of modification of the exposure condition against the difference of film characteristics, and therefore a good print result for a no-tone image is not spoiled by the filmtype correction amount Yj, as shown in FIG. 1.

Figure 13:
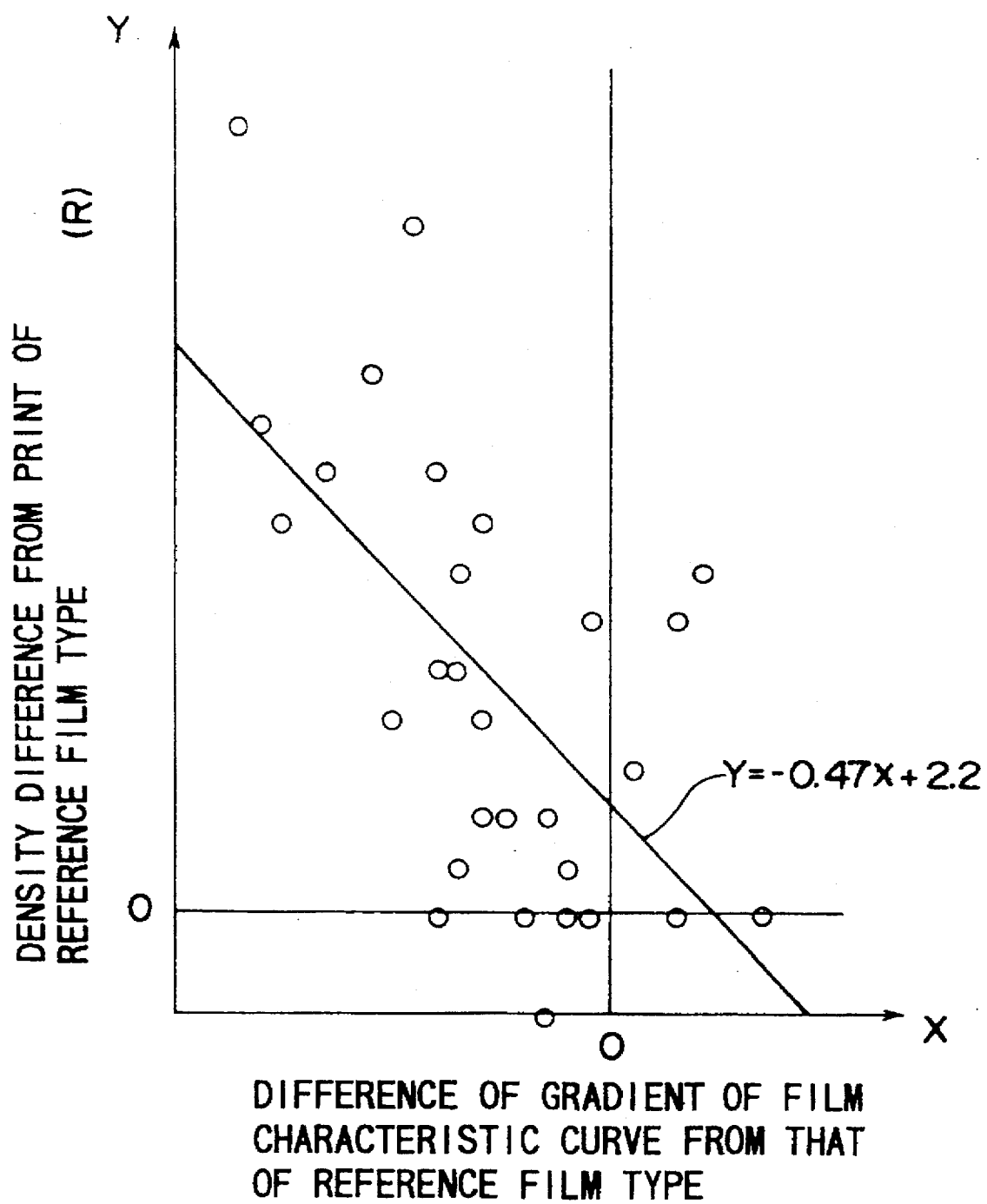
FIG. 13 is a graph showing the relation of a difference in inclination between film characteristic curves of a reference film kind and each of film kinds, and a difference between printing densities obtained from the reference film and each of the film kinds.

Next, an example of the method of determining the factor Kj will be explained. The inventors of the present invention conducted the experiment of printing solid gray images of negative films of various film types based on multiple times of exposure (all in over-exposure condition) while varying the exposure value by +2, +4 and +6 in steps onto the color paper 26, and measured the density of the printed picture (comparable to the density of a highlight portion of a general image) and calculated the mean value of density for each color of red, green and blue and for each film type. The inventors calculated the difference between each mean density value and the mean density value of the reference film type obtained by the same experiment and plotted the difference on the vertical axis, while the difference between the gradient of the film characteristic curve of each film type and the gradient of the film characteristic curve of the reference film type being plotted on the horizontal axis, and examined the relation between the difference of the gradients of the film characteristic curves and the difference of the mean density values of the highlight portion of the printed picture. FIG. 13 shows the result of experiment for the red color.

The regression analysis was conducted for the result shown in FIG. 13, and the relation between the difference of gradients X of the film characteristic curves of red and the difference of mean density values Y for the highlight portion of the image was obtained as follows.

$$Y = -0.47X + 2.2 \tag{3}$$

The correlation factor was 0.61. In the case of the result shown in FIG. 13, the factor 0.47 of the equation (3) can be set, as an example, for the factor Kr of red among the factors Kj of the equation (2). Since the factor used to calculate the film type correction amount Yj is determined based on the correlation between the difference of film characteristics and the difference of densities of the printed picture, it is possible to obtain the film type correction amount Yj for correcting the exposure condition so that the same print quality as the case of printing the image of the film of the reference film type is obtained when the color paper 26 of the same kind as used in the above-mentioned experiment is used.

This embodiment is based on the premise that an image recorded on a film of a prescribed reference film type is printed on a color paper 26 of a prescribed kind, and in case where color paper of different kinds are possibly used, factors Kj for color paper of various kinds are evaluated in advance in the same manner as described above and stored in correspondence to the paper types as shown by Table 1 so that a proper factor Kj is selected depending on the kind color paper.

TABLE 1

| Kind of color paper | Factor |
| --- | --- |
| A | Kr(A), Kg(A), Kb(A) |
| B | Kr(B), Kg(B), Kb(B) |
| C | Kr(C), Kg(C), Kb(C) |
| . | . |
| . | . |
| . | . |

It should be noted on the graph of FIG. 13 that the correlation factor is as large as 0.79 when films plotted in the positive range of the horizontal axis (films having mean density values of the highlight of printed picture greater than that of the reference film type) are excluded. The reason for this is that these films plotted on the positive side of horizontal axis are harder in characteristics than the reference film type and therefore have their characteristic curves varying intricately on the high-density side. On this account, the general correlation factor is slightly smaller than the above-mentioned case due to the inclusion of these hard negative films.

The processing in step 126 introduces the reference exposure condition for printing appropriately the image of the negative film of the preset reference film type onto the color paper 26. The reference exposure condition can be at least one of the exposure value or exposure time, filter movement value, luminance of light source, light source voltage, slope control value, and density control value for each of red, green and blue. The reference exposure condition is set by using the exposure condition setting film (bull's-eye negative film) produced by printing a prescribed image on a negative film of the reference film type.

The processing in step 128 determines the exposure condition, which consists of the exposure values of red, green and blue for a film frame to be printed, by using the exposure control value calculated in the step 116 and the introduced reference exposure condition as follows.

$$\log E_j = D_{corj} - D_{oj} + F_j + d \quad (4)$$

where Ej is the exposure value, Doj is the density of reference image (bull's-eye negative film), Dcorj is the exposure control value Dxj subtracted by the film type correction amount Yj, Fj is the exposure control value for proper printing of the reference image, and d is the correction amount for correcting another factor.

In determining the exposure condition, the channel data stored in the photometric data memory means 46 as shown in FIG. 6 is also used. The film type correction amount Yj is determined depending on the difference of film characteristics from that of the reference film type and contrast of image as mentioned previously, and accordingly for the exposure condition calculated based on the formula (4), the deterioration of print quality attributable to the difference of film characteristics is compensated irrespective of the contrast of image.

In this embodiment, color paper 26 having the characteristics which matches with the film characteristics of reference film type is used and the exposure condition for printing properly the image of the negative film of the reference film type onto the color paper 26 is set for the reference exposure condition, and therefore it is possible to obtain the exposure condition for printing the image of a negative film 20 of a film type different from the reference film type onto the color paper 26. Accordingly, it is possible to produce high-quality prints of images on the color paper 26 from negative films of various film types.

The processing in step 130 controls the light adjustment filter device 60 so that the film frame positioned to the printing position is printed on the color paper 26 based on the exposure condition determined as described above. The processing in step 132 tests whether all frames of one negative film 20 have been printed. If the condition of step 132 is negated, the processing returns to step 108, and the processing in steps 108–132 are repeated until the step 132 is affirmed. When the condition of step 132 is affirmed, the operation terminates.

Embodiment 2

Figure 14:
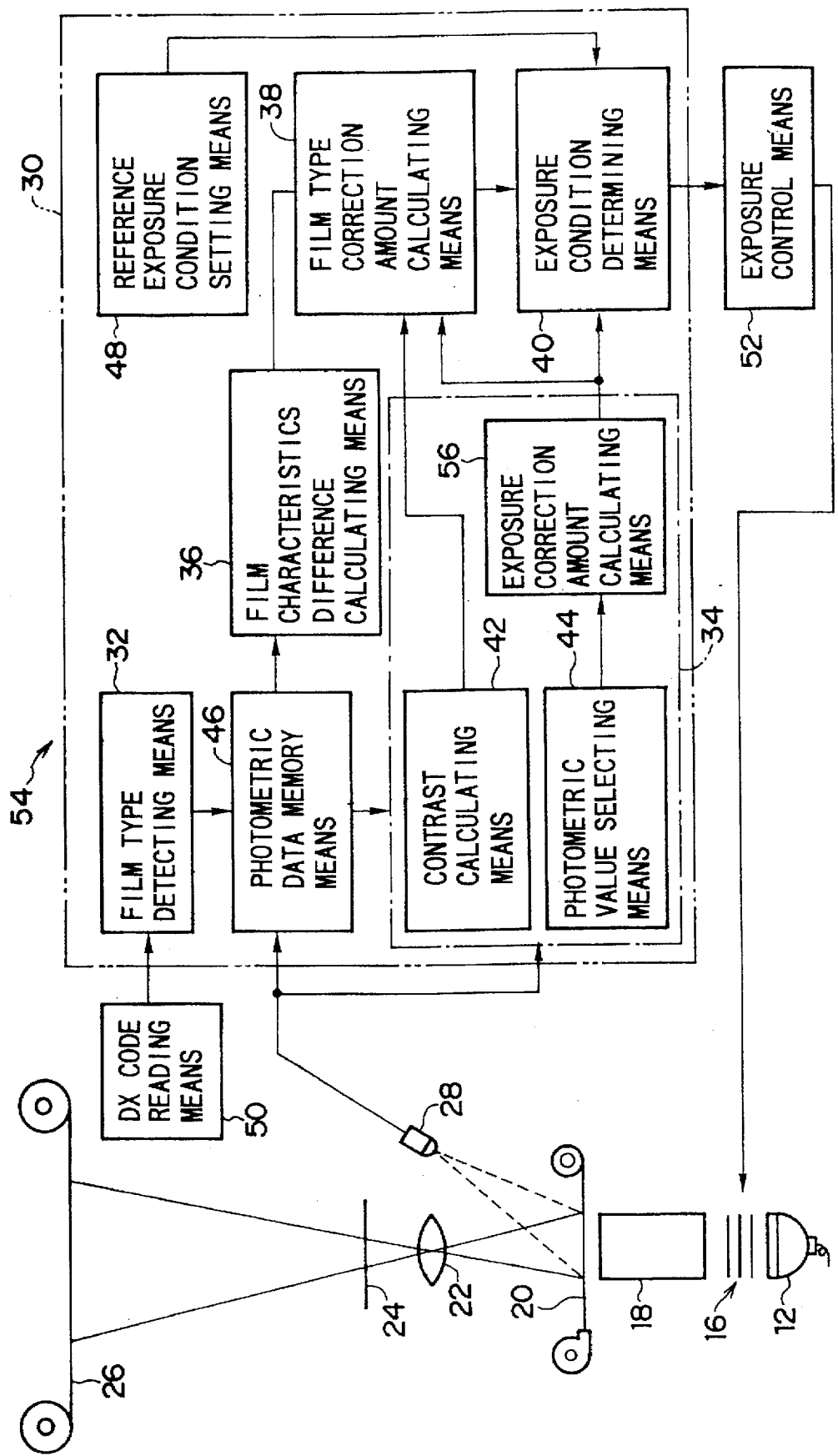
FIG. 14 is a block diagram showing the schematic construction of a photographic printer in accordance with a second embodiment of the present invention.

The photographic printing apparatus based on the second embodiment of the present invention will be explained with reference to FIG. 14. In the figure, portions identical to those of the first embodiment are referred to by the same symbols and the explanation thereof will be omitted.

The photographic printing apparatus 54 includes an exposure correction amount calculating means 56, which constitutes part of the image feature value calculating means 34, located between the photometric value selecting means 44 and the exposure condition determining means 40. The exposure correction amount calculating means 56 calculates various correction amounts for correcting the exposure condition in accordance with the photometric data selected by the photometric value selecting means 44. The correction amount is, for example, the exposure control value Dxj which is calculated by the exposure condition determining means 40 in the first embodiment.

The correction amount calculated by the exposure correction amount calculating means 56 is delivered to the exposure condition determining means 40 and film type correction amount calculating means 38. The exposure control value Dxj is calculated from the photometric data that belongs to the color region including a neutral color (gray) or skin color on the color coordinate plane selected from among stored photometric data as explained in the first embodiment. The photometric data that belongs to the color region of skin color is very likely to be the photometric data for the main portion (object) of the picture. Accordingly, the exposure control value Dxj varies depending on the density of the main portion of the image, and the value Dxj is used as information on the density of the main portion of the image for calculating the correction amount based on it by the film type correction amount calculating means 38.

The information on the density of the main portion is not confined to Dxj, but various other correction amounts for correcting the exposure condition derived from the average density of the image depending on the content of image, e.g., a correction amount derived from the result of detection of the main portion based on the density distribution of the image, or a correction amount derived from the density of the main portion following the detection of the position of the main portion, can be used.

This correction amount is intended for such modification that a high print quality is attained particularly for the main portion of the picture and the value varies depending on the density of the main portion (highlight or shadow), and it is possible to estimate the density of the main image portion based on any of the correction amounts mentioned above.

Based on the fact that a photograph taken with the aid of a flash device has a highlighted main image portion and a dark background, it is possible to record the use of flash device magnetically or optically on the film or cartridge at the time of shooting and read this information afterward for the estimation of the density of the main image portion.

The film type correction amount calculating means 38 of this embodiment calculates the film type correction amount Yj by making reference to the exposure correction amount provided by the exposure correction amount calculating means 56, in addition to the film characteristics information provided by the film characteristics difference calculating means 36 and the image contrast provided by the contrast calculating means 42, as follows.

$$Yj = f(SPECj, CONTj, ADJj)$$

where ADJj is the exposure correction amount.

Among a variety of conceivable methods for calculating the film type correction amount Yj which increases as the density of the main image portion indicated by the exposure correction amount shifts toward the highlight side (high density of the negative film), an example is to vary the value of factor Kj depending on the magnitude of the exposure correction amount ADJj in the equation (3) of the first embodiment. Namely, the factor Kj is increased by 5% for a 20% increase of ADJj and it is decreased by 5% for a 20% decrease of ADJj, for example.

In the case of the main image portion with a high density on the negative film 20, the density of the printed picture distributes on the highlight side, causing the faulty color balance of the printed picture to be much noticeable. Whereas, according to this embodiment, the film type correction amount Yj increases as the density of the main image portion rises so that the exposure condition is modified by the larger correction amount, and consequently high print quality can be attained irrespective of the density of the main image portion recorded on the negative film.

Embodiment 3

Figure 15:
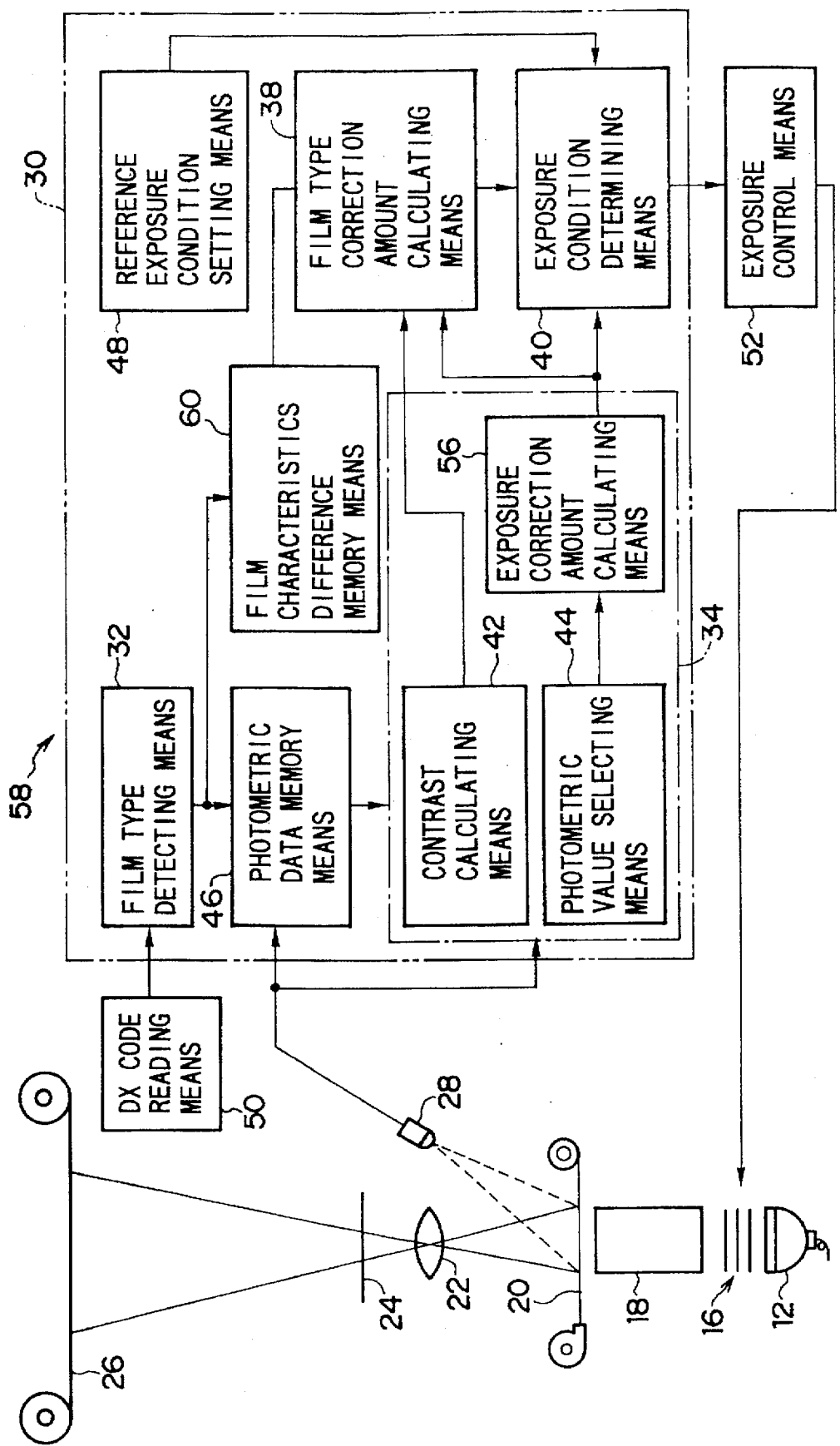
FIG. 15 is a block diagram showing the schematic construction of a photographic printer in accordance with a third embodiment of the present invention.

The third embodiment of the present invention will be explained with reference to FIG. 15. In the figure, portions identical to those of the second embodiment are referred to by the same symbols and the explanation thereof will be omitted. Different from the first and second embodiments in which the film characteristics information is calculated by the film characteristics difference calculating means 36, the photographic printing apparatus 58 of this embodiment includes a film characteristics memory means 60 in place of the film characteristics difference calculating means 36.

The film characteristics memory means 60 has a record of information indicative of the difference of film characteristics from that of the reference film type (e.g., the difference SPECj of film characteristics explained in the first embodiment). The film characteristics memory means 60 responds to the reception of the information indicative of the film type of the negative film 20 set on the photographic printing apparatus 58 to deliver the film characteristics difference information of that film type to the film type correction amount calculating means 38. This arrangement eliminates the intricate calculation process for evaluating the difference of film characteristics, and consequently the exposure condition for printing the image of the negative film 20 onto the color paper 26 properly can be obtained in a short time.

Embodiment 4

The fourth embodiment of the present invention will be explained with reference to FIG. 16. In the figure, portions identical to those of the second embodiment are referred to by the same symbols and the explanation thereof will be omitted.

The photographic printing apparatus 62 of this embodiment does not have the photometric device 28 used in the preceding embodiments, but includes a different light metering system 66 in place of it. The light metering system 66 is located on the upstream side of the negative film passage (shown by the arrow A in FIG. 16) with respect to the printing position, and it includes a lamp house 70 disposed beneath the negative film 20. The light coming from the lamp house 70 is projected to the negative film 20 which passes through the light metering system 66. The position of light projection on the negative film 20 will be termed "light metering position". Over the negative film 20 at the light metering position, there are disposed a lens 72 and a light photometric device 74 in this order.

The light coming from the lamp house 70 and passing through the negative film 20 is focused by the lens 72 on the light sensitive surface of the photometric device 74. The photometric device 74 consists of numerous light sensing elements in matrix arrangement, with each element being sensitive to the light intensity of a color component of red, green and blue, so that the image recorded on the negative film 20 is measured optically by being divided into numerous points and color components.

Formed between the light metering system 66 and the exposure system 64 is a film reserving room 68, in which the negative film 20 which has undergone the light metering of images at the light metering position stays temporarily before it is transported to the exposure system 64.

The photometric device 74 has its output terminal connected to the photometric data memory means 46 and image feature value calculating means 34 of the controller 30 so that these means receive photometric data produced by the photometric device 74. The photographic printing apparatus 62 of this embodiment does not have the DX code reading means 50 and film type detecting means 32 used in the preceding embodiments, and photometric data provided by the photometric device 74 is stored sequentially in the photometric data memory means 46 without being analyzed for the film type.

In this photographic printing apparatus 62, the light metering system 66 conducts the light metering for multiple frames of the negative film 20 prior to the exposure for printing by the exposure system 64. The negative film 20 that has undergone the light metering is sent to the film reserving room 68.

Photometric data is stored in the photometric data memory means 46 sequentially. After all frames of one negative film 20 have undergone the light metering and their photometric data have been stored in the photometric data memory means 46, the negative film 20 is taken out of the film reserving room 68 and rendered the image printing process by the exposure system 64.

In the printing process, data of multiple images recorded on the same negative film 20 are used, as described in form 4 of the invention, in place of data of many images recorded on negative films of the same film type in the cases of the first and second embodiments. Data of multiple images recorded on the same negative film 20 conceivably reflect the film characteristics of the negative film 20, and accordingly the data provide the film characteristics difference information and various film characteristic value information comparable to those of the first and second embodiments. The process does not need to identify the film type of the negative film 20 to be printed, and therefore proper exposure conditions can be determined even for negative films that do not have DX codes and thus are difficult in identifying the film type, such as the 110, 126 and 120-sized negative films.

Figure 16:
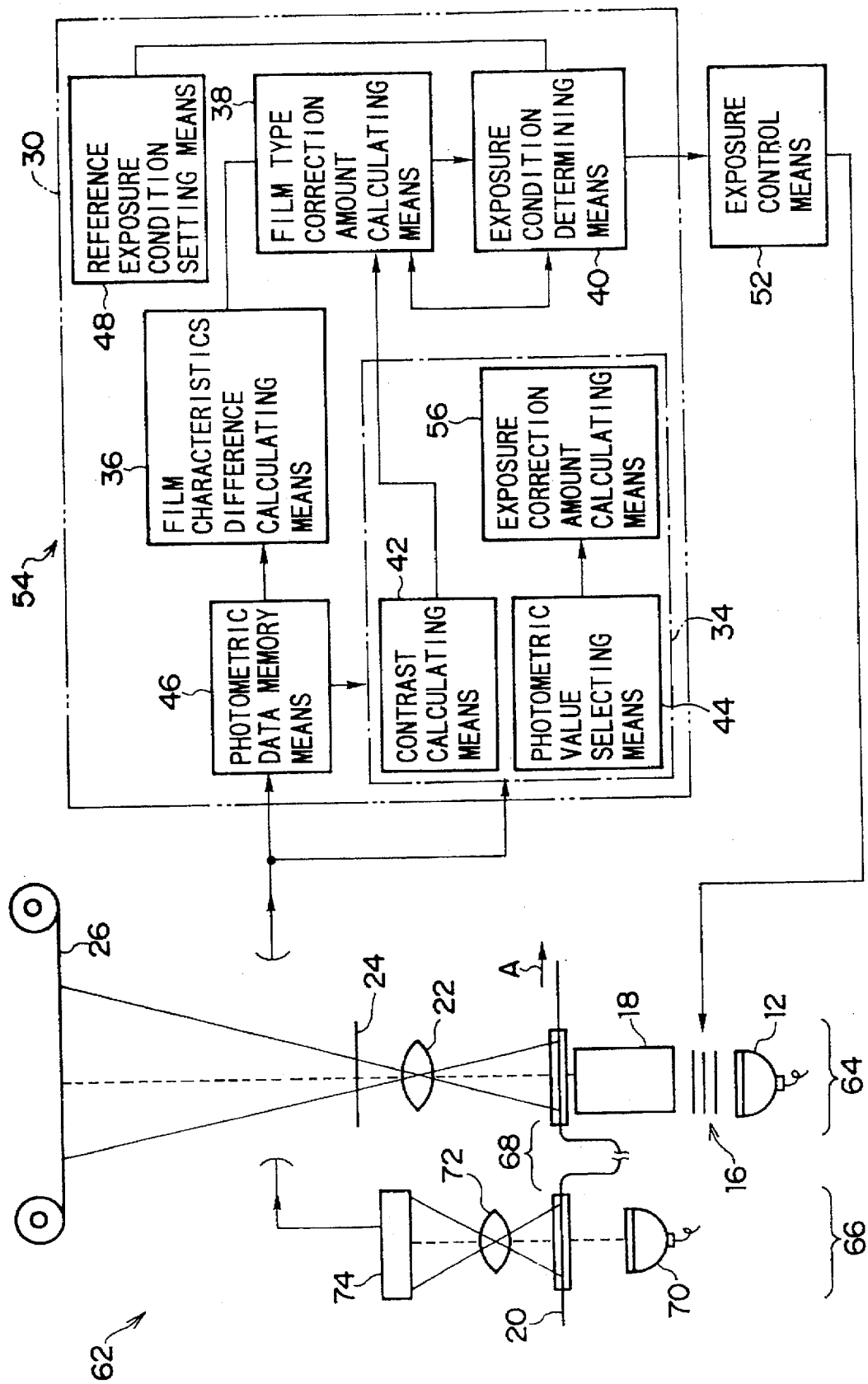
FIG. 16 is a block diagram showing the schematic construction of a photographic printer in accordance with a fourth embodiment of the present invention.

The photographic printing apparatus operative to conduct the exposure condition determining process based on data of multiple images recorded on the same negative film 20 is not confined to the apparatus 62 shown in FIG. 16, but the apparatus may be arranged to have separate members of the light metering system 66 and exposure system 64 (without the formation of the negative film passage between the light metering system and exposure system). In this case, data produced by the light metering system 66 are stored sequentially in a memory medium such as a memory card which compares to the memory means of the present invention, and data of multiple images recorded on the same negative film 20 can be read out of the recording medium by the exposure system 64.

In another arrangement of the photographic printing apparatus shown in FIG. 5, multiple images recorded on the same negative film 20 undergo the sequential light metering and resulting data are stored while the negative film 20 is transported in one direction, and subsequently these images undergo the sequential exposure based on the stored data while the negative film 20 is transported in the opposite direction.

Although in the foregoing embodiments, the deterioration of print quality attributable to the difference of film characteristics is compensated by subtracting the correction amount based on the present invention from the exposure value, as shown by the equation (4), the manner is not confined to this, but the correction amount based on the present invention may be multiplied to the exposure value as shown by the following formulas (5) and (6).

$$\log Ej = Dcorj - Doj + Fj + d \quad (5)$$

where Dcorj is the exposure control value Dxj multiplied by the correction amount Yj based on the present invention.

$$\log Ej = s(Dxj - Doj) + Fj + d \quad (6)$$

where s is a factor dependent on the film characteristics difference (it is comparable to the correction amount of the present invention).

Although in the foregoing embodiments, channel data of film types other than the reference film type is stored in the photometric data memory means 46 as shown in FIG. 6A, only photometric data may be stored in this memory as shown in FIG. 6B. In this case, the exposure condition is determined by using channel data of the reference film type set on the reference exposure condition setting means 48 and photometric data stored in the photometric data memory means 46.

Figure 3A:
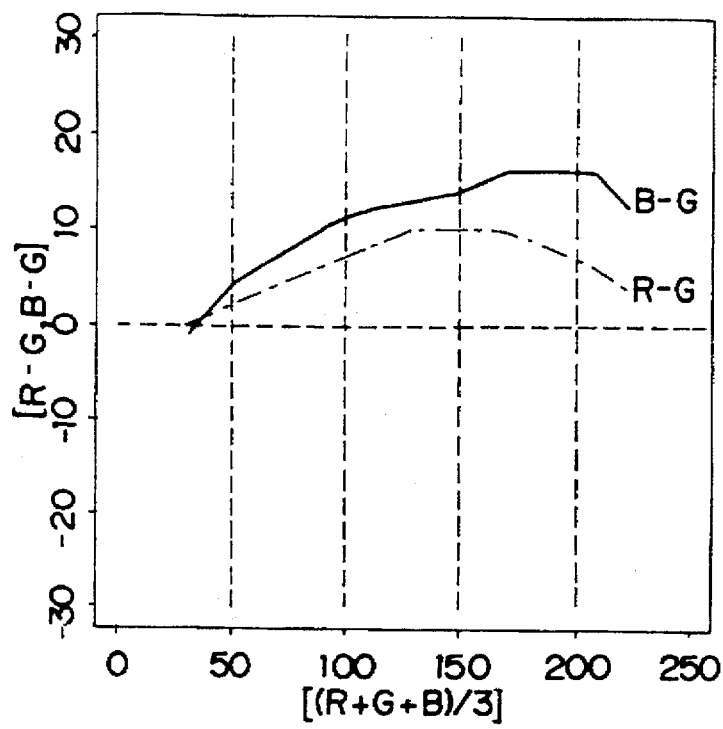
FIG. 3A is a graph showing one example of a gradation balance of two different kinds of films in which a standard subject is exposed and recorded plural times to each of the two kinds of films while an exposure amount is changed, and average densities of red (R), green (G) and blue (B) of each of recorded images are shown on the axis of abscissa and density differences of R and B with respect to G are shown on the axis of ordinate.
Figure 3B:
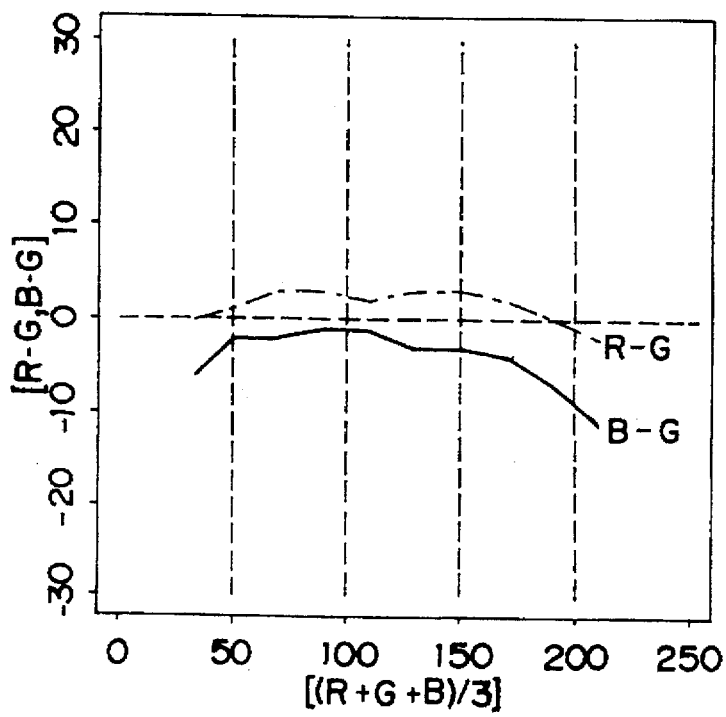
FIG. 3B is a graph showing one example of a gradation balance of two different kinds of films in which a standard subject is exposed and recorded plural times to each of the two kinds of films while an exposure amount is changed, and average densities of red (R), green (G) and blue (B) of each of recorded images are shown on the axis of abscissa and density differences of R and B with respect to G are shown on the axis of ordinate.
Figure 4:
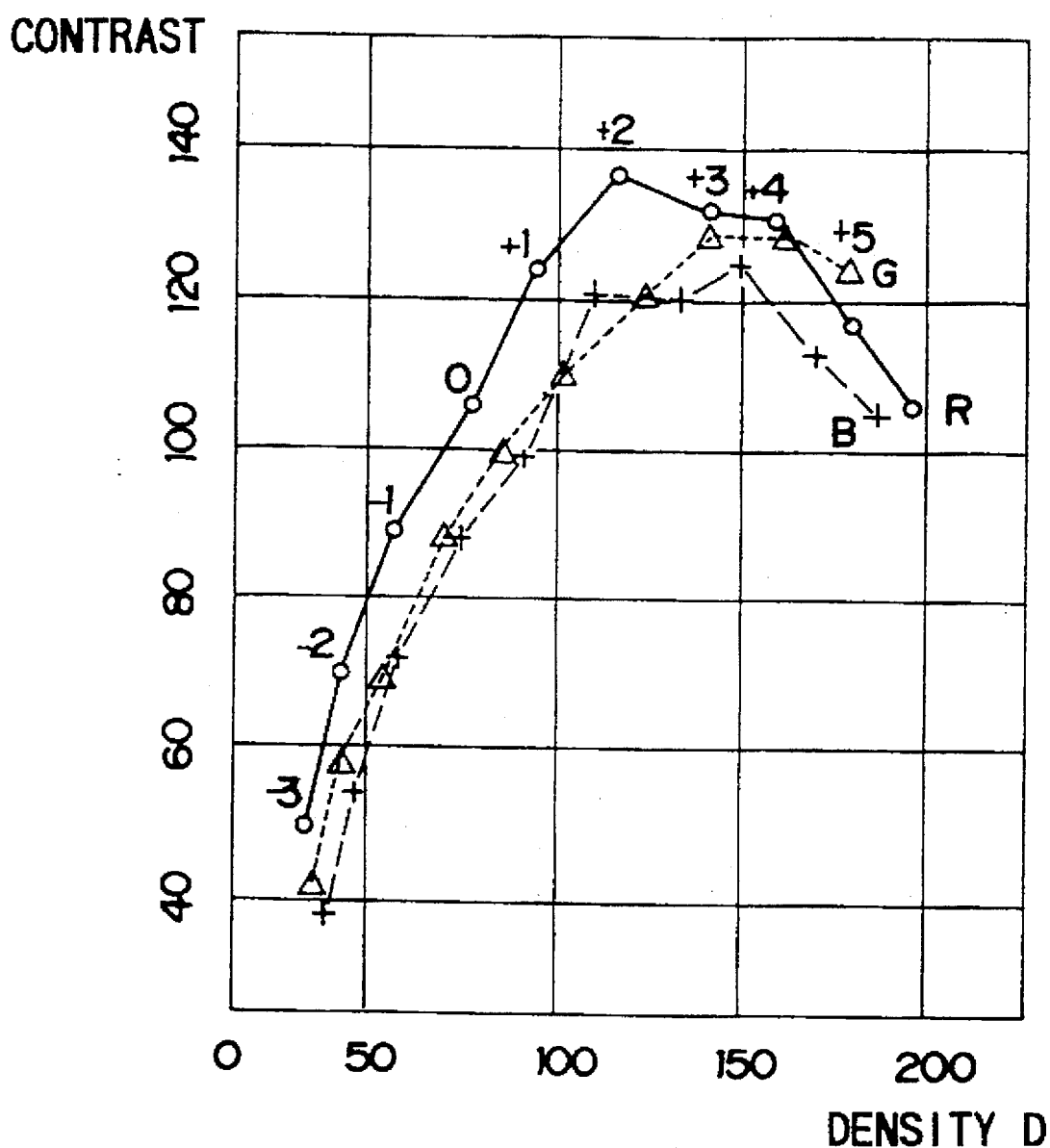
FIG. 4 is a graph showing that a standard subject image is exposed and recorded plural times to a film of a specific kind while an exposure amount is changed, and average density values of respective colors of the recorded images are shown on the axis of abscissa and contrasts of the respective images every color are shown on the axis of ordinate at these exposing and recording times.

Although in the foregoing embodiments, the difference of gradients of the film characteristic curves is used for the difference of film characteristics PSECj, the present invention is not confined to this, but the film characteristics difference PSECj may be calculated by using the change of the difference between the characteristic curve of the reference film type and the characteristic curve of the negative film 20 having the image to be printed on the diagram of the film characteristics as shown in FIG. 3.

Although in the foregoing embodiments, the reference exposure condition is set on the reference exposure condition setting means 48 as the reference print condition setting means, the present invention is not confined to this, but the reference exposure condition setting means may be designed to point a channel that corresponds to the reference film type among a number of channels provided in correspondence to multiple film types in the photometric data memory means 46.

Although the foregoing embodiments are photographic printing apparatus as examples of the image reproducing apparatus, the present invention includes various other image reproducing apparatus for reproducing images recorded on films onto image reproduction mediums. Examples of such apparatus include other photographic apparatus, such as printer processors and photograph enlarging apparatus, and image reproducing apparatus for reproducing images recorded on microfilms onto image reproduction mediums.

Although in the foregoing embodiments, films are negative films as an example, positive films are also applicable.

Embodiment 5

Figure 17:
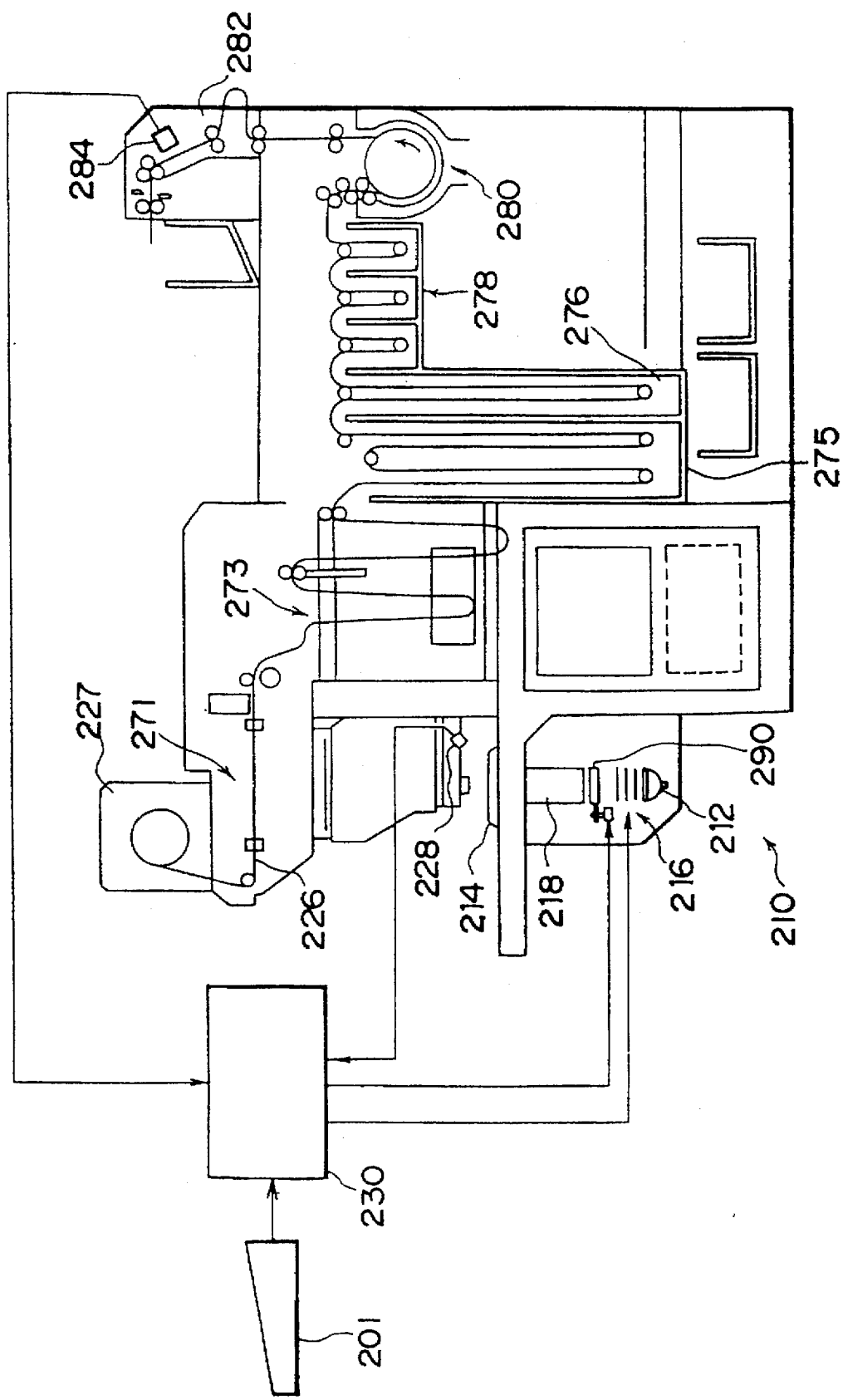
FIG. 17 is a block diagram showing the schematic construction of a printer processor in accordance with the fourth embodiment.

FIG. 17 shows the basic arrangement of a printer processor 210 as an image reproducing apparatus based on the fifth embodiment of the present invention. A magazine 227 for accommodating color paper 226 is mounted on the printer processor 210. The color paper 226 is drawn out of the magazine 227 and transported to the exposure system 270, in which images recorded on a negative film are printed by the printing system as will be explained in detail later.

The color paper 226, with the image of the negative film being transferred thereto by the exposure system 270, is fed to the color developer 274 in the processor by way of the paper reservoir 272. After the development process by the color developer 274, the color paper 226 is rendered the bleach-fixing process by the bleach-fixer 276 and thereafter it is rinsed in water by the rinsing device 278. The rinsed color paper 226 is dried by the drier 280 and thereafter cut into separate color prints by the cutter 282. Disposed in the cutter 282 at the position confronting the passage of the color paper 226 is a density meter 284, which is connected to the controller 230 made up of a microcomputer and its peripheral devices.

The printing system has a negative carrier 214, on which a color negative film 220 is set. The color negative film 220 set on the negative carrier 214 is transported by it to the print position shown in FIG. 18. Disposed beneath the print position is a lamp house 212 which accommodates a mirror box 218 and a halogen lamp 212. Disposed between the mirror box 218 and halogen lamp 212 is a light adjustment filter device 216 consisting of three CC filters of cyan, magenta and yellow.

Disposed between the light adjustment filter device 216 and mirror box 218 is a light attenuation filter 290, as a reference filter of this embodiment, which is movable across the optical path of exposure. The light attenuation filter 290 consists of a multi-layer evaporative coating filter 292 and a metallic slit filter 294. The light attenuation filter 290, which is disposed between the negative carrier 214 and lamp house 212, is preferably located between the mirror box 218 and lamp house 212. The evaporative coating filter 292 may be replaced with a white glass or color glass plate filter.

The evaporative coating filter 292 has its both ends clamped by the bent sections of the slit filter 294. The evaporative coating filter 292 and slit filter 294 are spaced out from each other by the interposition of a pair of spacers 296 having virtually the same width as the bent sections of the slit filter 294. The provision of the spacers 296 is intended to prevent the evaporative coating filter 292 from breaking caused by the heat conduction from the slit filter 294 to the evaporative coating filter 292, but it may be eliminated. Attached at the corner of the slit filter 294 is one end of a fixing arm 297, which has another end linked to the drive shaft of a motor 98. Accordingly, the light attenuation filter 290 is swung on the horizontal plane around the motor shaft by the rotation of the motor 98.

Figure 21:
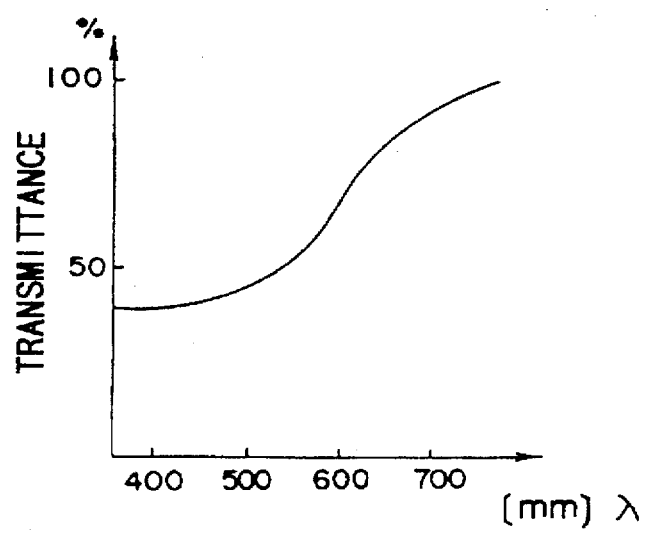
FIG. 21 is a graph showing characteristics of an evaporation filter.

Formed on the entire bottom surface of the slit filter 294 are a number of slits with a prescribed width made by the etching process or the like and arranged in parallel at a prescribed spacing. The slit filter has a light attenuation factor of 0.5 or more preferably. Specifically, a slit 299 has a width of 1.0 mm or greater and the spacing of slits is 1.0 mm or greater preferably. The slit filter may be based on numerous small punched holes having a diameter of 1.5 mm or smaller, or preferably smaller than 1.0 mm, instead of the slits. The slit filter 294 has its both sides painted in black so as to prevent the light reflection. The evaporative coating filter 292 has the evaporative deposition of multi-layer films so that it has a transmittance distribution curve as shown in FIG. 21. The transmittance is higher for longer wavelengths than for shorter wavelengths. The light attenuation filter 290 preferably has an average spectrographic distribution of standard object images recorded on various kinds of films, or it may have a flat distribution such as that of the ND filter.

Figure 22:
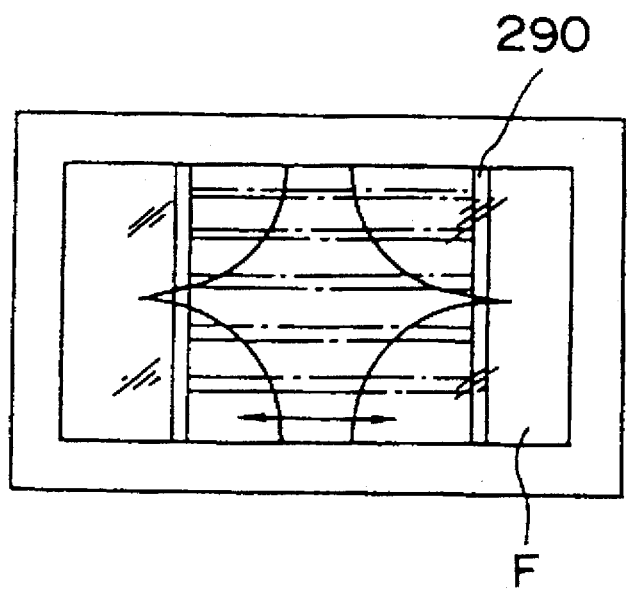
FIG. 22 is a plan view showing an arranging state of the light reducing filter.

The light attenuation filter 290 has its slits 294 aligned in the direction of movement (shown by the arrow) of each CC filter of the light adjustment filter device 216 as shown in FIG. 22. Owing to this slit arrangement, the amount of light transmitting through the light attenuation filter 290 varies continuously instead of the inconvenient stepped variation. In addition, owing to the disposition of the slit filter 294 beneath the light attenuation filter 290, the slits are prevented from having the clogging of dust and tissue occurring during the printing operation.

Although in this embodiment, the light attenuation filter 290 is made up of the evaporative coating filter 292 and slit filter 294, it may be arranged to be a pair of light attenuation filters 290 interposed by a slit filter. In case the spacing of slits or the diameter of small holes is 0.3 mm or greater, where the occurrence of clogging is less likely, such glass members as the evaporation filter and white glass plate may be eliminated. The reference filter is not confined to those described above, and it may be located at the negative carrier 214 or the position between the lens 222 and color paper 226, instead of the position near the light source.

Located over the printing position are the lens 222, black shutter 224 and color paper 226. The light beam coming from the lamp house 212 and passing through the filters of the light adjustment filter device 216, mirror box 218 and negative film 220 is focused on the color paper 226 by the lens 222.

Figure 18:
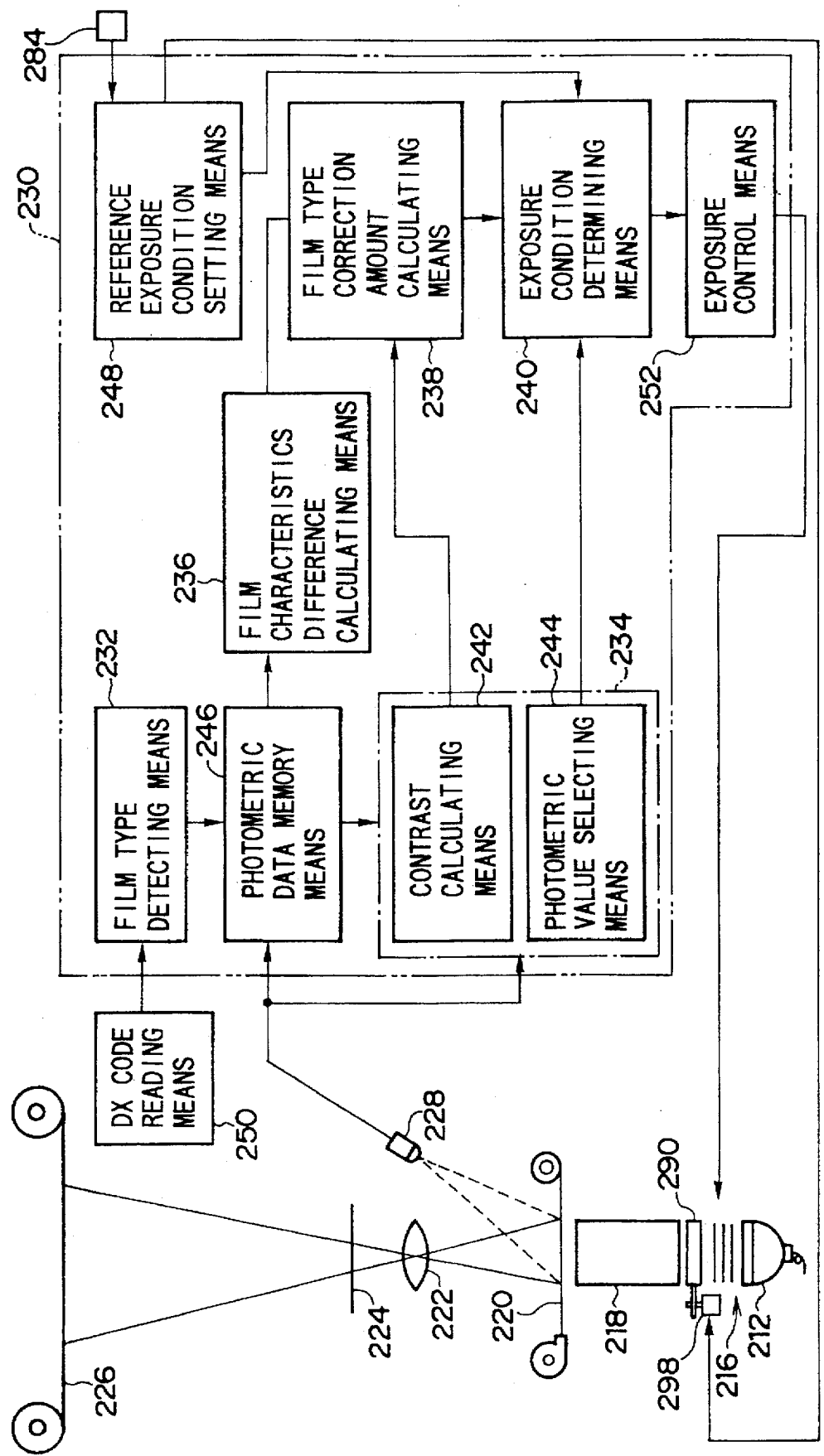
FIG. 18 is a block diagram showing the schematic constructions of a printer section and a controller in the printer processor.
Figure 19:
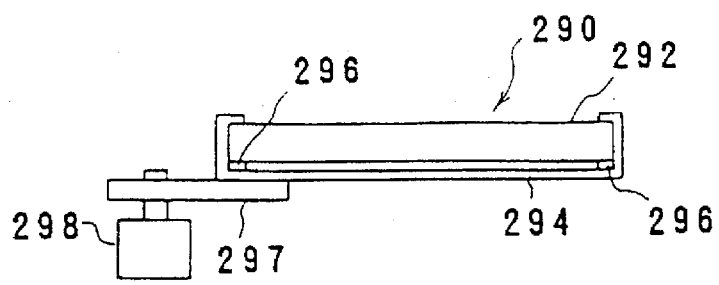
FIG. 19 is a side view showing a light reducing (beam attenuating) filter arranged in the printer section.
Figure 20:
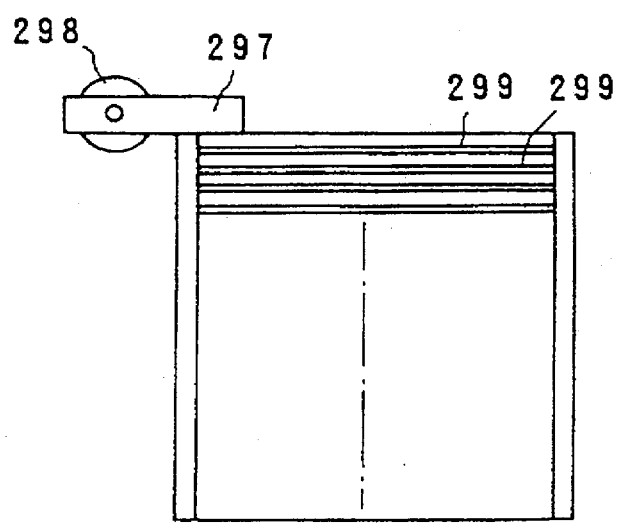
FIG. 20 is a plan view of the light reducing filter.

The printing system includes a photometric device 228 as the light metering means and a DX code reading means 250, as shown in FIG. 18. These devices have the same arrangement as the photometric device 28 and DX code reading means 50 of the first embodiment, and the explanation thereof is not repeated.

The photometric device 228 and DX code reading means 250 are connected to the controller 230. The controller 230 is connected with a keyboard 266 as the setting means of the present invention, as shown in FIG. 17, which is used to set the reference film type of the negative film 220. The reference film type and the kind of color paper 226 used by the printer processor 210 are chosen based on the matching of their characteristics (particularly the tone balance). Particularly, the film type is chosen from among those that are most prevailing, or used most frequently by the printer processor 210, or have the most average film characteristics.

Shown in FIG. 18 are various processings conducted by the controller 230, and they are illustrated in terms of a film type detecting means 232, image feature value calculating means 234, film characteristics difference calculating means 236, film type correction amount calculating means 238, exposure condition determining means 240, and reference exposure condition setting means 248. The controller 230 also includes a photometric data memory means 246 for storing photometric data. The arrangement of these means will be explained in brief.

Figure 23:
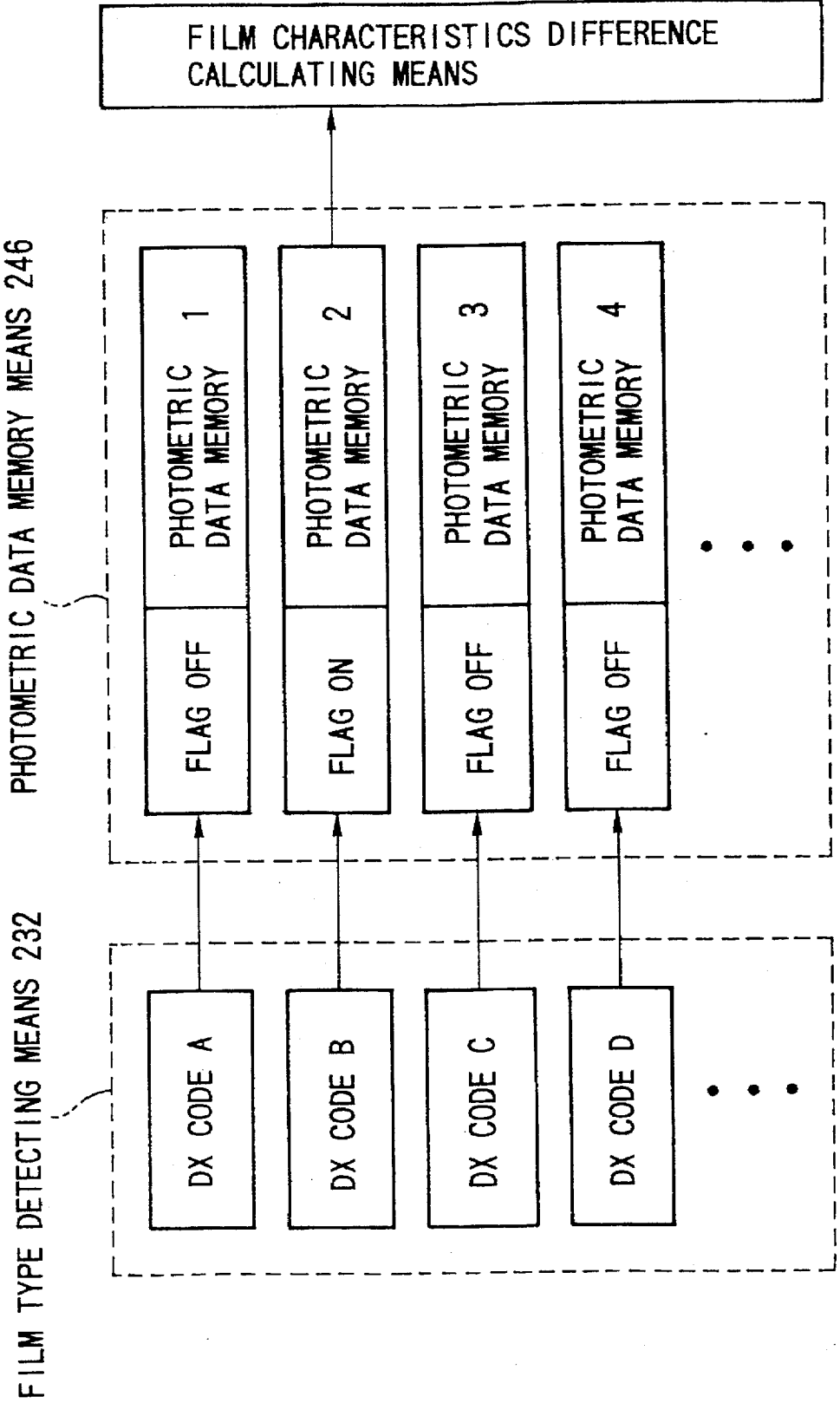
FIG. 23 is a block diagram conceptually showing the constructions of film kind sorting means and photometric data memory means.

The film type detecting means 232 includes a non-volatile rewritable memory medium such as EEPROM (Electrically Erasable Programmable ROM), RAM provided with a backup power source, or a floppy disk, hard disk, opto-magnetic disk or memory card. This memory medium has a record of multiple DX codes as shown in FIG. 23. The film type detecting means 232 collates the DX code detected by the DX code reading means 250 with the DX codes stored in the memory medium thereby to identify the film type of the negative film 220. The film type detecting means 232 and DX code reading means 250 in unison constitute the film identification means of the present invention.

The photometric data memory means 246, which corresponds to the memory means of the present invention, comprises a non-volatile rewritable memory medium similar to that mentioned above. The photometric data memory means 246 has multiple flag storage areas and photometric data storage areas as shown in FIG. 23. The lag storage areas store flags indicative of the reference film type, and only a flag corresponding to the DX code of the reference film type entered by use of the keyboard 266 is turned on. Shown in FIG. 23 is an example of setting, in which the film type for the DX code "B" is designated as the reference film type.

The photometric data storage areas store cumulatively, in correspondence to the DX codes, photometric data provided by the photometric device 228 as a result of light metering for images, as mentioned previously in connection with form 9 of the present invention. The arrows shown in FIG. 23 denote the correspondence among data. In order to avoid the overflow of the photometric data memory means 246, data may be stored together with the date of storage or date of data access so that old data or old-accessed data are erased with or without user's designation, as already proposed by the inventors of the present invention in Japanese patent publication JP-A-HEI5-297473.

Although FIG. 23 shows, as an example, the storing of the flag storage areas and photometric data storage areas in one-to-one correspondence with DX codes, other storing methods are also possible, e.g., the flag storage areas and photometric data storage areas are made correspondent to multiple DX codes of multiple relevant film types in terms of the film manufacturer, film characteristics, production year, etc.

The reference exposure condition setting means 248 is connected with the density meter 284 and motor 298 mentioned previously. The reference exposure condition setting means 248 activates the motor 298 to insert the light attenuation filter 290 across the exposure light path at the setup of the printer processor 210 so as to conduct the light metering for the light attenuation filter 290. The color paper 226 is printed by the light passing through the light attenuation filter 290 at the exposure value determined based on the photometric value and prescribed standard exposure condition, and thereafter it undergoes various processings in the processor. The density meter 284 measures the density of the resulting print.

Various parameters (e.g., color balance) for correcting the exposure condition are set so that the measured value of density of the print is equal to the prescribed reference density value. In processing, the exposure condition (reference exposure condition) for printing the image of the negative film 220 of the reference film type onto the color paper 226 properly is obtained: (setting of print condition). The established reference exposure condition is stored in the non-volatile rewritable memory medium, which is similar to that mentioned previously, included in the reference exposure condition setting means 248.

The reference exposure condition setting means 248 carries out periodically the light metering for the light attenuation filter 290 and the measurement of density of the print result on the color paper 226 produced by the light passing through the filter 290, and modifies the reference exposure condition against the operational variation with time of various sections of the printer processor 210: (management of print condition). Specifically, the light metering for the light attenuation filter 290 is conducted initially, the reference exposure condition is modified depending on the variation of photometric value of the filter 290 attributable to the variation of operational condition of the printing system due to the deposit of dust on the light source or the aging of the lamp, the density of the print produced on the color paper 226 by the light passing through the filter 290 based on the modified reference exposure condition is measured, and the modified reference exposure condition is further modified depending on the variation of print density caused by the operational variation of the processor. Consequently, it is possible to obtain a proper reference exposure condition which allows for the variation with time of various sections of the printer processor 210 without being affected by the color fading or contamination of the condition setting film.

When the reference film type is altered and subsequently the type of color paper 226 is altered accordingly to match with the characteristics of the new reference film type, the reference exposure condition setting means 248 establishes a new reference exposure condition in the same manner as described above. Accordingly, even if the reference film type is altered, a new reference exposure condition can be obtained without the need of setting the condition setting film for this reference film type, and therefore it becomes easy to alter the setting of the reference exposure condition following the alteration of the reference film type and it becomes possible to set a proper reference exposure condition without being affected by the color fading or contamination of the condition setting film.

The photometric data produced by the photometric device 228 based on the light metering of the image on the negative film 20 is also delivered to the image feature value calculating means 234, which consists of a contrast calculating means 242 and a photometric value selecting means 244. The contrast calculating means 242 calculates the contrast of image or each color of red, green and blue based on density data which is derived by conversion from photometric data provided by the photometric device 228. The photometric value selecting means 244 normalizes photometric data provided by the photometric device 228 by using photometric data read out of the photometric data storage areas of the photometric data memory means 246, selects only photometric data necessary for the determination of exposure condition from among the normalized data, and delivers the selected data to the exposure condition determining means 240.

Data stored in the photometric data memory means 246 is fed to the film characteristics difference calculating means 236, which calculates the difference of the film characteristics between the negative film 220 set currently in the printing system and the negative film 220 of the reference film type, and delivers the calculation result to the film type correction amount calculating means 238 as the correction amount calculating means of the present invention. The film type correction amount calculating means 238, which further receives the image contrast calculated by the contrast calculating means 242, calculates the correction amount of the exposure condition for the film type, and delivers the calculation result to the exposure condition determining means 240 as the image reproduction condition determining means of the present invention.

The exposure condition determining means 240 receives the photometric values selected by the photometric value selecting means 244, the correction amount calculated by the film type correction amount calculating means 238, and the reference exposure condition established by the reference exposure condition setting means 248, determines the exposure condition for the image on the negative film 220 based on these input data, and delivers the determined exposure condition to the exposure control means 252. The exposure control means 252 operates the light adjustment filter device 216 to control the exposure condition of image transfer onto the color paper 226.

Figure 24:
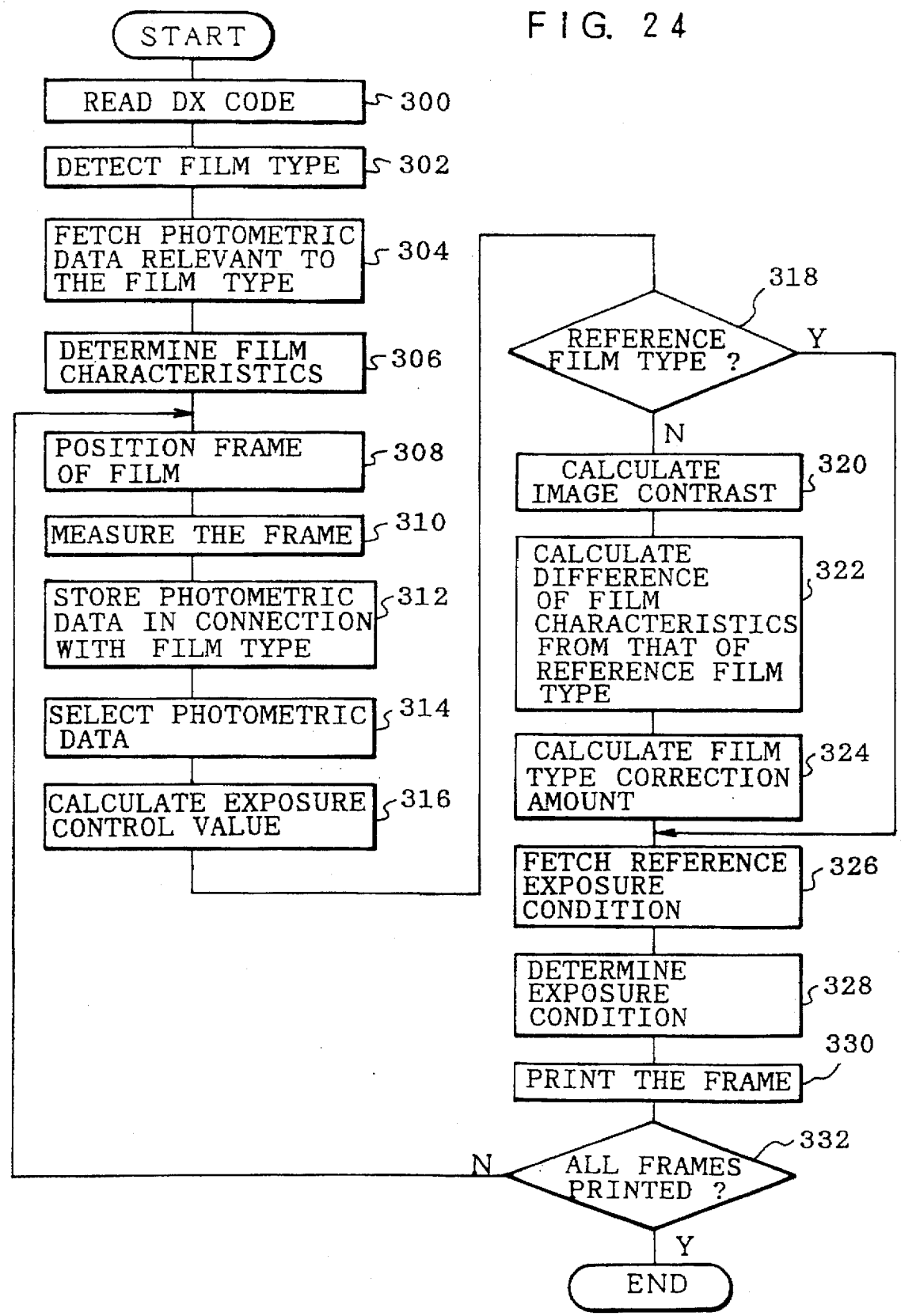
FIG. 24 is a flow chart for explaining contents of exposure condition determining processing in a controller as the operation of a printer processor in accordance with a fifth embodiment of the present invention.

Next, the image printing process of the image recorded on the negative film 220 onto the color paper 226 based on this embodiment will be explained in detail with reference to the flowchart of FIG. 24. This process is initiated after the negative film 220 is set in the printing system and the printing operation is instructed by the operator.

On this flowchart, steps 300–316 are identical to steps 100–116 of the first embodiment and the explanation thereof is not repeated.

The processing in step 318 tests whether the negative film 220 set currently in the printing system is of the reference film type. If the condition of step 318 is affirmed, the processing jumps to step 326, or otherwise if it is negated, the processing proceeds to step 320. The step 320 is identical to step 120 of the first embodiment, and explanation thereof is not repeated.

The processing in step 322 calculates the difference of film characteristics SPECj between the film type identified in step 302 and the reference film type for each color of red, green and blue. Among a variety of physical values which represent the difference of film characteristics, one example is the use of photometric data for the film type of the negative film 220 set on the printer processor 210 (the film type for the DX code "A" in FIG. 23) and photometric data for the reference film type. Film characteristic curves are determined in the same manner as the step 306 explained previously (the film characteristic curves determined in the step 306 may be used intact), and the difference of gradients of both characteristic curves is calculated as the difference of film characteristics.

In case the characteristic curve has different gradients for the high-density (over-exposure) side and low-density (under-density) side of the negative film, it is desirable to use only the difference of gradients of the over-exposure side or apply a large weight to it relative to that of the under-exposure side, or it is desirable to calculate the difference of gradients so that the difference of gradients of the over-exposure side is much weighted, all with the intention of caring much for the print quality of the highlight of the printed picture. The process of step 322 corresponds to the film characteristics difference calculating means 236.

Step 324 is identical to step 124 of the first embodiment, and the explanation thereof is not repeated.

Since in this embodiment, the reference film type can be altered by the revisional setting on the keyboard 266, another feasible manner is such that factors Kj for color paper 226 having characteristics that match with negative films 220 of film types as reference film types are evaluated, these factors Kj are stored in connection with the possible settings of film types as reference film types as shown by Table 2, and a factor Kj is used selectively depending on the film type set as the reference film type.

TABLE 2

| Reference film type | Factor |
|---|---|
| A | Kr(A), Kg(A), Kb(A) |
| B | Kr(B), Kg(B), Kb(B) |
| C | Kr(C), Kg(C), Kb(C) |

The processing in step 326 fetches from the reference exposure condition setting means 248 the reference exposure condition for printing properly the image of the negative film of the reference film type onto the color paper 226. The processing in step 328 determines the exposure condition, i.e., the exposure values for red, green and blue, for the film frame to be printed by using the introduced reference exposure condition and the exposure control value calculated in step 316 as follows.

$$\log Ej = (D_{cor}j - D_oj) + Fj + d \quad (7)$$

where Ej is the exposure value, $D_oj$ is the density of reference image, $D_{cor}j$ is the exposure control value $D_xj$ subtracted by the film type correction amount Yj, Fj is the exposure control value for proper printing of the reference image, and d is the correction amount for correcting another factor.

The film type correction amount Yj is determined depending on the difference of film characteristics from that of the reference film type and the contrast of image as mentioned previously, and accordingly for the exposure condition calculated based on the formula (7), the deterioration of print quality attributable to the difference of film characteristics is compensated irrespective of the image contrast.

In this embodiment, color paper 226 having the characteristics which matches with the film characteristics of reference film type is used and the exposure condition for printing properly the image of the negative film of the reference film type onto the color paper 226 is set for the reference exposure condition, and therefore it is possible to obtain the exposure condition for printing the image of a negative film 220 of a film type different from the reference film type onto the color paper 226. Accordingly, it is possible to produce high-quality prints of pictures on the color paper 226 from negative films of various film types.

Steps 330 and 332 are identical to steps 130 and 132 the first embodiment, and the explanation thereof is not repeated.

Embodiment 6

Figure 25:
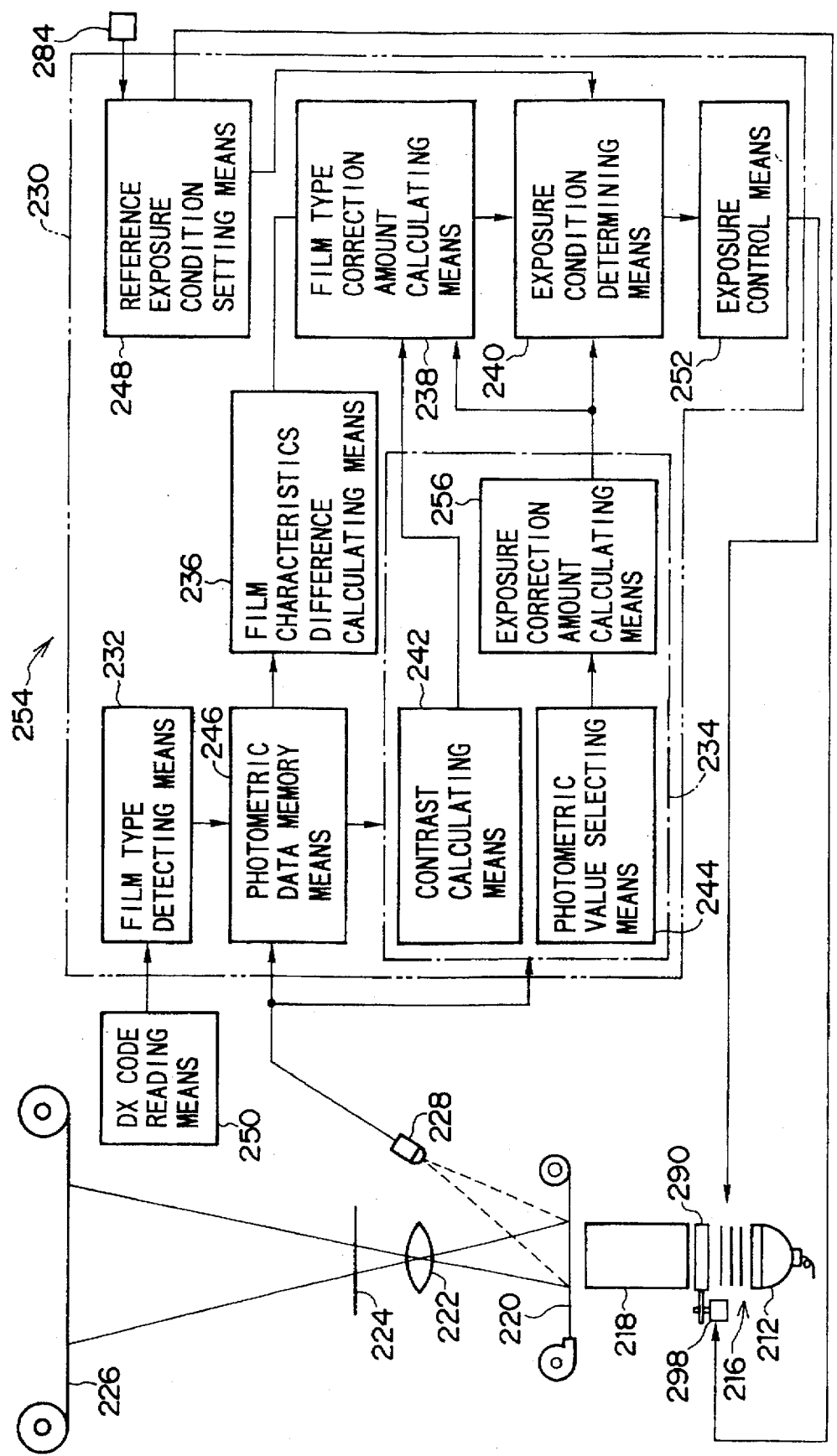
FIG. 25 is a block diagram showing the schematic constructions of a printer section and a controller arranged in a printer processor in accordance with a sixth embodiment of the present invention.

The printing system based on the sixth embodiment of the present invention will be explained with reference to FIG. 25. In the figure, portions identical to those of the second embodiment are referred to by the same symbols and the explanation thereof will be omitted.

This printing system includes an exposure correction amount calculating means 256, which constitutes part of the image feature value calculating means 234, located between the photometric value selecting means 244 and the exposure condition determining means 240. The exposure correction amount calculating means 256 calculates various correction amounts for correcting the exposure condition in accordance with the photometric data selected by the photometric value selecting means 244. The correction amount is, for example, the exposure control value Dxj which is calculated by the exposure condition determining means 240 in the fifth embodiment. The correction amount calculated by the exposure correction amount calculating means 256 is delivered to the exposure condition determining means 240 and film type correction amount calculating means 238.

The exposure correction amount calculating means 256 has the same arrangement and operation as the one 56 in the second embodiment, and the explanation thereof is omitted.

Embodiment 7

Figure 26:
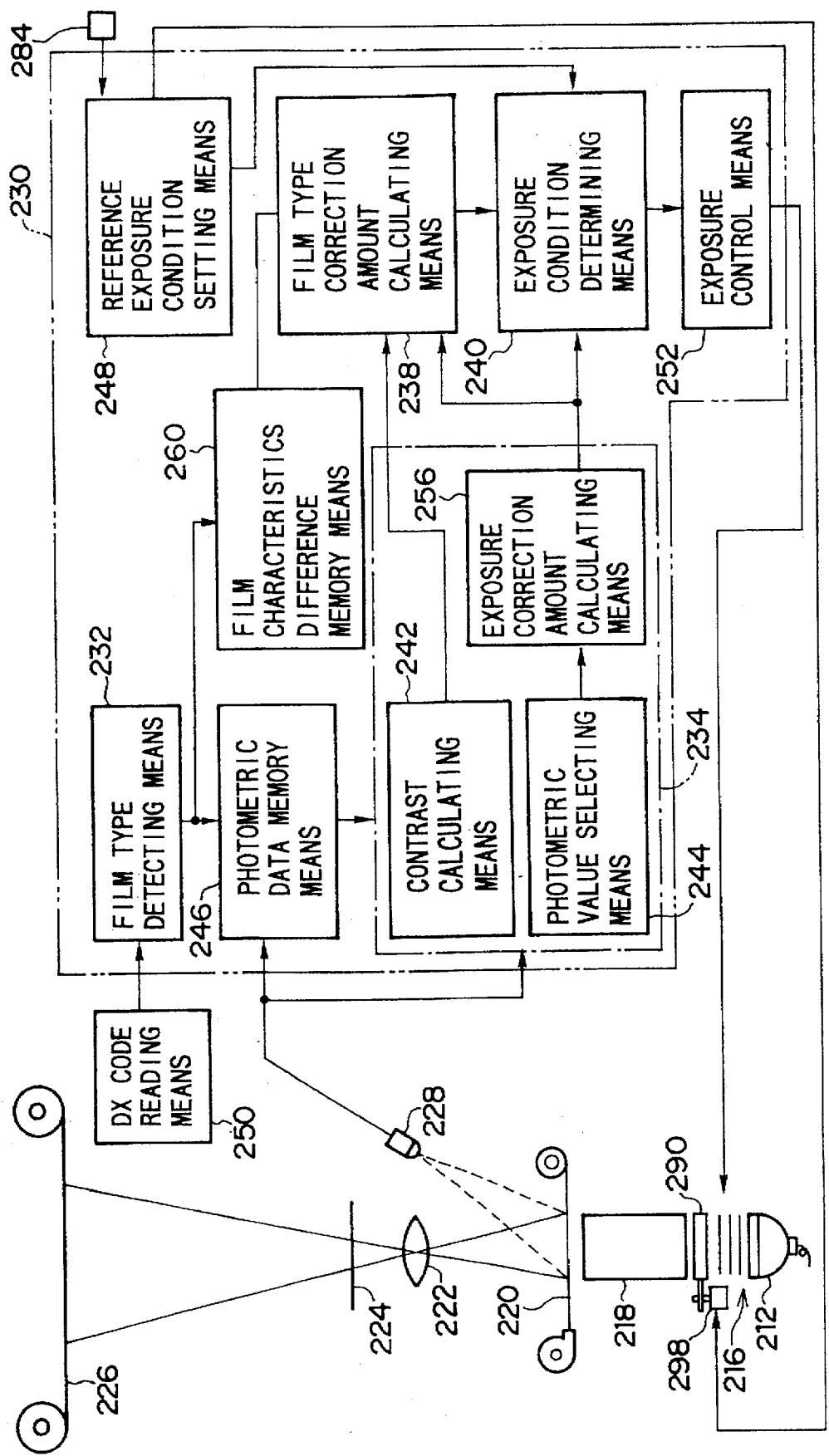
FIG. 26 is a block diagram showing the schematic constructions of a printer section and a controller in accordance with a seventh embodiment of the present invention.

The printing system based on the seventh embodiment of the present invention will be explained with reference to FIG. 26. In the figure, portions identical to those of the sixth embodiment are referred to by the same symbols and the explanation thereof will be omitted.

Different from the fifth and sixth embodiments, in which the film characteristics difference information is calculated by the film characteristics difference calculating means 236, the printing system 258 of this embodiment is provided with a film characteristics difference memory means 260 in place of it.

The film characteristics difference memory means 260 compares to the film characteristics memory means 60 of the third embodiment and has the same arrangement and operation, and the explanation is omitted.

For altering the setting of the reference film type, the contents of the film characteristics difference memory mans 260 is replaced with information which bases the reference on the newly established reference film type.

Embodiment 8

The printing system based on the eighth embodiment of the present invention will be explained with reference to FIG. 27. In the figure, portions identical to those of the sixth embodiment are referred to by the same symbols and the explanation thereof will be omitted.

The printing system 262 of this embodiment does not have the photometric device 228, but includes a different light metering system 266 in place of it. The light metering system 266 is located on the upstream side of the negative film passage (shown by the arrow A in FIG. 27) with respect to the printing position, and it includes a lamp house 270 disposed beneath the negative film 220. The light coming from the lamp house 270 is projected to the negative film 220 which passes through the light metering system 266. The position of light projection on the negative film 220 will be termed "light metering position". Over the negative film 220 at the light metering position, there are disposed a lens 267 and a photometric device 268 in this order.

This embodiment resembles the fourth embodiment, and its functional blocks and other items corresponding to those of the fourth embodiment are referred to by their reference numbers prefixed with "2", and the explanation of the arrangement and operation is not repeated.

Figure 27:
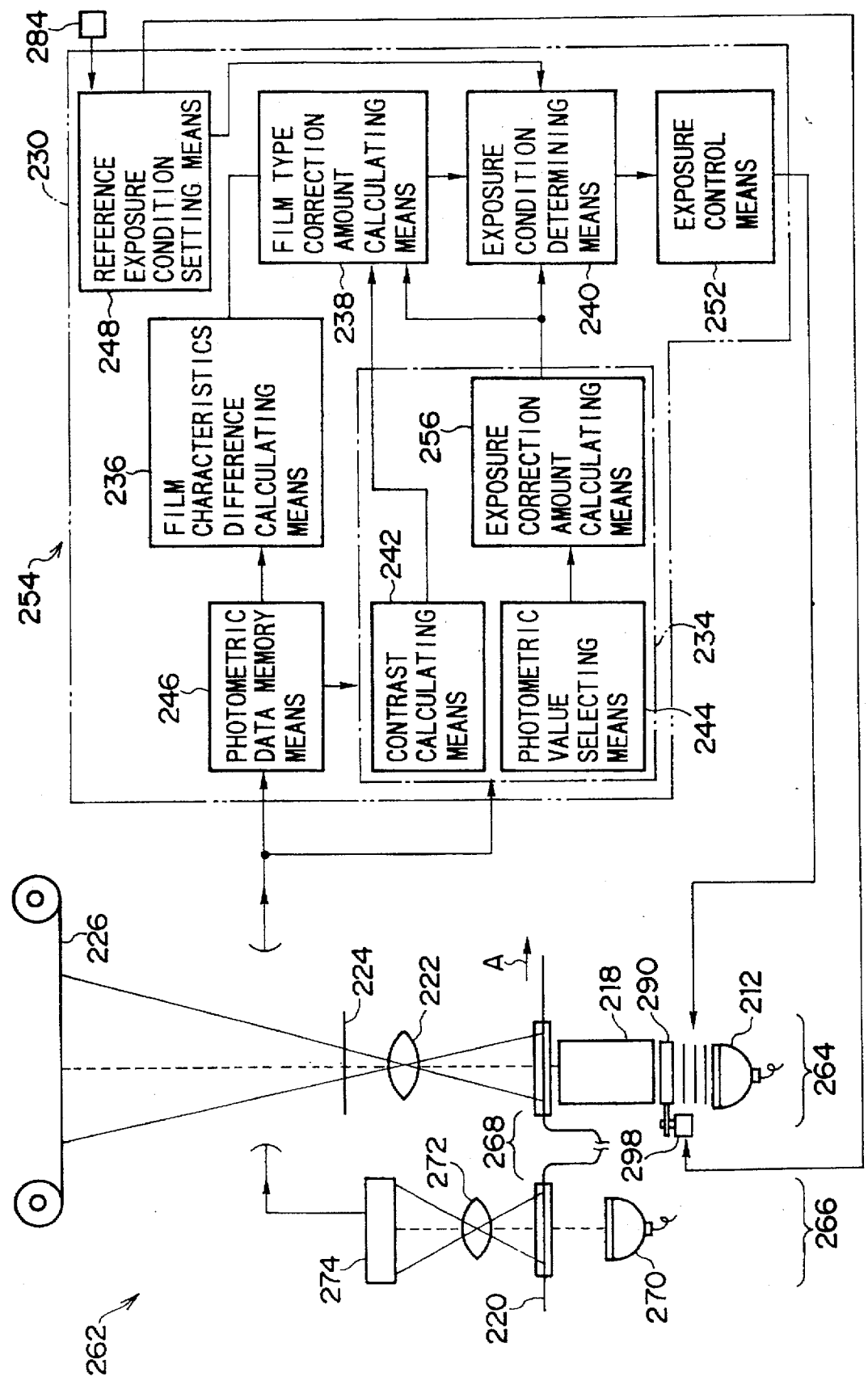
FIG. 27 is a block diagram showing the schematic constructions of a printer section and a controller in accordance with an eighth embodiment of the present invention.

Although the printing system 262 shown in FIG. 27 does not have the ability of light-metering the light attenuation filter 290, the reference exposure condition setting means 248 can be designed to print the color paper 226 under a certain exposure condition by the light passing through the light attenuation filter 290 thereby to establish and manage the reference exposure condition based on the density of a print resulting from various processes including the development.

In case the reference film type is changed, it is necessary to alter various information related to the reference film type, e.g., the factor Kj and film characteristics difference SPECj, and for dealing with this matter, these information relevant to multiple reference film types may be stored in separate detachable memory mediums (e.g., memory cards) and used selectively for the printer processor 210 so that the reference film type and related information can be altered easily.

Although in the foregoing embodiments, the light attenuation filter 290 is located between the light adjustment filter device 216 and mirror box 218, and the reference exposure condition setting means 248 conducts the light metering for the light attenuation filter 290 by means of the photometric device 228, prints the color paper 226 with the light passing through the filter 290 under the exposure condition determined depending on the photometric value of the filter 290, and establishes the reference exposure condition based on the density of the print resulting from various processes including the development, the location of the light attenuation filter 290 is not confined to this position, but it may be disposed between the negative film 220 and the color paper 226 for example. Although this disposition of the filter 290 does not allow itself to undergo the light metering by the photometric device 228, it is possible to design the reference exposure condition setting means 248 to print the color paper 226 with the light passing through the filler 290 under a certain exposure condition and establish the reference exposure condition based on the density of the print resulting from various processes including the development.

Embodiment 9

Figure 28:
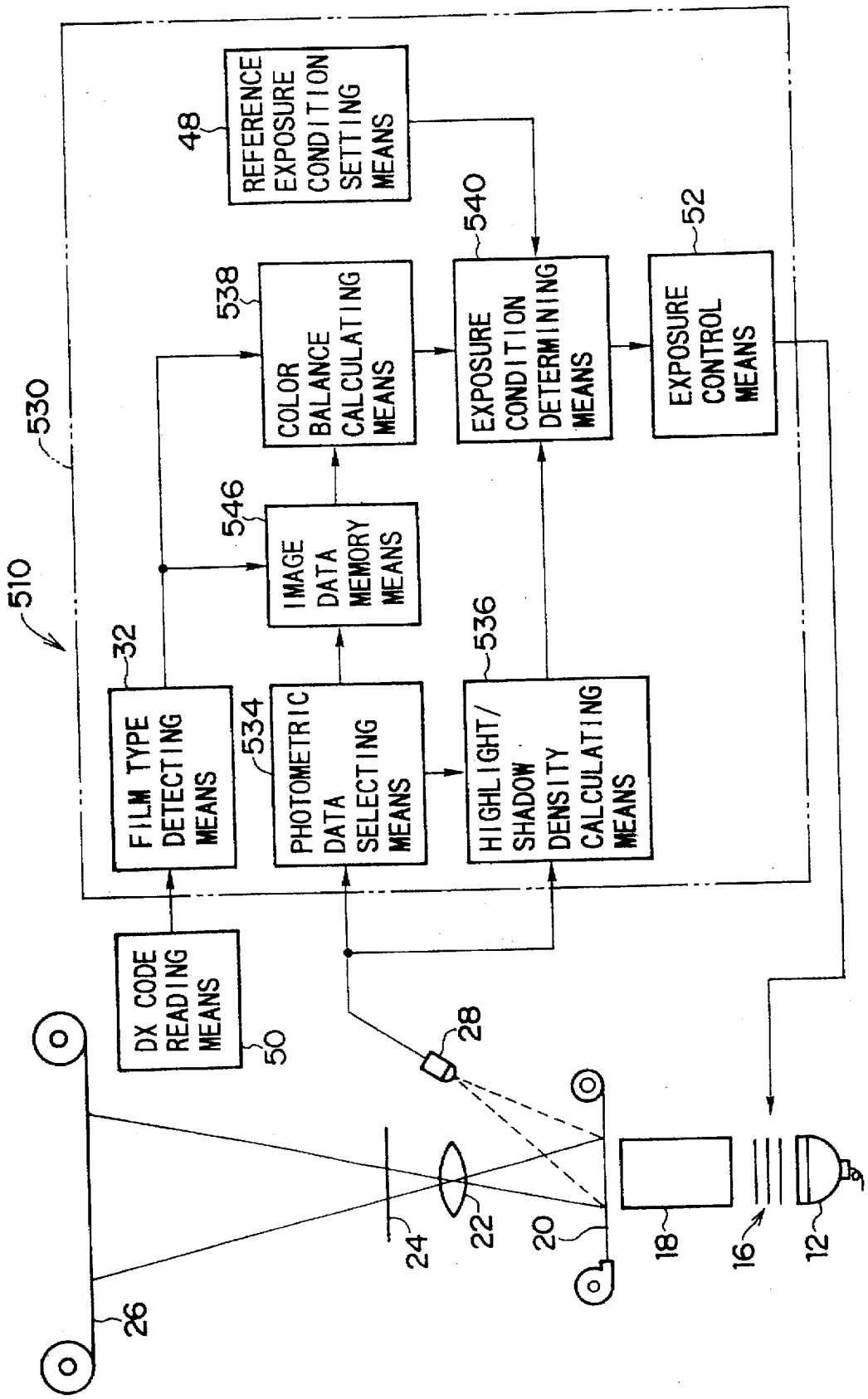
FIG. 28 is a block diagram showing the schematic construction of a photographic printer in accordance with a ninth embodiment of the present invention.

FIG. 28 shows the basic arrangement of a photographic printing apparatus 510 based on the ninth embodiment of the present invention as an image reproducing apparatus of this invention. In the figure, portions identical to those of the first embodiment are referred to by the same symbols and the explanation thereof will be omitted.

The photometric device 28 and DX code reading means 50 are connected to the controller 530 which is formed of a microcomputer and its peripheral devices. It should be noted that various processings conducted by the controller 30 are shown in FIG. 28 as a film type detecting means 32, photometric data selecting means 534, highlight/shadow density calculating means 536, color balance calculating means 538, exposure condition determining means 540, and exposure control means 52. The controller 530 incorporates an image data memory means 546 for storing image data produced by the light metering and a reference exposure condition setting means 48. These means will be explained in brief in the following.

The film type detecting means 32 is identical to that of the first embodiment, and explanation thereof is not repeated.

Photometric data resulting from the light metering of a negative film image by the photometric device 28 is fed to the photometric data selecting means 534 and highlight/shadow density calculating means 536. The photometric data selecting means 534 converts the input photometric data into density data, normalizes the density data by using data already stored in the image data memory means 546, selects only density data necessary for the determination of the exposure condition from among the normalized density data, and delivers the selected data to the image data memory means 546 and highlight/shadow density calculating means 536.

The image data memory means 546 is similar in arrangement to the photometric data memory means 46 of the first embodiment. Namely, the image data memory means 546 has, in correspondence to multiple DX codes, channel data storage areas and image data storage areas identical in arrangement and operation to the photometric data storage areas of the first embodiment, as shown in FIG. 6A. The image data storage areas store cumulatively, as image data, density data provided by the photometric data selecting means 534 in correspondence to DX codes.

In this embodiment, a highlight portion and a non-highlight portion (shadow portion) are defined to be a portion with a density above a prescribed level and a portion with a density below the prescribed level, respectively, and on the distribution of image density, a region for the highlight portion and a region for the shadow portion will be termed "highlight side" and "shadow side", respectively.

The highlight/shadow density calculating means 536 sorts the data provided by the photometric data selecting means 534 into data of highlight side and data of shadow side, calculates the densities of the highlight side and shadow side, and delivers the calculation result to the exposure condition determining means 540. The border of the highlight side and shadow side (the prescribed level mentioned above) is set based on the frequency of the histogram obtained from the photometric data provided by the photometric device 28 (refer to FIG. 32) for example.

The definition of the highlight portion and non-highlight portion (shadow portion) is not confined to the foregoing, but it may be such that a portion with a frequency above R1% is a highlight portion and a portion with a frequency below R2% is a shadow portion (R1>R2) on the histogram of density, for example. In this case, the average densities of data of the highlight portion and shadow portion can be used for the densities of the highlight side and shadow side.

The color balance calculating means 538 fetches data of many images of negative films 20 having the film type imparted by the film type detecting means 32 from the image data memory means 546, calculates based on the introduced data the average color balance of many images at the density region corresponding to the density of the highlight portion of the image to be printed, and delivers the calculation result to the exposure condition determining means 540. The average color balance of many images is specifically represented by the mean value of the maximum density values of red, green and blue sampled in many images.

The exposure condition determining means 540 receives the densities of the highlight side and shadow side calculated by the highlight/shadow density calculating means 536 and the average color balance of many images calculated by the color balance calculating means 538, determines based on the input information the exposure condition for the image recorded on the negative film 20, and delivers the determined exposure condition to the exposure control means 52. The highlight/shadow density calculating means 536 and exposure condition determining means 540 correspond to the image reproduction condition determining means of this invention.

The exposure control means 52 operates the light adjustment filter device 16 to control the exposure condition for printing the color paper 26.

Next, the image printing process conducted by the controller 530 for transferring the image of the negative film 20 onto the color paper 26 based on this embodiment will be explained in detail with reference to the flowchart of FIG. 29. This process is initiated after the negative film 20 is set on the photographic printing apparatus 510.

In step 600, the DX code reading means 50 reads the DX code recorded on the negative film 20. In step 602, the DX code record is searched for the DX code read by the DX code reading means 50 so that the film type of the negative film 20 is identified. This operation corresponds to the film type detecting means 32.

In determining the exposure condition, as will be explained later, if the DX code reading means 50 fails to read the DX code, or in case the image on a negative film 20 having no registered DX code (e.g., 110, 126 or 120-sized negative film) is to be printed, the exposure condition may be determined based on data stored in the negative channel specified by the user.

The image data memory means 546 stores cumulatively image data of individual pixels for red, green and blue separately detected by the photometric device 28 for each film type and sampled at the printing of images of negative films 20 in the past.

The processing in step 604 fetches image data for the film type identified in step 602 from among image data stored in the image data memory means 546. The processing in step 606 determines the film characteristics of this film type in the manner described later, and thereafter calculates, as data indicative of the average color balance of many images at the density region corresponding to the highlight portion of the film image to be printed, the densities Dmxj of three colors of the film characteristics at the density corresponding to the average maximum density Dmxw of three colors of the film image to be printed.

The determination of film characteristics is carried out, for example, as follows. The film characteristic curves are used in this example. Initially, a reference value of the negative film 20 (e.g., the three-color average density (R+G+B)/3, or the density of a particular color) is calculated, and the ratios of the densities of three colors to this reference value are calculated thereby to obtain the characteristic curves of red, green and blue for this film type.

The film characteristics is determined as explained in connection with FIG. 8 through FIG. 11 for the first embodiment, for example.

Following the determination of the film characteristics, the densities Dmxj of three colors are evaluated as follows. The average values DMXR, DMXG and DMXB of the maximum densities of three colors of many images are evaluated from the data introduced in step 604, and the average value of the DMXR DMXG and DMXB is evaluated as the average maximum density Dmxw of three colors as follows.

$$Dmxw=(DMXR+DMXG+DMXB)/3 \quad (8)$$

Subsequently, on the plane of film characteristic curves, with the densities of three colors and the three-color average density being plotted on the vertical and horizontal axes, respectively, the densities Dmxj of three colors (DMXR, DMXG and DMXB) at the density corresponding to the average maximum density Dmxw of three colors of the film image are obtained based on the film characteristics determined previously, as shown for example in FIG. 31. Since the densities Dmxj of three colors at the density corresponding to the average maximum density Dmxw of three colors are calculated based on the film characteristics derived from a great deal of image data, the average color balance of many images represented by the densities Dmxj of three colors will be gray or a near-gray hue as it reflects the film characteristics of the negative film 20.

The processing in step 608 positions a frame of the film to the printing position, and in step 610, the photometric device 28 conducts the light metering for the positioned frame for each color of red, green and blue. The processing in step 612 converts the resulting photometric data into image data dij (where i indicates each pixel and j takes 1, 2 and 3 indicating red, green and blue) indicative of the three-colors densities, and thereafter the three-color average density diw is calculated for each pixel as follows.

$$diw=(diR+diG+diB)/3 \quad (9)$$

Figure 32:
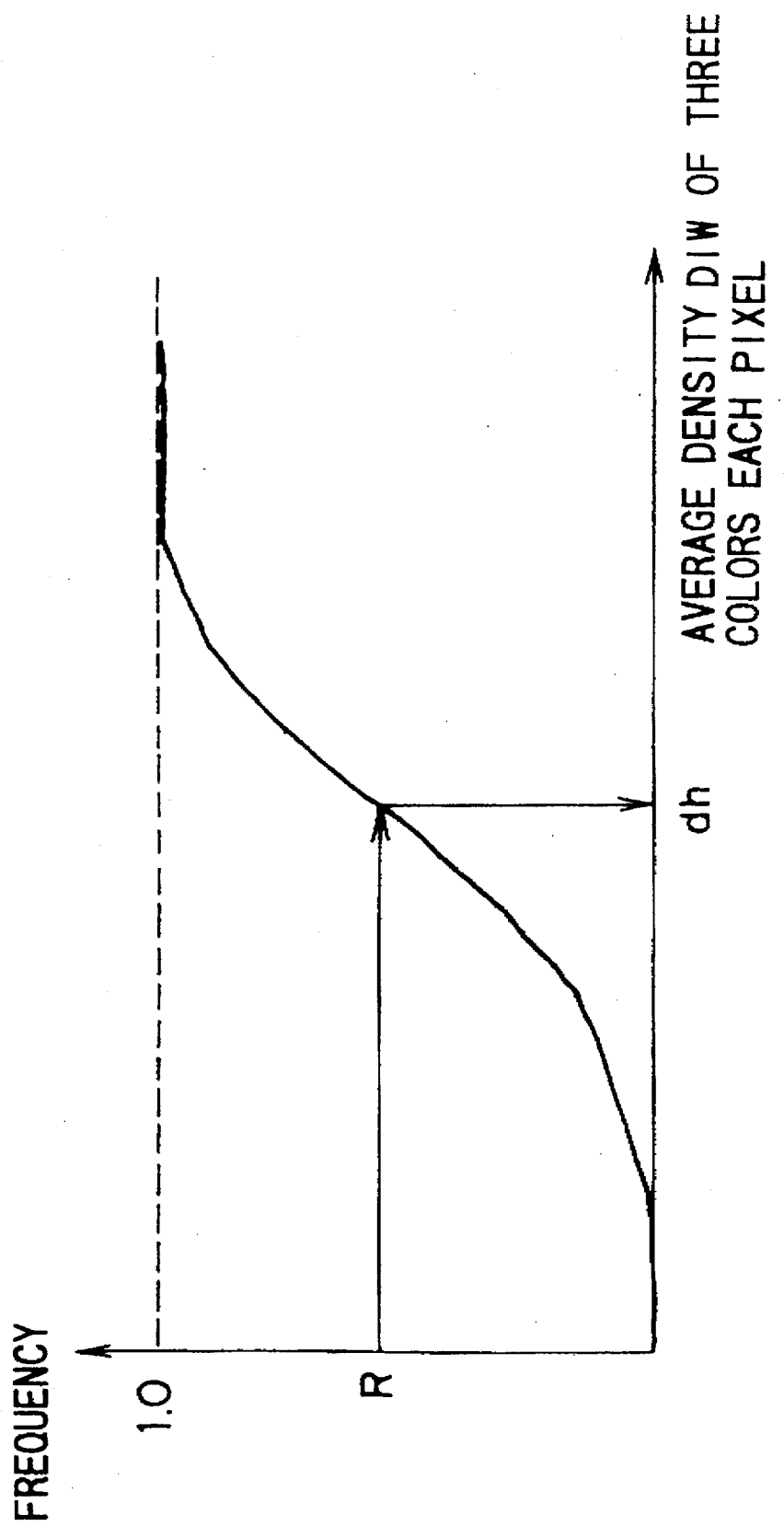
FIG. 32 is a diagram showing the relation of a three-color average density and a cumulative percentage when photometric data every pixel are rearranged in accordance with the magnitude of a three-color average density value and are cumulated from smaller values.

The processing in step 614 rearranges the average densities diw of three colors obtained for all pixels in the order of magnitude and evaluates the total number N of pixels, and the histogram of the three-colors average density for all pixels of the image is formed as shown for example in FIG. 32.

The processing in step 616 calculates the average density dh at the frequency R% on the histogram formed in the preceding step (refer to FIG. 32). This average density dh is used for the border of the highlight side and shadow side of the image in this embodiment, and it will be termed "border density dh". The value of R in FIG. 32 is specifically 50%, as an example, in this embodiment.

The processing in step 618 implements the exposure condition determining process, and it will be explained with reference to the flowchart of FIG. 30.

Initially, step 630 selects photometric data. This selection process is to select, as data used for the calculation of the exposure control value, data that belongs to a specific color region, e.g., a color region including a neutral color (gray) or skin color, defined on the color coordinate plane having axes of the difference of red and green (R'–G') and the difference of green and blue (G'–B'), based on the film characteristics. The method of data selection was already explained in the first embodiment, and further explanation is omitted.

The processing in step 632 stores, in the image data memory means 546, the selected data in connection with the film type identified in step 602. The processing in step 634 tests for the selected data as to whether the three-colors average density diw of each pixel is above the border density dh thereby to find that pixel belongs to the highlight side or shadow side, and thereafter calculates by using the pixel data of the highlight side the highlight-side average density Dhj of the image as follows.

$$Dhj=\left(\sum_{i=1}^{Nh} dij\right)/Nh \quad (10)$$

where Nh is the number of pixels that belong to the highlight side of the image.

The processing in step 636 calculates by using the pixel data of the shadow side the shadow-side average density Dsj of the image as follows.

$$Dsj=\left(\sum_{i=1}^{Ns}\right)/Ns \quad (11)$$

where Ns is the number of pixels that belong to the shadow side of the image.

The processing in step 638 modifies the average density of the shadow side Dsj in accordance with the densities Dmxj of three colors which represent the average color balance of many images thereby to evaluate the modified density data Dmj of three colors as follows.

$$Dmj=Dsw+Dmxj-(DmxR+DmxB+DmxB)/3 \quad (12)$$

where Dsw is the three-colors average density of the shadow side, i.e., Dsw=(DsR+DsG+DsB)/3.

The above equation (12) reveals that the modified density data Dmj can be evaluated by correcting the three-colors average density Dsw of the shadow side in accordance with the average color balance of many images at the density corresponding to the three-colors average maximum density Dmxw of the film image to be printed as represented by the densities Dmxj of three colors sampled in data of many images.

The processing in step 640 calculates the exposure control values Dj of three colors as follows.

$$Dj=K1\cdot Dhj+K2\cdot Dmj \quad (13)$$

where K1 and K2 are factors (K1+K2=1.0, K1>0).

The above equation (13) reveals that the exposure control value Dj can be evaluated by summing the highlight-side average density Dhj and the modified density data Dmj, with the weighting factors K1 and K2 being applied thereto respectively. Accordingly, the exposure control value Dj reflects the density of highlight side represented by the average density Dhj and the color balance.

In the equation (13), the balance of three colors of the exposure control values Dj does not only depend on the balance of three colors of the average densities Dhj of the highlight side, but it also varies depending on the average color balance of many images at the density corresponding to the density of highlight portion (three-colors average maximum density Dmxw in this case) of the film image to be printed. On this account, in case the density of the main portion of the image to be printed differs greatly from the average densities Dhj of the highlight portion, such as an image of a back-lighted object, or in case the image to be printed includes a highlight portion of small area, the balance of average densities Dhj of the highlight side among three colors often deviates from the balance of three colors at the main portion of the image. Whereas, according to this embodiment, the influence of the three-colors balance of the average densities Dhj of the highlight portion is alleviated by the modified density data Dmj, and therefore appropriate exposure control values Dj can be obtained.

The balance of the modified density data Dmj among three colors corresponds to the average color balance of many images represented by the three-colors densities Dmxj, which are obtained from the data selected by the photometric data selecting means 34 out of photometric data sampled from many images, i.e., from data with data causing the color failure being removed, and similarly the average densities Dhj of the highlight side are calculated from the data selected by the photometric data selecting means 534 out of the photometric data of the image to be printed. In any case, the calculation is based on data with data causing the color failure being removed, and the exposure control values Dj calculated from the modified density data Dmj and average densities Dhj of highlight side can be rid of the influence of data causing the color failure, and consequently the exposure condition can be determined so that the color failure does not emerge on the printed picture.

The processing in step 642 determines the exposure condition made up of the exposure values of three colors from the calculated exposure control values Dj of three colors and the reference exposure condition established by the reference exposure condition setting means 48 as follows.

$$\log Ej=Sj(Dj-Dnj)+Dpj \quad (14)$$

where Ej is the exposure value of each color, Sj is the slope actor of each color, Dnj is the reference negative film density, and Dpj is another exposure value modification data.

Among the terms of the equation (14), the reference negative film density Dnj and part of the exposure value modification data Dpj are correspondent to the reference exposure condition established by the reference exposure condition setting means 48 and are set based on the reference exposure condition, and the remaining exposure value modification data Dpj and slope actor Sj are set by being read out as channel data for the film type of the negative film 20 from the image data memory means 546.

Since the exposure condition is calculated by using the exposure control values Dj in the equation (14), the exposure condition can be determined so that the main portion of picture has a correct color balance depending on the film characteristics even in case the main portion differs greatly in density from the highlight portion, or even in case the image includes a highlight portion of small area. Consequently, even for the content of image where the emphasis of highlight portion is undesirable, the exposure condition can be determined so that the main portion of picture has a correct color balance depending on the film characteristics which varies among film types, and it is possible to produce high-quality printed pictures at a high yield.

Figure 30:
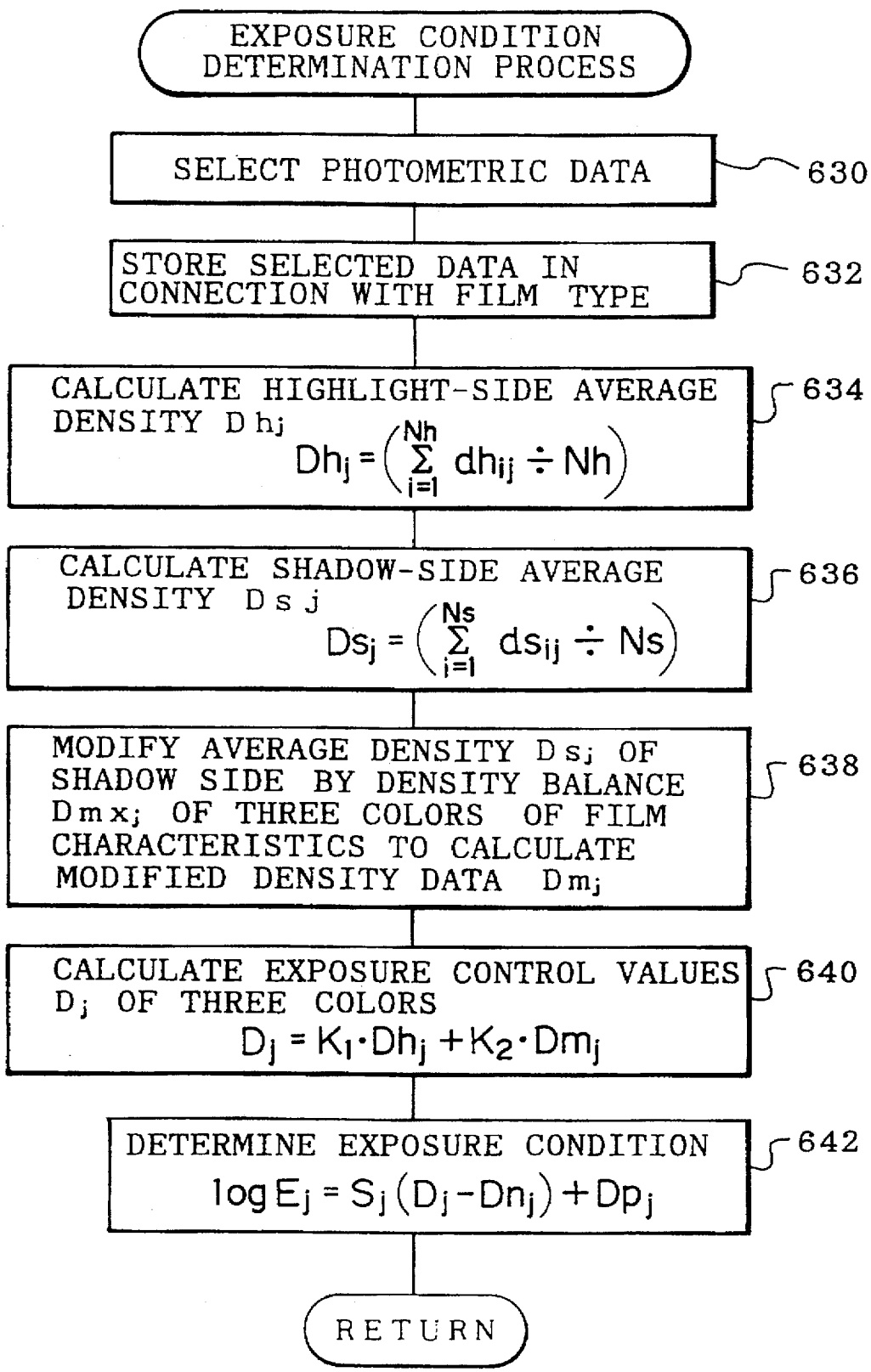
FIG. 30 is a flow chart for explaining exposure condition determining processing in the ninth embodiment.

After the exposure condition has been determined as described above, the processing proceeds to step 620 on the flowchart of FIG. 30, in which the light adjustment filter device 16 is operated so that the frame of negative film positioned to the printing position is transferred onto the color paper 26 under the determined exposure condition. The processing in step 622 tests whether all frames of one negative film 20 have been printed. If the condition of step 622 is negated, the processing returns to step 608, and the steps 608–622 are repeated until the step 622 is affirmed. When the condition of step 622 is affirmed, the operation terminates.

Embodiment 10

Figure 33A:
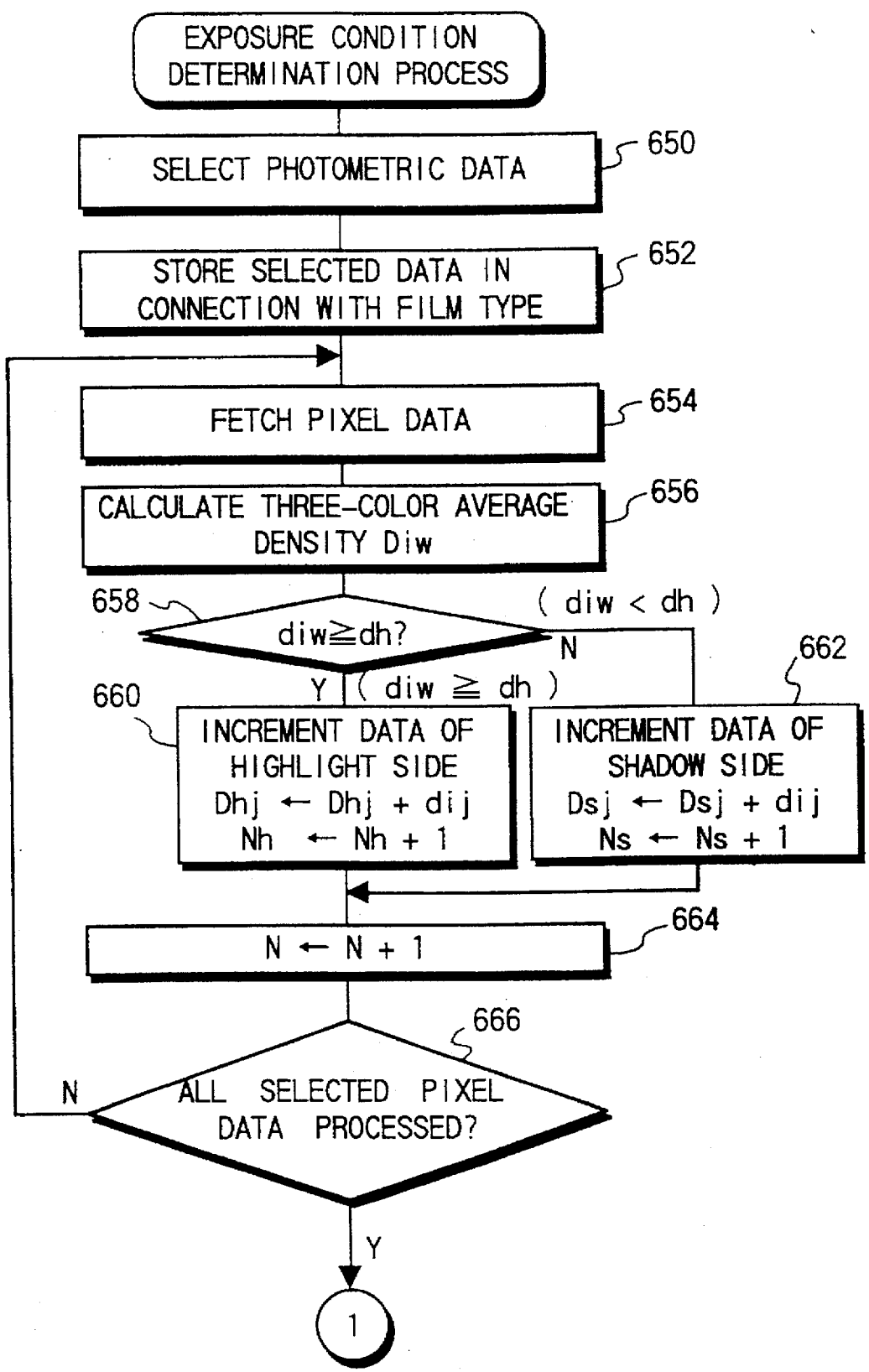
FIGS. 33A and 33B are flow charts for explaining exposure condition determining processing in a tenth embodiment of the present invention.
Figure 33B:
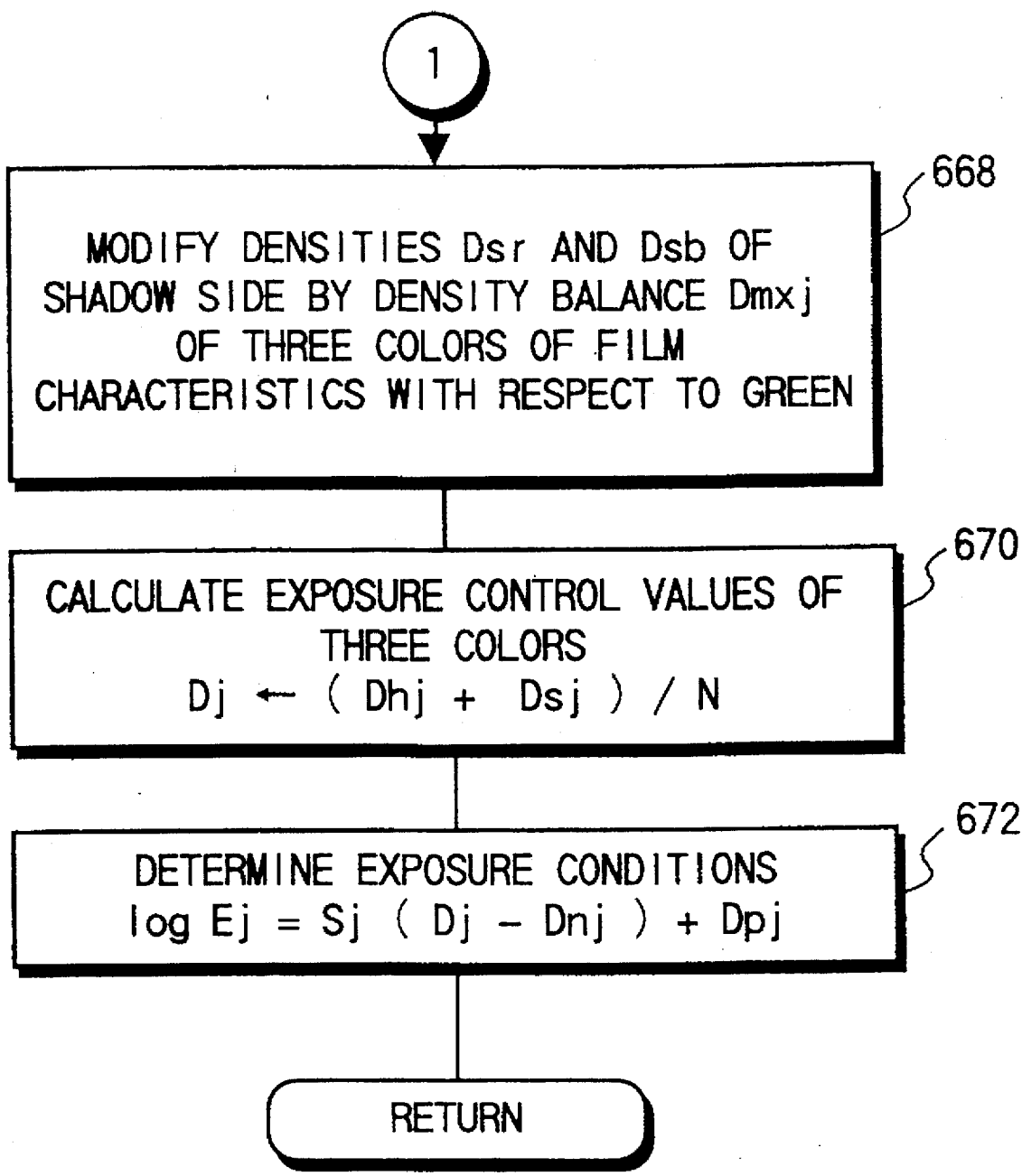

The printing system based on the tenth embodiment of the present invention will be explained. Since the structure of the printing system according to the present embodiment is the same as that of the printing system according to the ninth embodiment, the explanation thereof will be omitted. Hereinafter, the operation of the present embodiment will be described with reference to the flowcharts of FIGS. 33A and 33B.

In step 650, photometric data is selected in the same manner as that in step 630 of the flowchart of FIG. 30 which has been explained in the ninth embodiment. In step 652, the selected data is stored in the image date memory means 546 in the same manner as that in step 632 of the flowchart of FIG. 30. In step 654, data dij for a certain pixel is fetched from the selected data. In the next step 656, the three-color average density diw of the certain pixel is calculated in accordance with formula (9).

In step 658, it is tested whether the three-color average density diw of the certain pixel calculated in step 656 is equal to or higher than the border density dh at the frequency R% on the histogram described in the ninth embodiment. In the present embodiment, R% may be other than 50%. When the condition of step 658 is affirmed, the processing moves to step 660 in which the three-color average density diw of the certain pixel is cumulatively added to the highlight-side cumulative density Dhsj in accordance with the following formula (15), and the highlight-side pixel number Nh is incremented in accordance with formula (16). Subsequently, the processing moves to step 664.

$$Dhsj = Dhsj + dij \quad (15)$$

$$Nh = Nh + 1 \quad (16)$$

When the condition of step 658 is negated, the processing proceeds to step 662 in which the three-color average density diw of the certain pixel is cumulatively added to the shadow-side cumulative density Dssj in accordance with the following formula (17), and the shadow-side pixel number Ns is incremented in accordance with formula (18). Subsequently, the processing moves to step 664.

$$Dssj = Dssj + dij \quad (17)$$

$$Ns = Ns + 1 \quad (18)$$

In step 664, the total pixel number N is incremented in accordance with the following formula (19).

$$N = N1 \quad (19)$$

In step 666, it is judged whether or not the above-described processing is performed all pixel data selected in step 650. When the condition of step 666 is negated, the processing returns to 654 so as to repeat the above-described processing for other pixel data. With this operation, for a pixel having a three-color average density diw which is equal to or higher than the reference density dh, the three-color average density diw is cumulatively added to the highlight-side cumulative density Dhsj, and the highlight-side pixel number Nh is incremented. For a pixel having a three-color average density diw which is lower than the reference density dh, the three-color average density diw is cumulatively added to the shadow-side cumulative density Dssj, and the shadow-side pixel number Ns is incremented.

When the condition of step 666 is affirmed, the processing proceeds to step 668 in which the cumulative density $Dss_R$ for R and the cumulative density $Dss_B$ for B among the shadow side cumulative densities Dssj are corrected in accordance with the following formulae (20) and (21) so that they are corrected by the three-color densities Dmxj which represents the balance of three color in many images at a density corresponding to the three-color average maximum density Dmxw of images on a film to be printed.

$$Dss_R = Dss_G + Ns \cdot (Dmx_R - Dmx_G) \quad (20)$$

$$Dss_B = Dss_G + Ns \cdot (Dmx_B - Dmx_G) \quad (21)$$

The above-described correction is equivalent to the replacement of the color balance represented by the shadow side cumulative density Dssj with the color balance which is determined based on G of a plurality of images at a density corresponding to the three-color average maximum density Dmxw of images on a film to be printed. Hence, the average value of the shadow-side cumulative density Dssj (three-color average density of the shadow side) does not change. Accordingly, the density of an image to be printed accurately reflects on the exposure control values Dj which are calculated, in step 670, using the shadow-side cumulative density Dssj.

In step 670, the exposure control values Dj of three colors are determined, based on the highlight-side cumulative density Dhsj and the shadow side cumulative density Dssj which has been corrected in the above-described manner, in accordance with the following formula (22).

$$Dj = (Dhsj + Dssj)/N \quad (22)$$

In formula ((22), the highlight-side cumulative density Dhsj and the shadow-side cumulative density Dssj are simply summed, which is then divided by the total pixel number N. Since a weight of Nh/N is added to the highlight-side cumulative density Dss1 while a weight of Ns/N is added to the shadow-side cumulative density Dssj. In other words, the highlight-side cumulative density Dss1 and the shadow-side cumulative density Dssj are weighed proportionally to the highlight-side pixel number Nh and the shadow-side pixel number Ns.

In step 672, the exposure condition Ej is calculated in accordance with formula (14) using the exposure control values Dj which is calculated in the above-described manner. When a highlight portion having a small area exists in an image, the value of the highlight-side pixel number Nh decreases so that the weight coefficient for the highlight-side cumulative density Dhsj becomes smaller, with which the exposure control values Dj are calculated. Hence, even when the highlight portion in a small area has a color balance biased to a specific color, the exposure control values Dj and the exposure conditions are affected by the biased color balance only to a decreased degree. Since the exposure conditions can be determined such that the major part of the image is printed with a proper color balance even when a small highlight portion exists in the image, an image having proper image quality can be obtained by the print process at a high probability.

Embodiment 11

Figure 34:
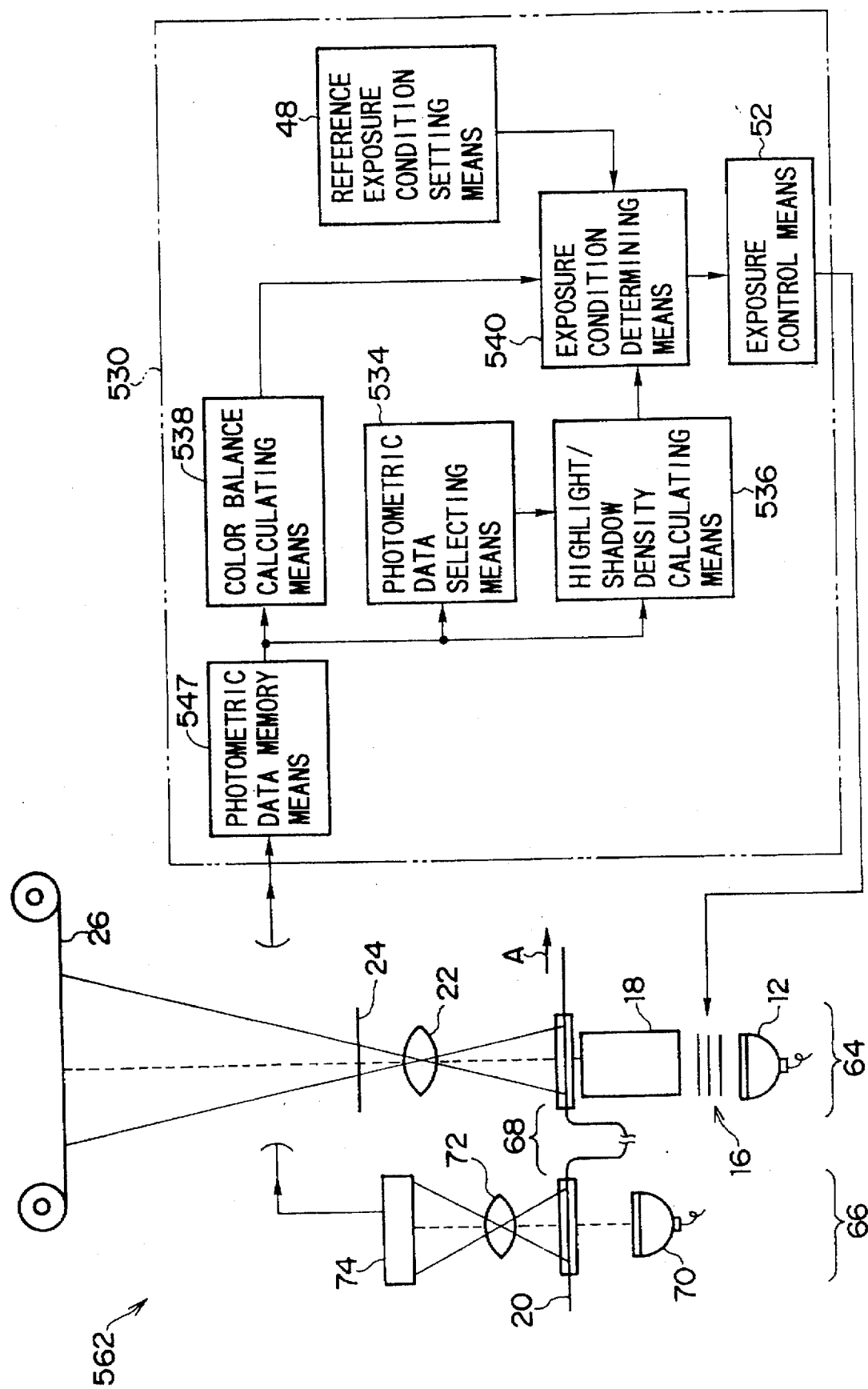
FIG. 34 is a block diagram showing the schematic construction of a photographic printer in accordance with an eleventh embodiment of the present invention.

FIG. 34 shows the basic arrangement of a photographic printing apparatus 530 based on the eleventh embodiment of the present invention as an image reproducing apparatus of this invention. In the figure, portions identical to those of the ninth embodiment are referred to by the same symbols as those used in the ninth embodiment while portions identical to those of the fourth embodiment are referred to by the same symbols as those used in the fourth embodiment, and the explanation thereof will be omitted.

In the photographic printing apparatus 530, instead of using data of many images recorded on negative films of the same film kind as used in the ninth and tenth embodiments, data of a plurality of images which are recorded on a common negative film 20 is used. Thai is, the photometric data memory means 547 is connected to the color balance calculating means 538, the photometric data selecting means 534, and the highlight/shadow density calculating means 536. Data of a plurality of images recorded on the common film 20 is input to the color balance calculating means 538 and the photometric data selecting means 534 via the photometric data memory means 547. Also, data of an image to be printed is input to the highlight/shadow density calculating means 536 via the photometric data memory means 547.

In the color balance calculating means 538, a calculation is performed based on the input data to obtain an average color balance of the plurality of images at a density corresponding to the three-color average maximum density Dmxw of an image of the film to be printed, as described in the ninth and tenth embodiments. In the photometric data selecting means 534, data of an image to be printed is standardized using the data of the plurality of images in a manner described in the first embodiment. Form the standardized data, data necessary to determine the exposure conditions are selected and are output to the highlight/shadow density calculating means 536.

In the highlight/shadow density calculating means 536, a histogram is obtained using the data input from the photometric data memory means 547, and a border between the highlight side and the shadow side is obtained. Subsequently, the highlight-side density and the shadow-side density are calculated based on the boarder and the data input from the photometric data memory means 547. In the exposure condition determining means 540, exposure conditions are determined based on the average color balance of the highlight side of the plurality of images and the highlight-side density and the shadow-side density of the image to be printed, which are calculated in the above-described manner. The manner or determined the exposure conditions is the same as those used in the ninth and tenth embodiments.

It is considered that the data of the plurality of images recorded on the common negative film 20 represent the film characteristics of the negative film 20. Therefore, proper exposure conditions can be obtained which are comparable to the exposure conditions determined in the ninth and tenth embodiments in which data of many images are used. Also, since the film kind of the negative film 20 to be printed is not required to be judged, proper exposure conditions can be obtained even when the film kind of a film cannot be judged, for example, when a film having a size of 110, 126 or 120 to which no DX code is attached is used.

The exposure condition determining process in which data of a plurality of images recorded on a common negative film 20 is used can be applied to photographic printing apparatuses other than the photographic printing apparatus 530 having the structure shown in FIG. 34. For example, the light metering section 66 and the exposure section 64 may be separated from each other (no conveying path for conveying a negative film is formed between the light metering section and the exposure section). In this case, data obtained in the light metering section 66 are successively stored in a memory medium such as a memory card which corresponds to the memory means of the present invention. In the exposure section 64, data stored in the memory medium such as a memory card are readout to obtain data on the plurality of images recorded on the common negative film 20. Also, the structure of the photographic printing apparatus shown in FIG. 28 may be modified such that light metering is successively performed for a plurality of images recorded on a common negative film 20 while conveying the negative film 20 in one direction, and that exposure is successively performed for the plurality of images recorded on the common negative film 20 while conveying the negative film 20 in the opposite direction.

In the above-describe embodiments, the reference exposure condition including the reference negative film density Dnj, which is represented by formula (14) is set by the reference exposure condition setting means 48 using a film of a reference film kind for condition setting. However, the present invention is not limited thereto. For example, a light reducing filter may be disposed between the light adjustment filter section 16 and the mirror box 18 such that the light adjustment filter can be advanced and retracted against the path of exposure light. The light is measured by the photometric device 28 after passing the light reducing filter to obtain a photometric value. This photometric value may be used in place of the reference negative film density Dnj.

In the exposure condition determining process which has been described in the above embodiments, it is preferred that a negative film having balanced film characteristics (gradation balance) in each color be used as a reference film kind. However, a negative film having an unbalanced gradation may be used as a reference film kind. In this case, it is preferred to use, as a color paper 26, a color paper having paper characteristics suited for the film characteristics of the reference film. Also, it is preferred to compensate for the difference between the film characteristics of the reference film kind and the film characteristics of a negative film 20 on which images to be printed are recorded.

Figure 29:
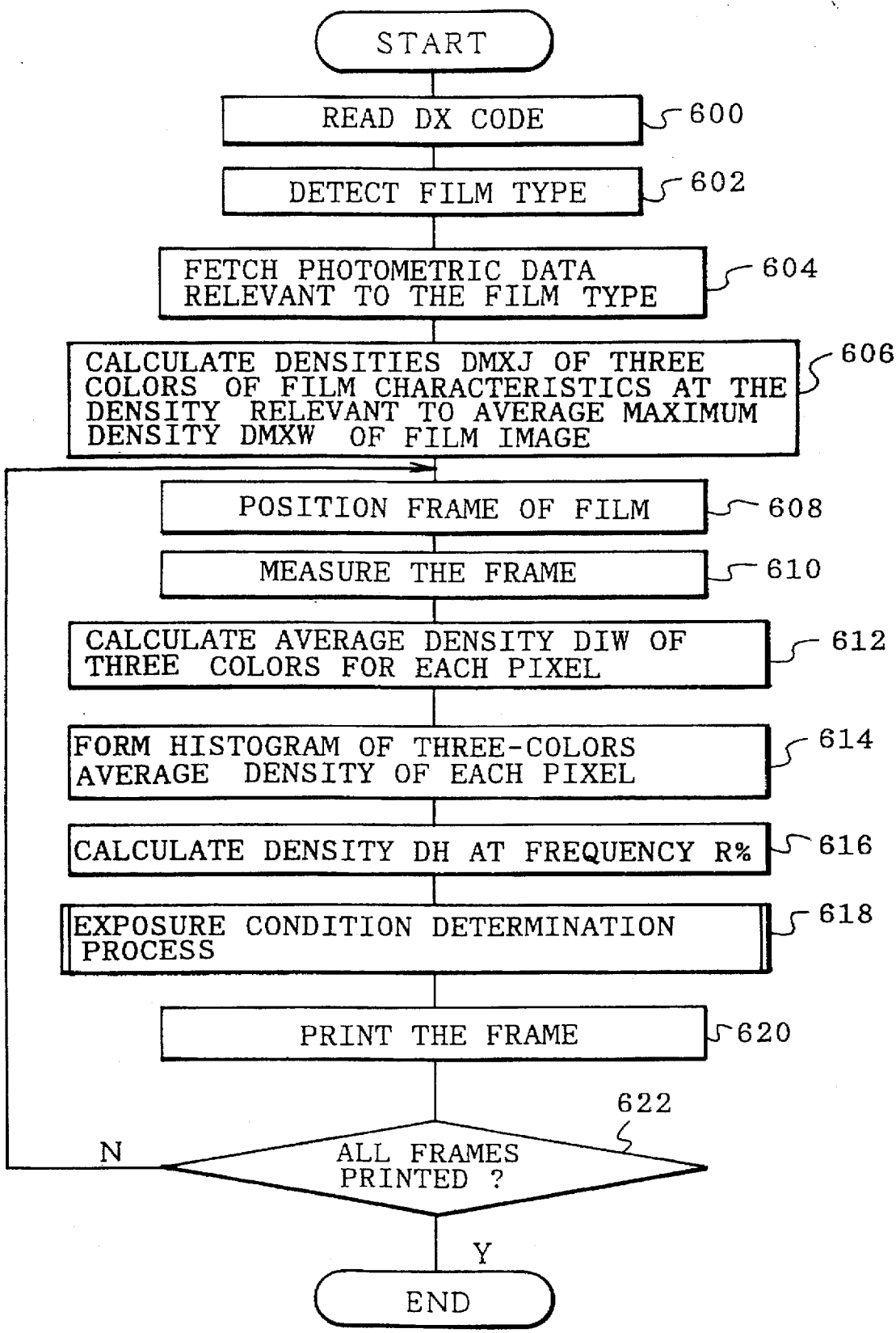
FIG. 29 is a flow chart for explaining contents of image printing processing as an operation of the photographic printer in the ninth embodiment.

That is, the processing in step 606 of the flowchart of FIG. 29 is modified such that instead of using the film characteristic curve of a certain film as is to obtain the densities Dmxj of three colors, the film characteristic curve is used after compensation in which the inclination of the film characteristic curve is compensated based on the film characteristic curve of the reference film (the inclination of the film characteristic curve of the film/the inclination of the film characteristic curve of the reference film). This is equivalent to the compensation in which the inclination of the film characteristic curve of the film is compensated by regarding the inclination of the film characteristic curve of the reference film as 1.0. When the densities Dmxj of three colors, which represent the average color balance of many images, are obtained using the film characteristic curve which has been compensated in the above-described manner, the densities Dmxj of three colors which have been compensated for the difference in the film characteristics can be obtained. Accordingly, by using the Dmxj, it becomes possible to obtain exposure conditions which allow images recorded on the negative film 20 to be printed on the color paper 26 with proper image quality, which color paper has paper characteristics suited for the film characteristics of the reference film.

When the color paper 26 which has paper characteristics suited for the film characteristics of the reference film is used, there is a correlation between the film characteristics of the reference film and the paper characteristics of the color paper 26. Accordingly, the above-described difference in the film characteristics can be compensated for by compensating the film characteristic curve in accordance with the gradation balance of the paper characteristics of the color paper 26. More specifically, the inclination of the film characteristic curve shown in FIG. 31 is compensated using a correction amount mj (=three-color average gradation of the color paper/the average gradation of each color of the color paper). For example, when the average gradations of three colors of the color paper 26 are R=2.73, G=3.18 and B=2.64, the three-color average gradation becomes 2.85 (=(2.73+3.18+2.64)/3). Accordingly, the inclination of the film characteristic is made 1.04 times (=2.85/2.73) for R, 0.90 times (=2.85/3.18) for G, and 1.08 times (=2.85/2.64) for B. By using the compensated film characteristic curve, the densities Dmxj of three colors which have been compensated for the difference in the film characteristics can obtained. As a result, it becomes possible to obtain exposure conditions which allow images recorded on the negative film 20 to be printed on the color paper 26 with proper image quality.

To carry out the above-described compensation, information representing the paper characteristics of the color paper 26 such as the gradation data must be obtained. Such information may be automatically obtained by performing processes such as exposure, development and density measurement for the color paper 26 in the image reproducing apparatus. Alternatively, a user may input such information using input means such as a keyboard.

In the above-described embodiments, a three-color average maximum density Dmxw is used as a density of an image in a highlight portion, and densities Dmxj of three colors are calculated which represent an average color balance of many images at a density corresponding to the three-color average maximum density Dmxw on the film characteristic curve. However, the present invention is not limited thereto, and the densities Dmxj of three colors at the density corresponding to the three-color average maximum density Dmxw can be obtained using a three-color average density in the highlight portion of an image to be printed. Also, it is possible to use, as data representing the average color balance of many images, the value which is obtained by summing the densities Dmxj corresponding to the three-color average maximum density Dmxw of an image to be printed and the densities Dmnj corresponding to the three-color average minimum density Dmnw of the image after giving them weighting coefficients such that Dmxj have a larger weight.

In the above-described embodiments, data for the shadow side are compensated using data which represent an average color balance of many images at a density corresponding to the density in the highlight portion of the image to be printed. However, the data for the shadow side may be compensated using data which represent an average color balance of many images at a density corresponding to the density in the main portion of the image to be printed. As the main portion of the image to be printed, a color area having a predetermined shape may be extracted and selected. Since the main portion o the image is located in the central portion of the image with a high probability and the peripheral portion of the image is probably a background, the area corresponding to the main portion of the image can be estimated and extracted based on these facts.

The three-color average density and the like in an area corresponding to the main portion of the image which has been extracted in the above-described manner are calculated, and the color balance of data for the shadow side is corrected in accordance with formula (14), or formulae (20) and (21) using the average balance of many images in a density range corresponding to the calculated density. As described above, instead of using the density in the highlight portion of an image to be printed, the density in the main portion of the image is used, and the average color balance of many images in a density range corresponding to the above-described density is used. Even in such a case, it is possible to obtain exposure conditions which allow an image photographed with back light and an image photographed with an electric flash to be exposed for printing such that the color balance in the main portion becomes proper.

In a photographic printing apparatus, a density correction value for the three-color average density of the entire image is generally calculated before printing. The density correction value can be obtained in a manner described in JP-A-51-138435 or JP-A-61-2145. That is, the maximum density, the minimum density, the average density of an image, the densities of the image in the upper half and the lower half thereof, the density of a portion having a high contrast (a portion where a difference in density is produced between adjacent pixels) and the like are extracted as image characteristic values, and a statistical calculation is performed based on the exacted image characteristic values such that the image is printed to have a proper density in its main potion. The density of the main portion can be obtained by formula (17), for example, from the density correction value which has been calculated for an image to be printed. Also, the color balance of the data for the shadow side can be corrected using the average color balance of many images in a density range corresponding to the obtained density so as to obtain exposure conditions for properly printing the main portion. For example, the density of the main portion can be calculated in accordance with the following formula (23):

$$Dmj = Dw + K \cdot Dkey \qquad (23)$$

where Dkey is a density correction value for an image to be printed (0 means no correction), Dw is a three-color average density of the entire image, and k is a constant. The constant k is set to a proper value (for example, "0.07") such that the exposure amount varies in accordance with a variation in the value of Dkey, in the case where the exposure amount is increased by 20% every time the Dkey is increased by 1.0.

Figure 31:
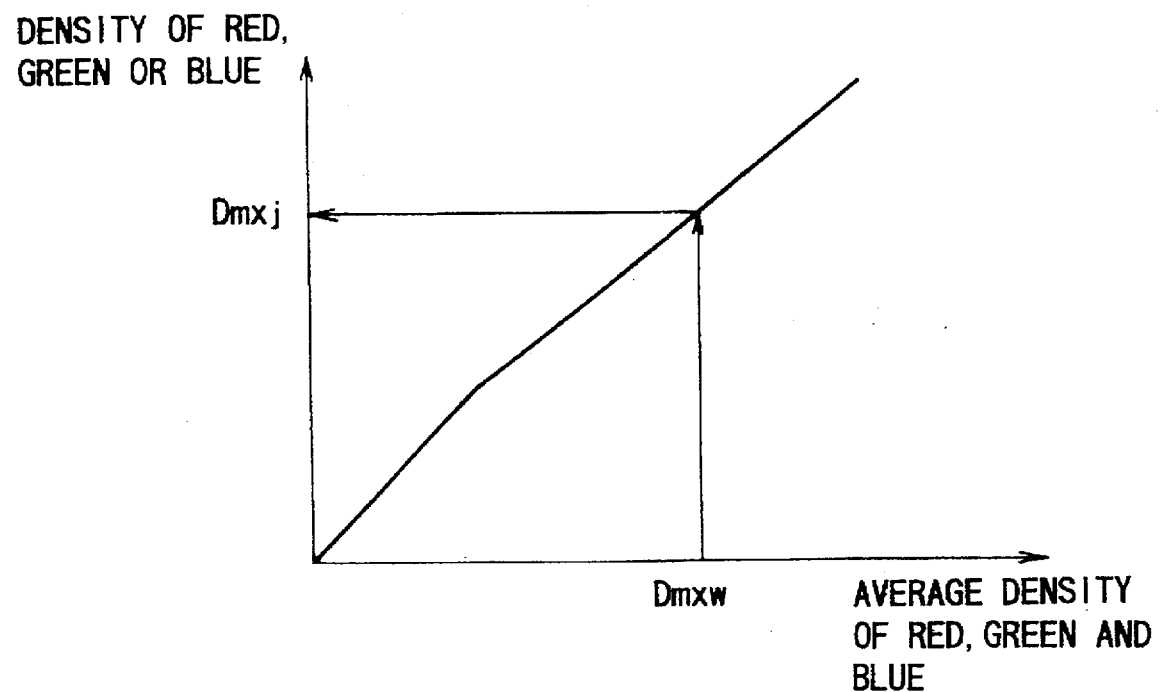
FIG. 31 is a diagram for explaining processing for calculating a density $Dmx_j$ of each of three colors corresponding to a three-color average maximum density $Dmxw$ of a film image with respect to a film characteristic curve showing the relation of average densities of R, G and B and densities of the respective colors of R, G and B on the basis of film characteristics calculated from data of many images.

In the above-described embodiments, the film characteristic curve shown in FIG. 31 wherein the axis of abscissa represents the average densities of R, G and B while the axis of ordinate represents the density of any one of R, G and B is used to obtain data representing the average color balance of many images. However, the present invention is not limited thereto, and any characteristic curve representing a film characteristic can be used, such as a film characteristic curve in which the axis of ordinate represents color differences which are calculated using one color as a reference (for example, R–G and B–G).

The film characteristic curve of a negative film non-linearly varies with complexity, especially, at its lower end which corresponds to the shadow side, and a slop coefficient in the exposure conditions is provided to reduce the influence due to the non-linear portion of the film characteristic curve, thereby obtaining printed images having proper quality. By contrast, in the present invention, instead of using the information on the color balance for the shadow side of an image to be reproduced, only information representing the three-color average density is extracted from data corresponding to the non-linear portion so as to determine exposure conditions. Accordingly, even when the slope coefficient is fixedly set to "1.0" to prevent the correction or compensation using the slope coefficient from being carried out, printed images with proper image quality can be obtained at a high probability. In the case where the slope coefficient is fixedly set to "1.0", it becomes unnecessary to set and maintain the slope coefficient although variation in the amount of light from the light source must be managed. Accordingly, the condition can be set and maintained without using a reference film for condition setting.

What is claimed is:

1. An image reproducing apparatus comprising:

a photometer for dividing an image recorded on a predetermined film to be reproduced into many divisional images, decomposing the divisional images into plural colors and optically measuring the plural colors;

memory for storing data obtained by the optical measurement of said photometer;

reference reproduction condition setting means for setting a reference reproduction condition for suitably reproducing an image recorded on a predetermined reference film onto a reproducing material;

image characteristic amount calculating means for calculating image characteristic amount information including information regarding a contrast of said image to be reproduced on the basis of the data obtained by the optical measurement of said photometer;

correction amount calculating means for calculating a correction amount for correcting reproduction conditions in accordance with a difference in kinds of film on the basis of film characteristic difference information showing a difference between film characteristics of said predetermined film and film characteristics of said reference film, and the image characteristic amount information calculated by said image characteristic amount calculating means;

reproduction condition determining means for determining the reproduction conditions of said image to be reproduced by using the reference reproduction condition set by said reference reproduction condition setting means and the correction amount calculated by said correction amount calculating means; and reproducing means for reproducing said image to be reproduced onto the reproducing material in accordance with the reproduction conditions determined by said reproduction condition determining means.

2. An image reproducing apparatus according to claim 1, further comprising:

judging means for judging the kind of the predetermined film in the above first construction, the data obtained by the optical measurement of said photometer being stored in said memory while being separated for kinds of film; and film characteristic difference calculating means for calculating said film characteristic difference information on the basis of data for film which is the same kind as the predetermined film stored in said memory, wherein said correction amount calculating means calculates the correction amount on the basis of the film characteristic difference information calculated by said film characteristic difference calculating means.

3. An image reproducing apparatus according to claim 1, further comprising:

judging means for judging the kind of the predetermined film, and film characteristic difference memory for storing the film characteristic difference information showing the difference between the film characteristics of the predetermined film and the film characteristics of the reference film while separating the film characteristic difference information for kinds of film, wherein said correction amount calculating means calculates the correction amount on the basis of the film characteristic difference information for film of the same kind as the predetermined film stored in said film characteristic difference memory.

4. An image reproducing apparatus according to claim 1, further comprising:

film characteristic difference calculating means for calculating the film characteristic difference information based on data of plural images recorded onto the predetermined film stored in said memory.

5. An image reproducing apparatus according to claim 1, wherein said correction amount calculating means calculates the correction amount such that this correction amount is increased as the contrast of an image shown by the information regarding said contrast is increased.

6. An image reproducing apparatus according to claim 1, wherein said image characteristic amount information includes information regarding the density of a main portion of the image to be reproduced, and said correction amount calculating means calculates the correction amount such that this correction amount is increased as the density of the main portion shown by the information regarding the density of the main portion of the image is biased to a highlight side of the image.

7. A method of determining reproduction conditions, comprising the steps of:

dividing an image recorded on a predetermined film to be reproduced into many divisional images, decomposing the divisional images into plural colors, and optically measuring the plural colors;

storing data obtained by the optical measurement;

calculating image characteristic amount information including information regarding a contrast of the image to be reproduced on the basis of said stored data;

calculating a correction amount for correcting reproduction conditions in accordance with a difference in kinds of film on the basis of film characteristic difference information showing a difference between film characteristics of the predetermined film and film characteristics of a predetermined reference film, and said calculated image characteristic amount information; and determining reproduction conditions of the image to be reproduced by using a reference reproduction condition for suitably reproducing an image recorded on the reference film onto a reproducing material and said calculated correction amount.

8. An image reproducing apparatus comprising:

setting means for setting the kind of a reference film;

reference reproduction condition setting means for setting a reference reproduction condition for suitably reproducing an image recorded on the reference film set by said setting means onto a reproducing material using a reference filter;

a photometer for dividing an image recorded on a predetermined film to be reproduced into many divisional images and decomposing the divisional images into plural colors and optically measuring the plural colors;

memory for storing data obtained by the optical measurement of said photometer;

image characteristic amount calculating means for calculating image characteristic amount information including information regarding a contrast of said image to be reproduced on the basis of the data obtained by the optical measurement of said photometer;

correction amount calculating means for calculating a correction amount for correcting reproduction conditions in accordance with a difference in kinds of film on the basis of film characteristic difference information showing a difference between film characteristics of said predetermined film and film characteristics of the reference film set by said setting means, and the image characteristic amount information calculated by said image characteristic amount calculating means;

reproduction condition determining means for determining the reproduction conditions of said image to be reproduced by using the reference reproduction condition set by said reference reproduction condition setting means and the correction amount calculated by said correction amount calculating means; and reproducing means for reproducing said image to be reproduced onto the reproducing material in accordance with the reproduction conditions determined by said reproduction condition determining means.

9. An image reproducing apparatus according to claim 8, further comprising:

judging means for judging a kind of the predetermined film in the above first construction, the data obtained by the optical measurement of said photometer being stored in said memory while being separated for kinds of film; and film characteristic difference calculating means for calculating said film characteristic difference information on the basis of data for film which is the same kind as the predetermined film stored in said memory, wherein said correction amount calculating means calculates the correction amount on the basis of the film characteristic difference information calculated by said film characteristic difference calculating means.

10. An image reproducing apparatus according to claim 8, further comprising:

judging means for judging the kind of the predetermined film, and film characteristic difference memory for storing the film characteristic difference information showing the difference between the film characteristics of the predetermined film and the film characteristics of the reference film while separating the film characteristic difference information for kinds of film, wherein said correction amount calculating means calculates the correction amount on the basis of the film characteristic difference information for film of the same kind as the predetermined film stored in said film characteristic difference memory.

11. An image reproducing apparatus according to claim 8, further comprising:

film characteristic difference calculating means for calculating the film characteristic difference information based on data of plural images recorded onto the predetermined film stored in said memory.

12. An image reproducing apparatus according to claim 8, wherein said correction amount calculating means calculates the correction amount such that this correction amount is increased as the contrast of an image shown by the information regarding said contrast is increased.

13. An image reproducing apparatus according to claim 8, wherein said image characteristic amount information includes information regarding the density of a main portion of the image to be reproduced, and said correction amount calculating means calculates the correction amount such that this correction amount is increased as the density of the main portion shown by the information regarding the density of the main portion of the image is biased to a highlight side of the image.

14. A method of determining reproduction conditions, comprising the steps of:

setting a reference reproduction condition for suitably reproducing an image recorded on the reference film onto a reproducing material by using a reference filter;

dividing an image recorded on a predetermined film to be reproduced into many divisional images, decomposing the divisional images into plural colors, and optically measuring the plural colors;

storing data obtained by the optical measurement;

calculating image characteristic amount information including information regarding a contrast of the image to be reproduced on the basis of said stored data;

calculating a correction amount for correcting reproduction conditions in accordance with a difference in kinds of film on the basis of film characteristic difference information showing a difference between film characteristics of the predetermined film and film characteristics of a predetermined reference film, and said calculated image characteristic amount information; and determining reproduction conditions of the image to be reproduced by using said reference reproduction condition and said calculated correction amount.

15. An image reproducing apparatus comprising:

a photometer for dividing an image recorded on a predetermined film to be reproduced into many divisional images and decomposing the divisional images into plural colors and optically measuring the plural colors;

memory for storing data obtained by optically measuring plural images recorded onto a least a film which is the same kind as the predetermined film;

color balance calculating means for calculating an average color balance of the plural images in a density region corresponding to a highlight portion or a main portion of the image to be reproduced on the basis of the data obtained by optically measuring the plural images recorded onto the film which is the same kind as the predetermined film stored in said memory;

reproduction condition determining means for correcting data corresponding to a non-highlight portion of the image to be reproduced among the data of this image obtained by the optical measurement of said photometer in accordance with the color balance calculated by said color balance calculating means, and for determining reproduction conditions of the image to be reproduced by using these corrected data and data corresponding to the highlight portion of the image to be reproduced; and reproducing means for reproducing the image to be reproduced onto a reproducing material on the basis of the reproducing conditions determined by said reproducing condition determining means.

16. An image reproducing apparatus according to claim 15, wherein said reproduction condition determining means determines the reproduction conditions on the basis of values obtained by respectively providing predetermined weight coefficients to the corrected data and the data corresponding to the highlight portion of the image to be reproduced and adding these weighted data to each other, and changes the weight coefficients in accordance with a ratio of the data corresponding to the highlight portion of the image to be reproduced and the data corresponding to the non-highlight portion of this image among the data obtained by the optical measurement of said photometer.

17. An image reproducing apparatus according to claim 15, further comprising:

judging means for judging the kind of the predetermined film, wherein said memory stores data obtained by optically measuring plural images respectively recorded on plural films of different kinds such that these data correspond to the kinds of film.

18. An image reproducing apparatus according to claim 15, wherein said memory stores only data obtained by optically measuring the plural images recorded on the predetermined film as data obtained by optically measuring plural images recorded onto a film which is the same kind as the predetermined film.

19. An method of reproducing an image, comprising the steps of:

dividing an image recorded on a predetermined film to be reproduced into many divisional images, decomposing the divisional images into plural colors, and measuring the plural colors;

calculating an average color balance of plural images recorded onto a film which is the same kind as the predetermined film in a density region corresponding to a highlight portion or a main portion of the image to be reproduced on the basis of data obtained by optically measuring the plural images;

correcting data corresponding to a non-highlight portion of the image to be reproduced among the data of this image obtained by the optical measurement in accordance with the calculated color balance; and determining reproduction conditions of the image to be reproduced by using these corrected data and data corresponding to the highlight portion of the image to be reproduced.

20. The image reproducing apparatus according to claim 1, wherein:

the image characteristic amount calculating means calculates a color balance of said image to be reproduced in a density region corresponding to a highlight portion or a main portion of said image to be reproduced; and said reproduction condition determining means corrects data corresponding to a non-highlight portion of said image to be reproduced in accordance with the calculated color balance, and determines reproduction conditions of said image to be reproduced using the corrected data and data corresponding to the highlight portion of said image to be reproduced.

21. The method according to claim 7, wherein said step of calculating a correction amount includes calculating a color balance in a density region corresponding to a highlight portion or a main portion of the image to be reproduced, and wherein said step of determining reproduction conditions includes correcting data corresponding to a non-highlight portion of the image to be reproduced in accordance with the calculated color balance, and determining reproduction conditions of the image to be reproduced by using the corrected data and data corresponding to the highlight portion of the image to be reproduced.

22. The image reproducing apparatus according to claim 8, wherein:

the image characteristic amount calculating means calculates a color balance of said image to be reproduced in a density region corresponding to a highlight portion or a main portion of said image to be reproduced; and said reproduction condition determining means corrects data corresponding to a non-highlight portion of said image to be reproduced in accordance with the calculated color balance, and determines reproduction conditions of said image to be reproduced using the corrected data and data corresponding to the highlight portion of said image to be reproduced.

23. The method according to claim 14, wherein said step of calculating a correction amount includes calculating a color balance in a density region corresponding to a highlight portion or a main portion of the image to be reproduced, and wherein said step of determining reproduction conditions includes correcting data corresponding to a non-highlight portion of the image to be reproduced in accordance with the calculated color balance, and determining reproduction conditions of the image to be reproduced by using the corrected data and data corresponding to the highlight portion of the image to be reproduced.

\* \* \* \* \*